Oct. 2, 1934.  C. C. FARMER  1,975,264
FLUID PRESSURE BRAKE SYSTEM
Filed Aug. 17, 1933   7 Sheets-Sheet 1
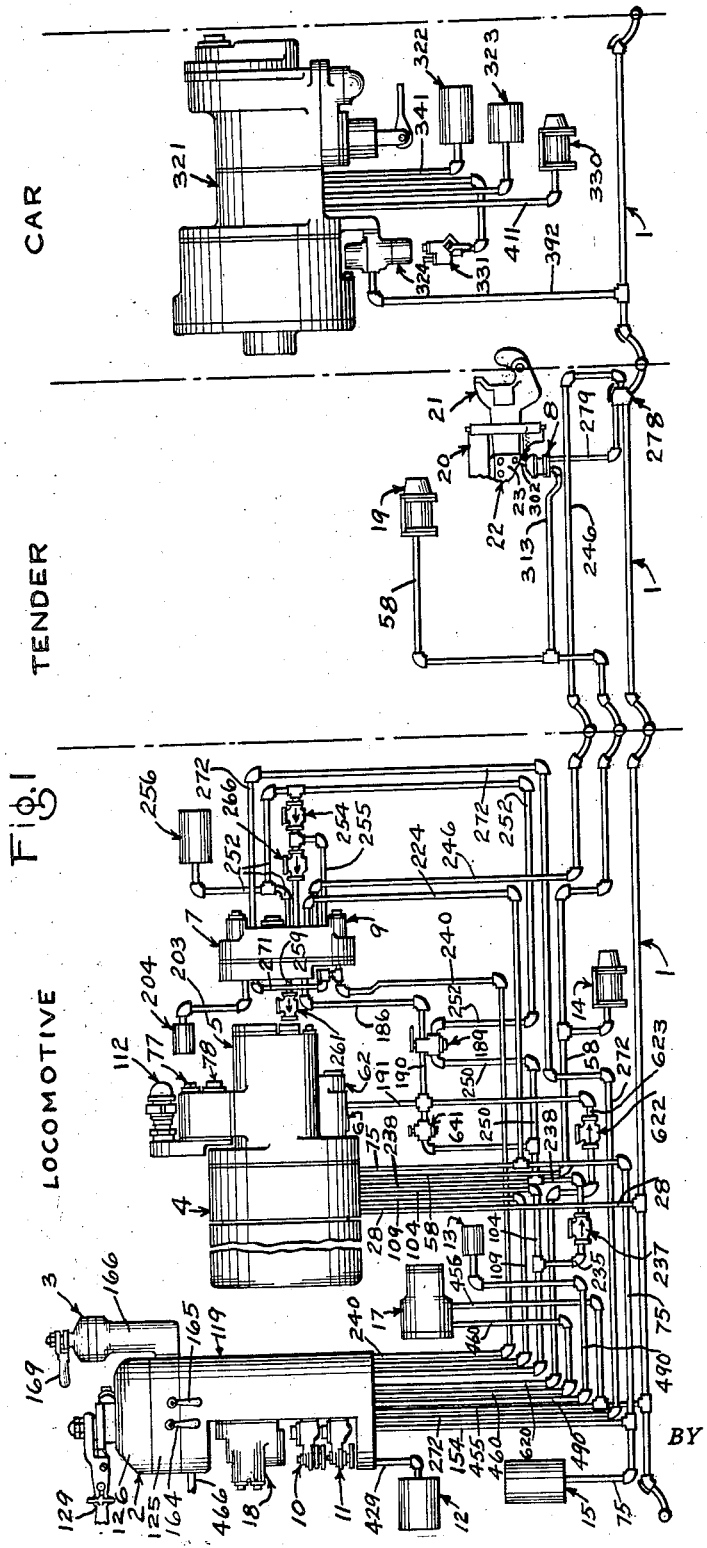
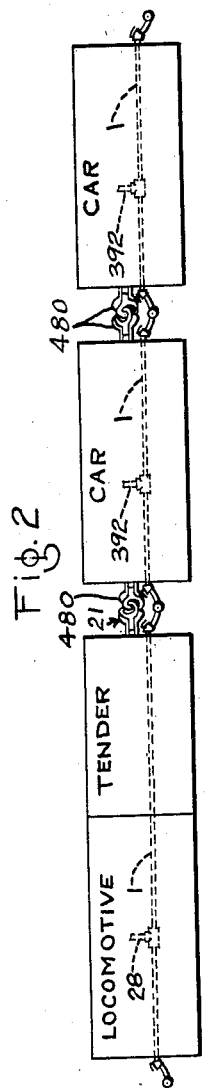
INVENTOR
CLYDE C. FARMER
BY  *Wm. M. Cady*
ATTORNEY

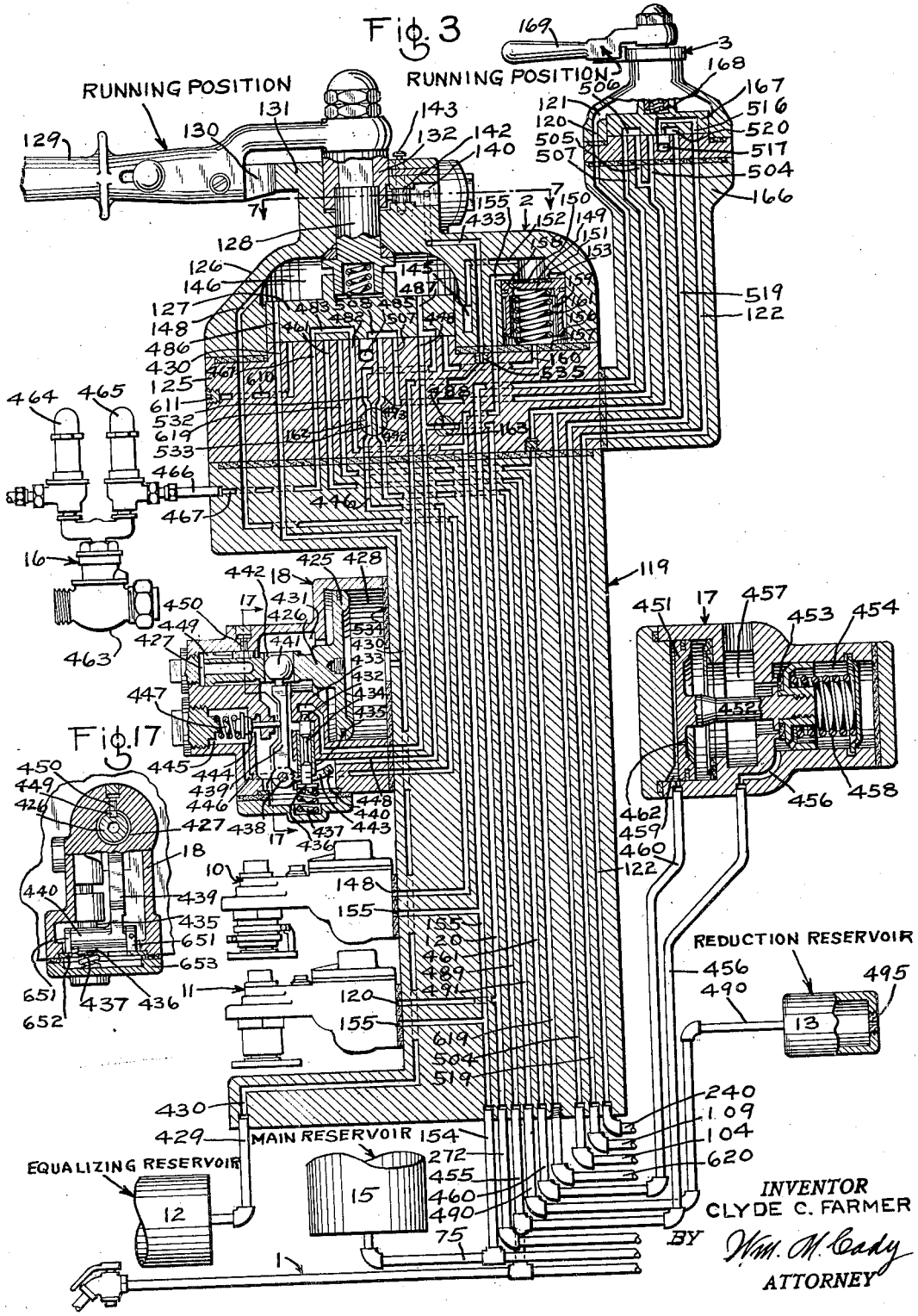

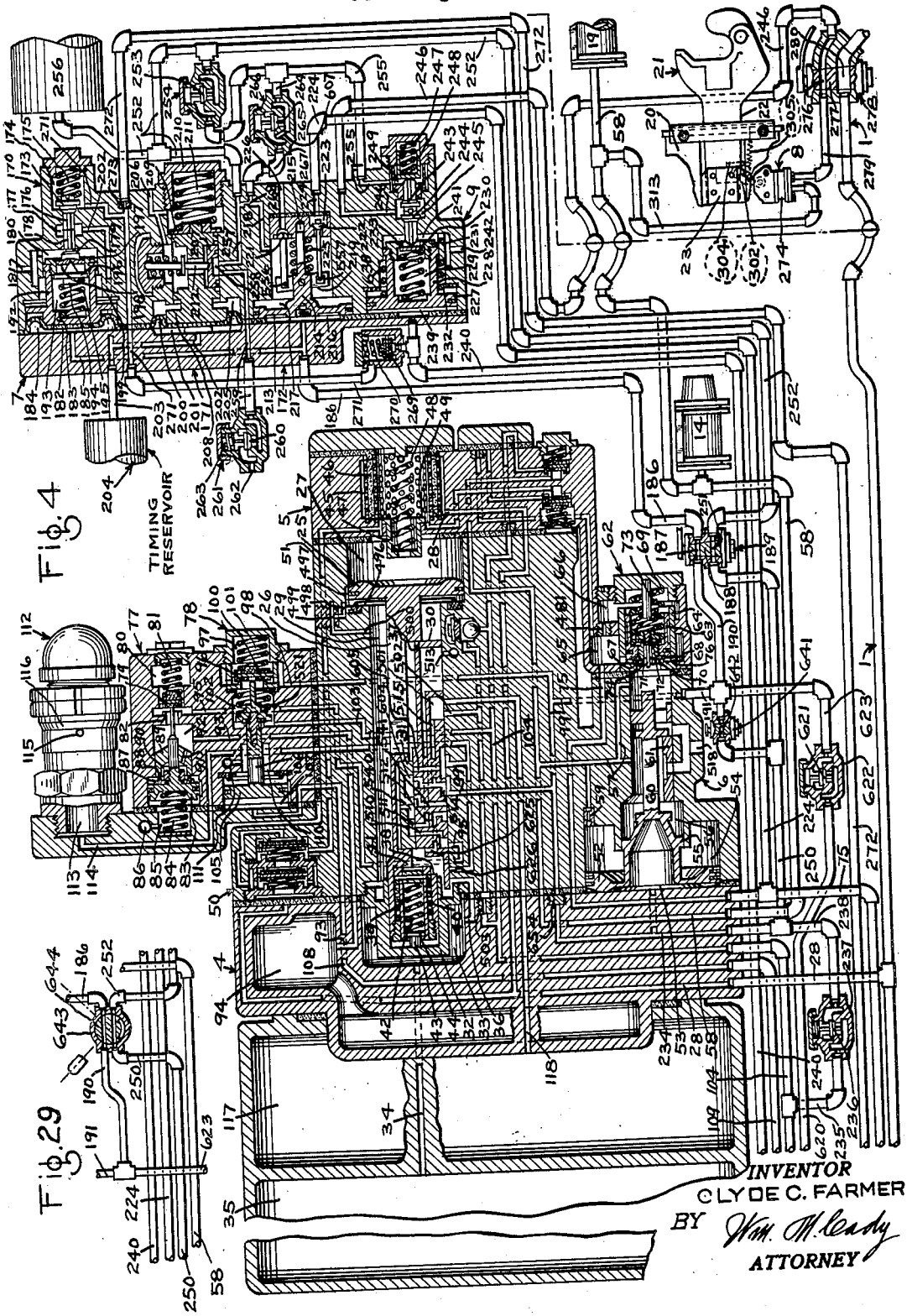

Oct. 2, 1934.  C. C. FARMER  1,975,264
FLUID PRESSURE BRAKE SYSTEM
Filed Aug. 17, 1933  7 Sheets-Sheet 4
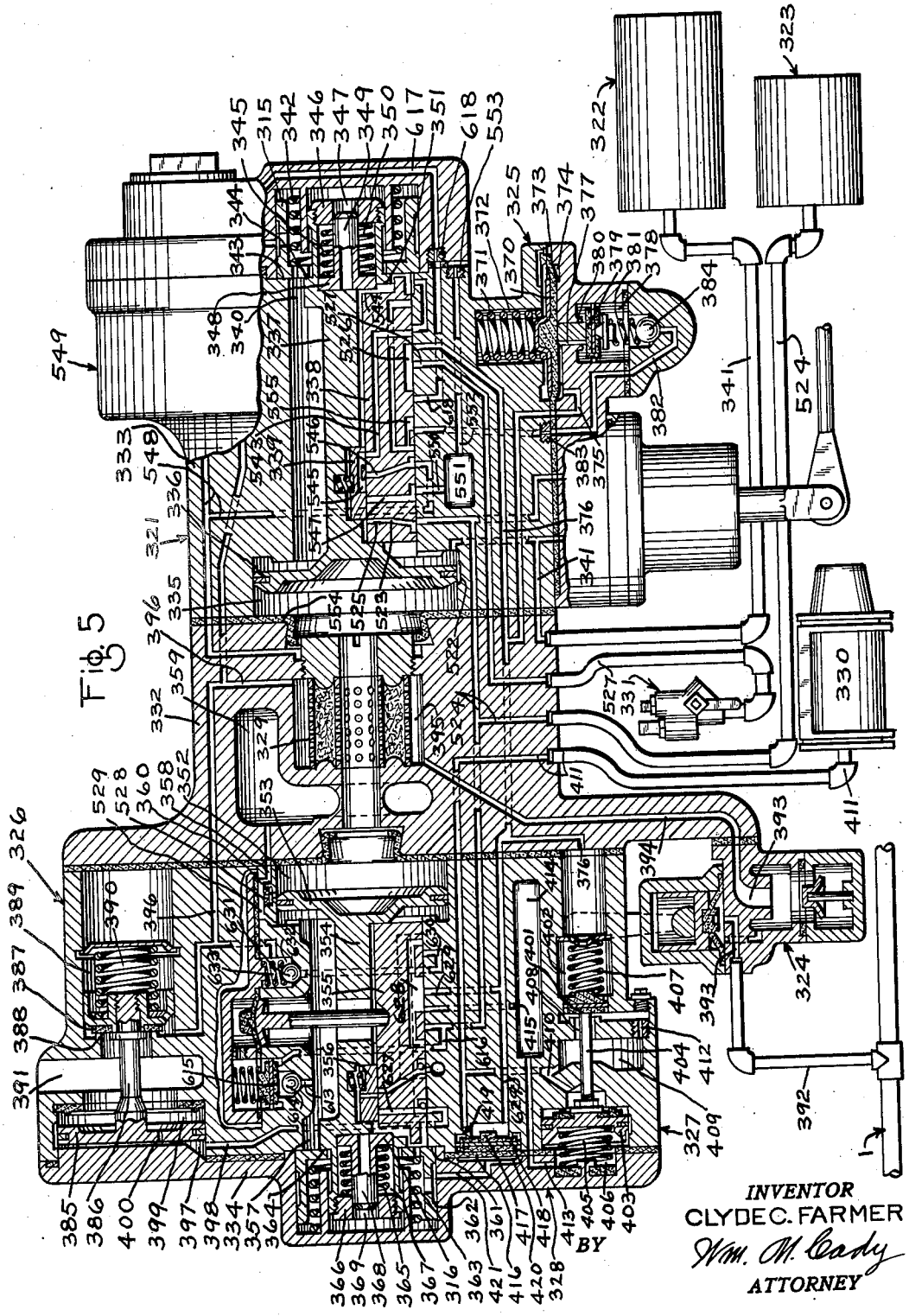
INVENTOR
CLYDE C. FARMER
BY Wm. M. Cady
ATTORNEY

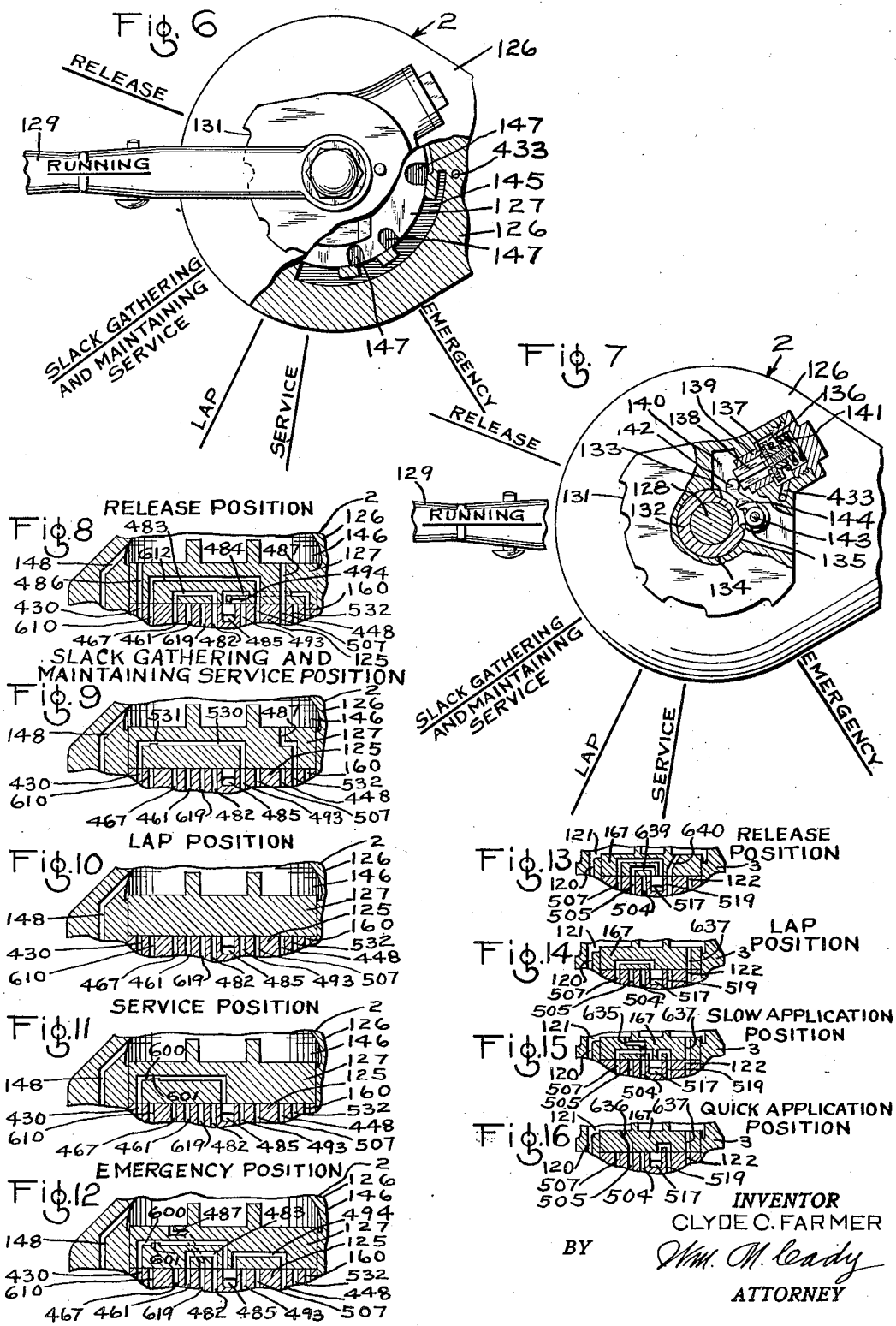

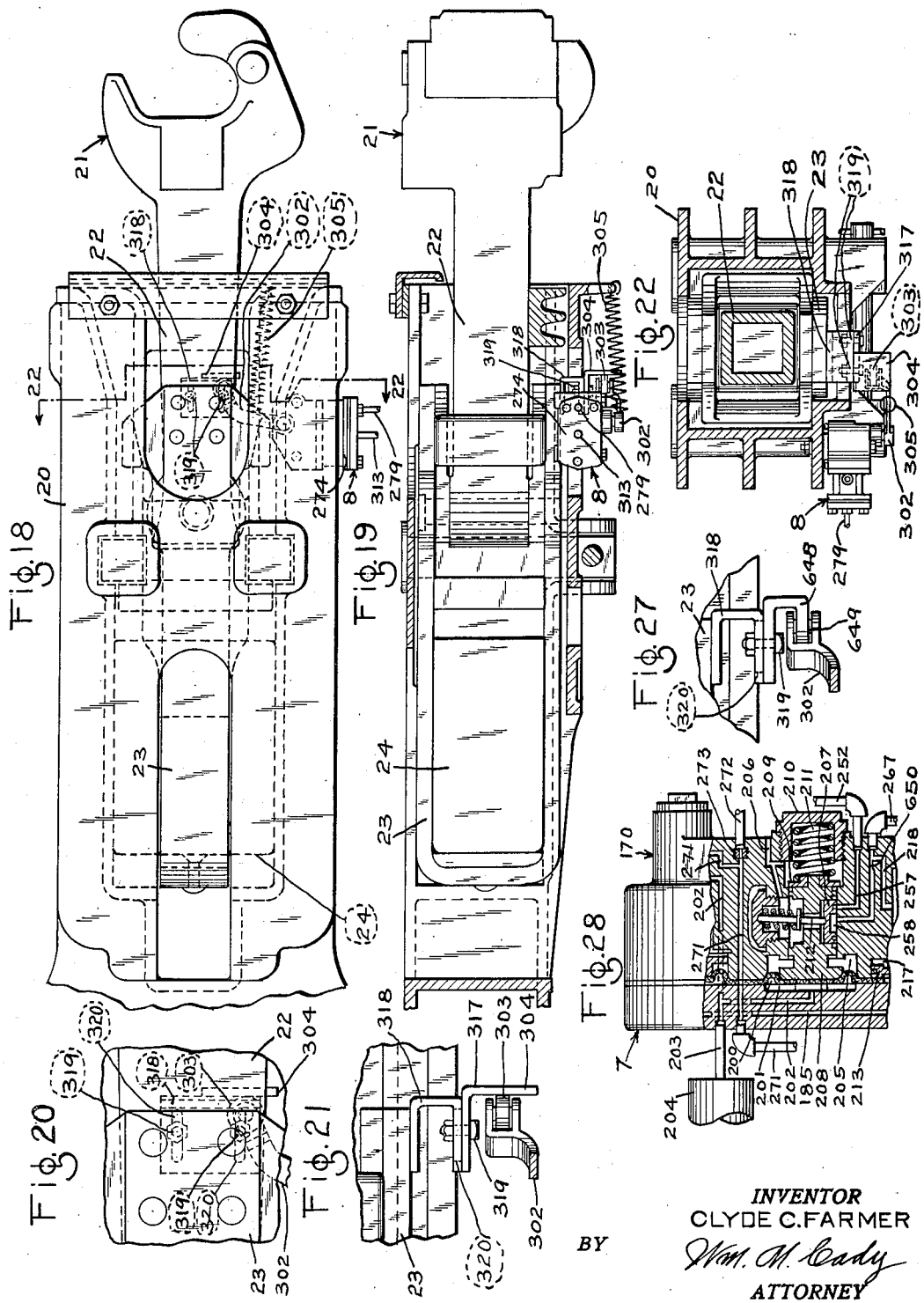

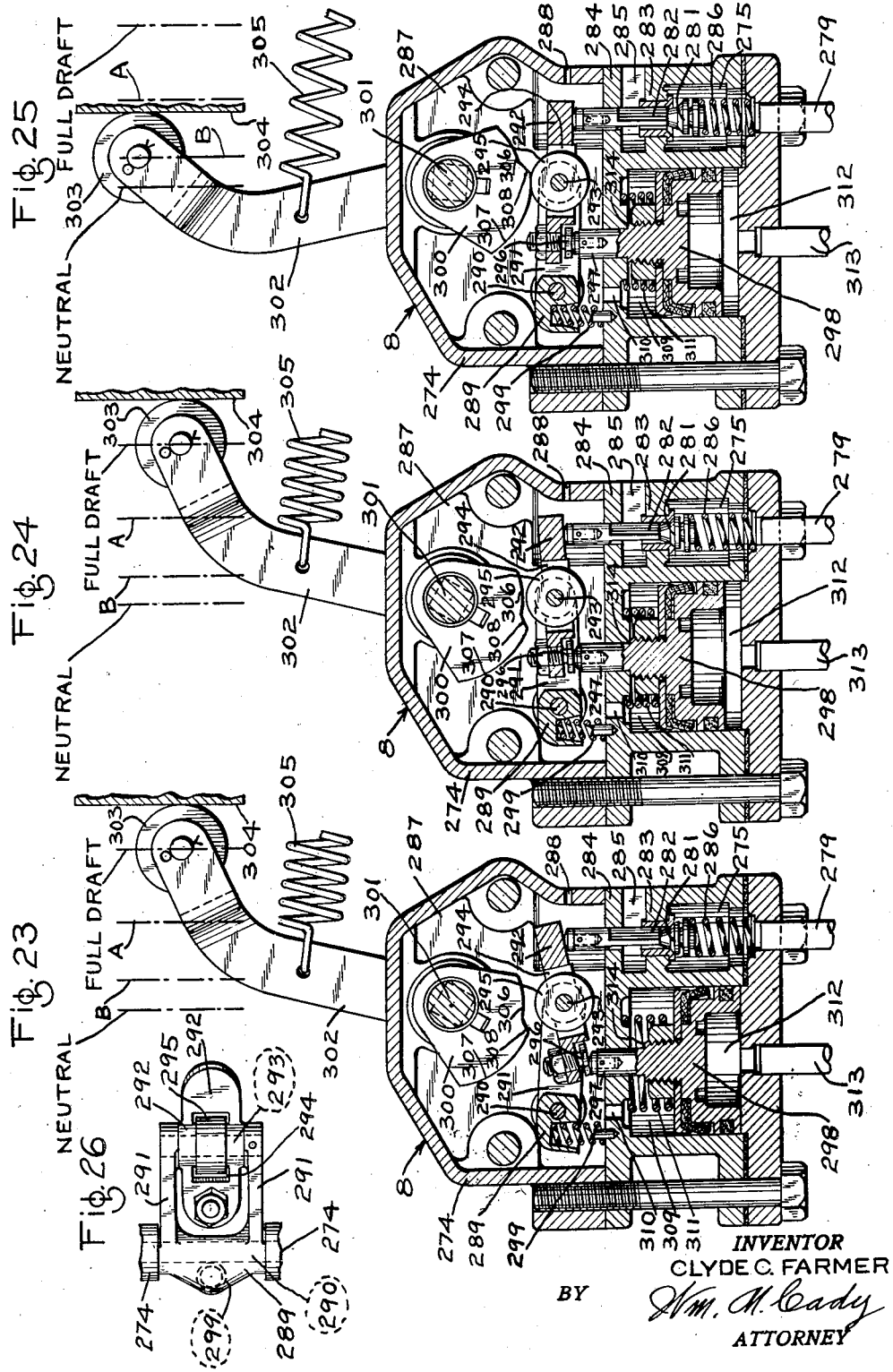

Patented Oct. 2, 1934

1,975,264

UNITED STATES PATENT OFFICE 1,975,264

FLUID PRESSURE BRAKE SYSTEM

Clyde C. Farmer, Pittsburgh, Pa., assignor to The Westinghouse Air Brake Company, Wilmerding, Pa., a corporation of Pennsylvania Application August 17, 1933, Serial No. 685,576

124 Claims. (Cl. 303—21)

This invention relates to fluid pressure brakes, and more particularly to a fluid pressure brake equipment for controlling the application and release of the brakes on the power vehicle, such as a locomotive, and the cars of a train; the present application being at least in part a continuation of my copending applications, identified as follows: Serial No. 529,026, filed April 10, 1931, and Serial No. 552,633, filed July 23, 1931.

The present standard fluid pressure brake equipments for locomotives and cars of a train were designed for handling trains of a length up to around eighty cars. In recent years, however, trains of more than eighty cars have been operated on various railroads.

As a consequence of the increased length of trains, it has become increasingly difficult to properly control the application and release of the brakes, and especially, to so control the application of the train brakes as to insure the gentle gathering of the slack in the train.

It is well known that when the usual engineer's automatic brake valve device of a fluid pressure brake system on a train is turned to a brake application position, the brakes apply serially from the front of the train toward the rear of the train, that is to say, the locomotive brakes will apply first and then the brakes on the following cars will apply serially toward the rear end of the train. As a result of this serial brake action, the deceleration of the locomotive and cars at the front end of the train begins before the brakes on the cars at the rear end of the train become effective.

There is a certain amount of slack or lost motion in the usual coupling mechanisms between the adjacent ends of adjacent cars of the train, and, by reason of the fact, as above explained, that the locomotive and cars at the front end of the train begin to decelerate before the cars at the rear end of the train, and if, on a long train, this slack is stretched out at the time an application of the brakes is initiated, the rear cars of the train run in against the slower moving cars and locomotive at the front end of the train, causing excessive shocks which may result in damage or derailment of some of the cars of the train. It is highly desirable to avoid the above described action when an application of the brakes is effected and I have heretofore proposed a car brake equipment, such as is disclosed and broadly claimed in my pending application, Serial No. 612,465, filed May 20, 1932, which responds quickly to a light but predetermined reduction in brake pipe pressure, effected through the operation of the engineer's brake valve device, to effect a local reduction in brake pipe pressure, which results in the rapid propagation of quick serial action throughout the length of the train and the movement of the several parts of the equipment to application position. In application position, the local venting of fluid under pressure from the brake pipe continues long enough to build up a brake cylinder pressure of about nine or ten pounds, which is about the maximum tolerable brake cylinder pressure without producing undesired shocks and still insure the gathering of the slack in the train. It will thus be understood that upon a light but predetermined reduction in brake pipe pressure the car brake equipments function, in effecting a service application of the brakes, to cause the brakes throughout the length of the train to apply more nearly in synchronism and with more uniform pressure than has heretofore been possible, all of which contributes materially to the gentle gathering of the slack in the train.

This car brake equipment on each car is adapted to function upon a sudden reduction in brake pipe pressure to first effect an initial inshot of fluid under pressure to the brake cylinder to insure movement of the brake cylinder piston to close the usual leakage groove and to cause the usual brake shoes to engage the car wheels, after which, the further supply of fluid under pressure to the brake cylinder is at a slow rate for a predetermined period of time to increase the brake cylinder pressure in such a gradual manner as to permit the slack in the train to gather without causing severe shocks. After said predetermined period of time has elapsed, the equipment functions to supply fluid under pressure to the brake cylinder at a more rapid rate, thus rapidly increasing the braking force to quickly bring the train to a stop.

Means have also been proposed by Ellis E. Hewitt and myself, as disclosed and broadly claimed in our joint application, Serial No. 517,660, filed February 24, 1931, for delaying or holding back the application of the brakes on the locomotive of the train for a period of time after a reduction in brake pipe pressure is initiated, so that, during the period of time that the slack in the train is gathering, the inertia of the locomotive will tend to keep the slack in the train stretched out, and thus a more gradual running in of the slack results than if the locomotive were permitted to impede the forward movement of the cars at the same time as the application of the brakes is initiated on the cars.

After said period of time has elapsed or in other words, after the slack in the train has been gathered, the locomotive brakes are caused to apply.

Hereinbefore it has been mentioned that the car brake equipment disclosed in my pending application, Serial No. 612,465, operates upon a light but predetermined reduction in brake pipe pressure to apply the car brakes in such a manner as to insure the gentle gathering of the slack in the train. The engineer, however, cannot always be depended upon to limit the amount of reduction in brake pipe pressure to the desired extent and, in order to insure that an excessive reduction in brake pipe pressure will not be made, means are provided for limiting the amount of reduction in brake pipe pressure at a service rate, so as to insure the desired operation of the car brake equipments to prevent the harsh gathering of the slack in the train.

While the controlled build up of brake cylinder pressure in effecting an application of the brakes on the cars of the train, such as is obtainable by the use of the equipment of the character disclosed in my hereinbefore mentioned pending application, Serial No. 612,465, tends to prevent the slack in the train from running in so harshly as to produce excessive shocks, I have found that a greatly improved action can be attained by combining the means for delaying the application of the locomotive brakes and the means for insuring a light but predetermined reduction in brake pipe pressure in initiating a service application of the brakes, with such car brake equipment.

It will be understood that the best results in bringing the train to a prompt stop without harsh gathering of the slack in the train will be realized when every unit of the train, including the locomotive and tender, is brought to a stop in the same time and distance. The difficulty heretofore experienced in obtaining this result has been partly due to the control of the locomotive and tender brakes so that the rate of retardation of the locomotive and tender will not exceed that of the cars. It is obvious that since variations in the weight of the locomotive and tender are only affected by variations in the weight of fuel and water, the retarding effect of the locomotive and tender brakes for any given brake application will be nearly constant, whereas with the cars it is not uncommon for the weights of loaded cars to be as much as four times their empty weight, in which case, the retarding effect on the loaded cars will be substantially one-fourth of that on the empty cars. It will be seen that since, on a loaded train, the retarding effect of the locomotive and tender brakes is substantially the same as on an empty train, the rate of retardation of the locomotive and tender would be roughly four times that of the loaded cars. Due to this, the cars run in against the tender with the result that harsh damaging slack gathering or closing shocks are produced.

While the hereinbefore mentioned combination of locomotive and tender and car brake equipments does insure the gentle gathering of the slack in the train, I have found that a greatly improved slack gathering action may be obtained by controlling the locomotive and tender brakes in such a manner that the rate of retardation of the locomotive and tender will be substantially the same as that of the cars regardless of whether the cars are empty or loaded.

One object of my invention is to provide a train fluid pressure brake equipment which functions upon the effecting of a reduction in brake pipe pressure to apply the brakes on the power vehicle and the cars of the train in such a manner that the retarding effect thereof on each unit of the train will be substantially the same.

This object I attain by correlating the fluid pressure brake apparatus on the cars, which includes means for controlling the increase in brake cylinder pressure on the cars in effecting an application of the brakes, and the fluid pressure brake apparatus on the locomotive and tender, which includes means for controlling the retarding effect of the locomotive and tender brakes according to the retarding effect of the car brake equipments.

Another object of my invention is to provide a train fluid pressure brake equipment which functions upon the effecting of a reduction in brake pipe pressure, to so control the application of the locomotive and tender brakes as to insure the prompt stopping of the train without the occurrence of the hereinbefore mentioned excessive and damaging slack gathering shocks.

Another object of my invention is to provide a train fluid pressure brake equipment which operates upon a sudden reduction in brake pipe pressure to effect a gradual application of the brakes on the cars for a predetermined period of time to insure the gentle gathering of the slack in the train, then operates to effect an application of the locomotive and tender brakes, and finally operates to control the locomotive and tender brakes so that the retarding effect thereof will be maintained substantially equal to that on the cars.

Another object of my invention is to provide a train brake equipment which, in functioning to effect an application of the brakes, controls the braking action on the front end of the train according to relative longitudinal movement between two front vehicles or units of the train, such as a locomotive and the first car of a train.

Another object of my invention is to provide a train brake equipment embodying means whereby, in effecting an application of the brakes, the locomotive brakes are so controlled automatically that the locomotive will not in any way act to impede the forward motion of the braked cars of the train while the train is being brought to a stop.

Another object of my invention is to provide a locomotive brake equipment having means automatically operative, in effecting an application of the brakes, for controlling the braking action on the locomotive according to a relative longitudinal movement between the locomotive and a car connected thereto.

A further object of my invention is to provide a locomotive brake equipment having means automatically operative, in effecting an application of the brakes for controlling the braking action on the locomotive according to the action of a coupling mechanism carried by the locomotive.

A still further object of my invention is to provide a train brake equipment which is operative upon a reduction in brake pipe pressure to first effect an application of the brakes on the cars of the train in such a manner as to insure the gentle gathering of the slack in the train and to delay the application of the locomotive brakes for a predetermined period of time so that the inertia of the locomotive tends to stretch out the gathering slack in the train, and after said predetermined period of time has elapsed, to initiate an application of the locomotive brakes, and finally, to vary the braking force of the locomotive brakes in such a manner that the locomotive will neither tend to stretch out the gathered slack in the train nor impede the forward motion of the cars of the train.

Another object of my invention is to provide means operative automatically for rendering the hereinbefore mentioned means for automatically controlling the locomotive and tender brakes according to relative movement between the tender and first car of the train ineffective when an independent application of the brakes is initiated, and a further object is to provide means operative manually for rendering the means for automatically controlling the locomotive and tender brakes according to relative movement between the tender and first car of the train ineffective at any time.

Another object of my invention is to provide an angle cock device on the tender which when operated to closed position, will render the means for automatically controlling the locomotive and tender brakes according to relative movement between the tender and first car of the train ineffective.

In effecting a service application on a long train, it is desirable to first make a light reduction in brake pipe pressure so as to obtain only a light serial application of the brakes on the train, in order to prevent the harsh run in of the slack in the train, and after the slack in the train has gathered, to further reduce the brake pipe pressure to obtain the desired braking force to stop or slow down the train. With the automatic brake valve devices heretofore employed, it has been necessary for the operator to move the brake valve to service position to initiate the reduction in brake pipe pressure and then move it to lap position, to make the desired initial light reduction in brake pipe pressure, in other words, the degree of reduction would be left to the operator's judgment, with the result that unless the operator used extreme care in the manipulation of the brake valve device a too heavy a reduction would be effected which would cause the brakes to be applied with such force as to cause the slack in the train to gather harshly.

Another object of my invention is to provide means whereby an initial predetermined limited reduction in brake pipe pressure may be automatically effected by the proper manipulation of the automatic brake valve device.

This object I attain by the provision of an automatic brake valve device having in addition to the usual service position, another service position in which fluid under pressure is vented from the equalizing reservoir to a small reduction reservoir to limit the reduction in equalizing reservoir pressure and consequently in brake pipe pressure.

If there is leakage from the brake pipe while the automatic brake valve device is in the added service position, such leakage would increase the amount of reduction in brake pipe pressure over that desired with the result that too heavy an application would be effected on the front end of the train which of course would tend to cause the slack in the train to gather harshly and is therefore objectionable.

Another object of my invention is to provide an improved equalizing discharge valve device which besides being adapted to control the venting of fluid under pressure from the brake pipe in accordance with the reduction in equalizing reservoir pressure, is also adapted to supply fluid under pressure to the brake pipe at a rate equal to the rate of leakage from the brake pipe, thus preventing any drop in brake pipe pressure due to leakage and eliminating the objectionable feature mentioned above.

Other objects and advantages of my invention will appear in the following more detailed description.

In the accompanying drawings; Fig. 1 is a side elevational view of the locomotive, tender and car equipments coupled together in operative relation to each other; Fig. 2 is a diagrammatic view illustrating a train including a locomotive, tender and two cars all coupled together and embodying my invention; Figs. 3 and 4 are diagrammatic views, mainly in section, of the locomotive and tender brake equipment, Fig. 4 being a continuation of Fig. 3; Fig. 5 is a diagrammatic view, mainly in section, of the car brake equipment; Fig. 6 is a plan view of a portion of the automatic brake valve device, sections of the casing being broken away for the purpose of more clearly illustrating certain features of the brake valve device; Fig. 7 is a cross sectional view of the automatic brake valve device taken on the line 7—7 of Fig. 3; Figs. 8 to 12 inclusive are fragmentary sectional views of the automatic brake valve device illustrating the rotary valve thereof in its several brake controlling positions; Figs. 13 to 16 inclusive are fragmentary sectional views of the independent brake valve device illustrating the rotary valve thereof in its several brake controlling positions; Fig. 17 is a fragmentary sectional view of the equalizing discharge valve device taken on the line 17—17 of Fig. 3; Fig. 18 is a plan view of a portion of the tender underframe and draft rigging illustrating the associated parts of the control mechanism; Fig. 19 is a side elevational view of a portion of the control mechanism carried by the tender, portions of the tender underframe being broken away as indicated by the section lines; Fig. 20 is an enlarged fragmentary plan view of a portion of the draft rigging of the tender illustrating the manner of adjusting the portion of the control mechanism carried by the tender; Fig. 21 is an enlarged detail side elevational view of the portion of the draft rigging and control mechanism shown in Fig. 20; Fig. 22 is a cross sectional view taken on the line 22—22 of Fig. 18; Figs. 23, 24 and 25 are enlarged detail horizontal sectional views of the control mechanism carried by the tender; Fig. 26 is a fragmentary detail plan view of a portion of the control mechanism; Fig. 27 is a side elevational view of a portion of the draft rigging illustrating the manner of positively connecting the operating arm of the control mechanism to the tender draft rigging; Fig. 28 is a diagrammatic sectional view of a portion of the locomotive equipment modified so that the locomotive equipment will not operate to move the usual brake shoes toward the wheels until a predetermined period of time has elapsed after a reduction in brake pipe pressure has been initiated; and Fig. 29 is a diagrammatic view, partly in section, of a portion of the locomotive equipment illustrating a single cut-out cock device which may be substituted for the two cock devices shown in Fig. 4.

As shown in the drawings, the train brake equipment may comprise the usual brake pipe 1, a locomotive and tender fluid pressure brake apparatus and a car fluid pressure brake apparatus, with which latter apparatus, each car in the train may be equipped, and may also comprise an engineer's automatic brake valve device 2 and an engineer's independent brake valve device 3, the automatic brake valve device being provided for the purpose of controlling the application and release of the train brakes, and the independent brake valve device being provided for the purpose of controlling the application and release of the locomotive and tender brakes only.

The locomotive fluid pressure brake apparatus may also include a brake controlling valve device, such as a distributing valve device 4 having an equalizing portion 5 which is adapted to be controlled through the medium of the automatic brake valve device 2, and also having an application portion 6 which is operative to control the application and release of the locomotive and tender brakes.

In the present embodiment of the invention, the distributing valve device 4 is similar in many respects to the distributing valve device which is disclosed and broadly claimed in the joint application of Ellis E. Hewitt and myself, Serial No. 619,052, filed June 24, 1932.

The locomotive brake apparatus may further include a hold-back and timing control valve device 7 which, when the equalizing portion of the distributing valve device is moved upon a reduction in brake pipe pressure to initiate an application of the train brakes, functions to first supply fluid under pressure to the application portion 6 to cause said portion to operate to supply fluid under pressure to the locomotive and tender brake cylinders to cause them to operate to move the usual brake shoes (not shown) into engagement with the locomotive and tender wheels, and then functions to establish communication from the brake cylinder to the atmosphere, permitting fluid being supplied by the application portion to the brake cylinders to flow to the atmosphere, so as to prevent the brake cylinder pressure being increased sufficiently to produce an effective braking force and then at a predetermined time after the brake pipe reduction has been initiated, functions to close the atmospheric communication from the brake cylinders so as to permit the brake cylinder pressure to be increased to produce an effective braking force. It will thus be seen that the valve device 7 functions to delay the application of the locomotive and tender brakes with an effective braking force for a predetermined period of time after the initiation of a reduction in brake pipe pressure. During this delay period the locomotive and tender, due to their inertia, tend to stretch out the gathering slack in the train as will hereinafter be more fully described.

After the above mentioned delay period of time has elapsed, and the locomotive and tender brakes are applied with effective braking force, the valve device 7 on the locomotive and a control valve device 8 which is carried by the tender and which operates according to relative longitudinal movement between the tender and first car of the train, so controls the operation of the application portion 6 of the distributing valve device, as to vary the braking force of the locomotive and tender brakes, that the locomotive will not act to impede the forward movement of the cars or to exert a forward pull on the cars.

The application portion 6 of the distributing valve device is also adapted to be controlled by the engineer through the medium of the independent brake valve device 3 to effect an application and the release of the locomotive and tender brakes only. When an independent application of the locomotive and tender brakes is initiated by the use of the independent brake valve device, a valve mechanism 9, which, in the present embodiment of the invention, is mounted in the casing of the valve device 7, functions to render the valve devices 7 and 8 ineffective to control the operation of the application portion 6 of the distributing valve device to vary the braking force of the locomotive and tender brakes.

The locomotive apparatus may further comprise a feed valve device 10, a reducing valve device 11, an equalizing reservoir 12, a reduction limiting reservoir 13, one or more brake cylinders 14, a main reservoir 15, a compressor governor 16, a vent valve device 17 for venting fluid under pressure from the brake pipe to the atmosphere when an emergency application of the train brakes is initiated, and an equalizing discharge valve device 18 for venting fluid under pressure from the brake pipe in effecting a service application of the train brakes and for also maintaining brake pipe pressure against leakage under certain conditions in effecting a service application of the brakes as will hereinafter more fully appear.

The tender apparatus besides including the valve device 8, also comprises a brake cylinder 19 and a coupling mechanism which is carried in the usual manner by the draft or center sills 20 of the tender. The coupling mechanism may be of any desired type and as shown in the drawings may comprise a coupler 21 having a shank 22 connected to a yoke 23 operatively engaging the usual cushioning mechanism 24 which is adapted to cooperate, in the usual manner with suitable draft lugs carried by the sill 20, for cushioning draft and buffing shocks.

The equalizing portion 5 of the distributing valve device comprises a piston 25 having a stem 26. At one side of the piston there is a chamber 27 which is connected, through a passage and pipe 28 to the brake pipe 1, and at the other side of the piston there is a valve chamber 29 containing a main slide valve 30 and an auxiliary slide valve 31, which valves are adapted to be operated by the piston 25 through the medium of its stem 26.

The left hand end of the valve chamber 29 is closed by a cap member 32 which has screwthreaded engagement with the casing of the distributing valve device. The outer surface of the cap member and the inner surface of a recess, formed in the casing, define a chamber 33 which is in constant communication, through a passage 34, with a pressure chamber or reservoir 35, and is also in constant communication, through a passage 36, with the valve chamber 29. It will thus be seen that the pressure reservoir 35 and valve chamber 29 are in constant communication with each other.

The piston stem 26 is notched to receive the main slide valve 30 and to form shoulders 37 and 38 which are adapted to engage the forward and rear ends, respectively, of the slide valve. The stem is also notched to receive the auxiliary slide valve 31, the shoulders forming the ends of the notch operatively engaging the ends of the valve.

The end of the piston stem 26 is provided with a central bore containing a hollow plunger 39 which is slidably mounted in the stem and which is subjected to the pressure of a coil spring 40. The spring 40 acts to urge one end of the plunger into engagement with a stop shoulder 41 formed on the piston stem, and when in such engagement, the face of the plunger will be positioned a short distance to the right of the shoulder 38 of the piston stem.

Slidably mounted in the left hand end of the plunger 39, and subject to the pressure of a coil spring 42, is a piston stop 43 having a head 44 which is adapted to engage the plunger 39 to limit outward movement of the stop relative to the plunger. As shown in Fig. 4, the outer end of the stop 43 is engaged by the cap member 32 when the equalizing piston 25 is in its normal release position.

The casing of the distributing valve device is provided with a chamber 45 which is in open communication with the brake pipe passage 28 and the piston chamber 27, there being a strainer device 46 contained in the chamber for removing foreign matter from fluid flowing from the passage 28 to the piston chamber. Slidably mounted in the casing is a piston stop 47 which is subjected to the pressure of a spring 48 contained in the chamber 45 and which is provided with an annular collar 49 adapted to be engaged by the casing to limit the movement of the stop in the direction toward the piston.

Contained in the casing is a check valve device 50 adapted to provide a communication between the brake pipe passage 28 and the piston chamber 27 through a passage 51 in the event of the strainer becoming clogged. Since the details and functions of this check valve are the same as described in the aforementioned pending application, Serial No. 619,052, a detailed description of the same in this specification is deemed unnecessary.

The application portion 6 comprises an application piston 52, at one side of which, there is a piston chamber 53 and, at the other side of which, there is a chamber 54. Connected to the piston 52 is a baffle piston 55 which is slidably mounted in a suitable bore in the casing. The baffle piston separates the chamber 54 from a valve chamber 56 which is connected to the locomotive and tender brake cylinders 14 and 19 by way of a passage 57 and a passage and pipe 58. The chamber 54 is connected, through a choked passage 59, to the brake cylinder passage 57 which leads from the valve chamber 56.

The piston chamber 53 is connected to a passage 234 with which an application and release pipe 104 is in communication through a pipe 235, past a spring weighted check valve 236 of a check valve device 237 and through a pipe 238.

The pistons 52 and 55 are provided with a stem 60 adapted to operate a slide valve 61 which is contained in the chamber 56.

The application piston 52, through the medium of the piston stem 60, is adapted to control the operation of a supply valve device 62 contained in the casing of the distributing valve device. This supply valve device comprises a valve piston 63 which is slidably mounted in a bushing 64 secured to the casing, said bushing, together with the casing, defining chambers 65 and 66, which are connected together by way of a passage in a choke plug 481 mounted in the casing. The bushing 64 is provided with an annular seat rib 67 against which a gasket 68, carried in the end of the valve piston, is adapted to seal. A coil spring 69 is provided which acts, through the medium of the valve piston, to urge the gasket into sealing engagement with the seat rib 67.

The gasket 68 is secured to the valve piston by means of a bushing 70, in which, the fluted stem 71 of a pilot valve 72 is slidably mounted, said valve being subjected to the pressure of a spring 73 which tends to seat the valve on the inner end of the bushing 70. The end of the stem 71 extends into the valve chamber and is adapted to be engaged by the end of the stem 60 of the application piston to unseat the pilot valve. When the pilot valve is in its fully open position, the end of the piston stem 60 engages the left hand end of the bushing 70, and when in such engagement, communication from the valve chamber 56 to the open pilot valve is maintained through a slot 74 formed in the left hand end of the bushing.

Chamber 65 is, at all times, in communication, through a passage and pipe 75, with the main reservoir 15, and a plurality of ports 76, provided in the bushing 64, connect chamber 65 to the seating face of the supply valve piston 63, outside of the seat rib 67.

Mounted in the casing of the distributing valve device is a reduction chamber cut-off valve device 77 and a release valve device 78.

The reduction chamber cut-off valve device comprises a poppet valve 79 which is contained in a chamber 80, a spring 81 for urging the poppet valve into engagement with an annular seat rib 82 on the casing, and a movable abutment or piston 83 for controlling the operation of the poppet valve, which piston is subject, on one side, to the pressure of a spring 84 for normally maintaining the poppet valve out of engagement with the seat rib 82 as shown in Fig. 4. The spring 84 is contained in a chamber 85 which is constantly in communication, through a passage 86, with the atmosphere.

Secured to the rear face of the piston 83 is a gasket 87 which is adapted to seat on a seat rib 88 formed by one end of a bushing 89 rigidly mounted in the casing. With the gasket 87 in sealing engagement with the end of the bushing, a chamber 90 is formed in the bushing which is in communication with the gasket within the seat rib 88 and which is in communication, through a passage 91, with a chamber 92 in constant open communication, through a passage 93, with a deduction chamber 94. With the poppet valve 79 unseated, the chamber 92 is in communication with a passage 95 leading from the seat of the equalizing slide valve 30.

The release valve device 78 comprises a cut-off valve 96 contained in a chamber 97 which is constantly connected, through a passage 98, to a timing valve control passage 99. The valve 96 is adapted to be maintained seated on a seat rib 100 by the action of a spring 101 contained in chamber 97, and when thus seated, closes communication from the chamber 97 to a chamber 102 which is constantly open to a passage 103 leading to the application and release passage and pipe 104. The operation of the valve 96 is controlled by a piston 105 through the medium of the piston stem 106. At one side of the piston 105 there is a chamber 107 which is constantly in communication through a passage 108 with a release pipe 109. At the other side of the piston 105 there is a chamber 110 which is constantly open, by way of a passage 111, to the atmosphere.

A safety valve device 112 is carried by the casing of the distributing valve device and has a passage 113 which is in communication with a passage 114 leading from the seat of the equalizing slide valve 30. This valve device is of the usual well known construction and is adapted to discharge fluid from the passage 114 and any chambers which may be connected therewith if the pressure of fluid in the passage is higher than the setting of the safety valve device. The casing of the safety valve device is provided with a port 115 through which, fluid under pressure from the passage 114 is adapted to flow to the atmosphere when the usual safety valve (not shown) is open, the flow capacity of the port 115 being varied according to the position of a ring 116 having a screw-threaded adjustable connection with the casing of the device.

The casing of the distributing valve device is provided with an application reservoir or chamber 117 which is constantly open to a passage 118 leading to the seat of the equalizing slide valve 30.

As shown in Figs. 1 and 3 of the drawings, the automatic brake valve device 2, independent brake valve device 3, feed valve device 10, reducing valve device 11 and equalizing discharge valve device 18 are all carried by a pedestal 119 which is located within the engineer's cab and which is secured in any suitable manner to the locomotive.

The feed valve device 10 may be of the usual construction and is adapted to function in the usual manner to reduce the pressure of fluid from that carried in the main reservoir 15 to that normally carried in the brake pipe.

The reducing valve device 11 may also be of the usual construction and is adapted to function in the usual manner to reduce the pressure of fluid from that carried in the main reservoir 15 to that required to effect an independent application of the locomotive and tender brakes.

The automatic brake valve device 2 may comprise a casing having a valve seat section 125 and a cap or cover section 126 which are secured together and to the pedestal 119. The cover section 126 is provided with a bore containing a rotary valve 127, the face of which slidably contacts with the valve seat carried by the seat section 125 and the peripheral edge surface of which slidably contacts with the cover section 126 within said bore. The rotary valve 127 is operatively connected to the inner end of an operating stem 128 suitably journaled in the cover section 126 of the casing. The outer end of the stem 128 terminates outside of the cover section 126 and has secured thereto an operating handle 129 through the medium of which the stem and thereby the rotary valve is rotated. The handle 129 is provided with the usual spring-pressed plunger 130 which is adapted to cooperate with a notched quadrant 131, carried by the cover section 126, to yieldably resist movement of the handle from one position to another and to indicate to the engineer when the handle is in a proper control position.

Adjacent the handle 129, there is secured to the operating stem 128, for rotation therewith, a cam 132 having a peripheral cam face preferably comprising curved concentric surfaces 133 and 134 and a sloping surface 135 which merges into the surfaces 133 and 134, the radius of the surface 133 being less than that of the surface 134.

The cover section 126 of the casing is provided with a valve chamber 136 containing an exhaust valve 137 having a fluted stem 138 slidably mounted in a bushing 139 secured in the casing, said valve being operative to control communication from the valve chamber 136 to a recess 140, which recess, as shown in Fig. 7 of the drawings, is open to the atmosphere. One end of the bushing is provided with an annular seat rib 141 on which the valve 137 is adapted to seat to close communication from the valve chamber 136 to the recess 140, said valve being constantly urged toward the seat by the action of a coil spring 141 contained in the valve chamber 136.

For the purpose of controlling the operation of the valve 137, a member 142 is provided which, in the present embodiment of the invention, is contained in the recess 140 and which at one end is pivotally mounted on a pin or projection 143 carried by cover section 126 of the casing. The other end of the member 142 is adapted to operatively engage the end of the fluted stem 138 of the valve 137. The member 142, intermediate its ends, is provided with a lug 144 which is adapted to be operatively engaged by the surfaces 135 and 134 of the cam face for controlling the operation of the member and thereby the valve 137.

From an inspection of Fig. 7 of the drawings, it will be observed that, with the movable parts of the brake valve device 2 in either running or release position, there will be a slight clearance between either the end of the lug 144 and the cam surface 133 or the end of the valve stem 138 and the free end of the member 142, thus insuring the proper seating of the exhaust valve 137 by the action of the spring 141. When the brake valve handle 129 is being moved to slack gathering service position, the surface 135 of the cam face engages the lug 144 and causes the member 142 to rock in a clockwise direction about the projection 143, such movement of the member unseating the exhaust valve 137 against the opposing pressure of the spring 141. When the handle 129 is in slack gathering service position or in either lap, service or emergency position, the surface 134 of the cam face is in engagement with the lug 144 so that the member 142 is maintained in position to hold the exhaust valve open.

The cover section 126 of the brake valve casing is provided with a recess which is open to the periphery of the rotary valve 127, the walls of the recess and the peripheral surface of the valve defining a chamber 145 which, in each of the several operating positions of the rotary valve, as will be observed from an inspection of Fig. 6 of the drawings, is in communication with a chamber 146 at the back of the rotary valve by way of one or more cavities 147 in the back of the rotary valve. The rotary valve chamber 146 is constantly open to a passage 148 leading from the feed valve device 10.

For the purpose of controlling communication from the main reservoir 15 to the chamber 145 and consequently to the rotary valve chamber 146, a valve piston 149 is provided which is slidably mounted in the cover section 126 of the casing. This valve piston is provided, at one end, with a valve 150 which is adapted to seat on an annular seat rib 151 carried by the casing and close a passage 152 leading to the chamber 145. At the outside of the seat rib 151, the face of the valve piston and the casing define a chamber 153 with which the main reservoir 15 is in constant open communication by way of pipe 75, a branch pipe 154 and a passage 155. The valve piston at its other end is provided with a valve 156 which is adapted to seat on a gasket 157 clamped between the casing sections 125 and 126. The chamber 153, at one side of the valve piston, is in constant communication, through a small or restricting port 158 in the valve piston, with a chamber 159 at the other side of the valve piston, which chamber 159 is open to a passage 160 leading to the seat of the rotary valve 127. Contained in the chamber 159 is a coil spring 161 which acts to urge the valve piston 149 in the direction toward the seat rib 151.

Rotatably mounted in the valve seat section 125 of the casing are plug valves 162 and 163 which are adapted to be rotated through the medium of handles 164 and 165, respectively, shown in Fig. 1 of the drawings. The valve 162 is for the purpose of cutting in or out of operation the equalizing discharge valve mechanism to maintain brake pipe pressure and the valve 163 is for cutting out the control of the train brakes by the use of the automatic brake valve device 2 when, in double heading, the brakes are to be controlled from the head locomotive.

The independent brake valve device 3 is carried by a bracket 166 which is secured in any desired manner to the pedestal 119 and may comprise a casing in which a rotary valve 167 is operatively mounted. The valve 167 is operatively connected to the inner end of an operating stem 168 which is suitably journaled in the casing and which is adapted to be rotated by means of a handle 169 secured to the outer end thereof.

The equalizing discharge valve device 18 may comprise a casing in which there is operatively mounted a piston 425 having a stem 426 which is slidably guided by the casing within a bore 427. At one side of the piston 425 there is a piston chamber 428 with which the equalizing reservoir 12 is in constant communication by way of a pipe 429 and a passage 430 leading to the seat for the rotary valve 127 of the automatic brake valve device 2. At the other side of the piston 425 there is a valve chamber 431 which is in constant open communication with a passage 448 leading to the seat of the rotary valve 127 and which contains an exhaust valve 432 which is operative to control communication from the valve chamber 431 to a passage 433 leading to the valve chamber 136 containing the valve 137. The exhaust valve is provided with a stem 434 which is slidably guided in a bushing 435 carried by the casing. The valve stem extends through the bushing and adjacent its end is provided with a collar 436. Interposed between and engaging the outer face of this collar and the casing is a coil spring 437 which normally maintains the exhaust valve 432 seated as shown in Fig. 3 of the drawings.

Contained in the valve chamber 431 is a bell-crank lever which is rockably mounted on a pin 438 secured to inwardly extending spaced lugs 651 of a support member 652 clamped between the casing and a cover plate 653, said lever comprising arms 439 and 440. The end portion 441 of the arm 439 is substantially spherical in form and is operatively engaged by the piston stem 426 within an opening 442 which preferably extends through the stem. The arm 440 is provided with an opening 443 through which the lower end of the bushing 435 and exhaust valve stem 434 extend, said arm on each side of the opening being adapted to operatively engage the inner face of the collar 436 to control the operation of the exhaust valve 432. The arm 439, at a point intermediate its spherical end 441 and the pin 438, is adapted to operatively engage the end of the stem of a supply valve 444 contained in a chamber 445 which is in constant open communication with a passage 446 leading from the seat of the plug valve 162, said valve being normally maintained seated by the action of a coil spring 447 as shown in Fig. 3.

It will here be noted that due to the form of the end 441 of the arm 439, free vertical and rotary movement of the end 441 relative to the piston stem is permitted, thus preventing any binding action from being set up between the arm and piston stem.

The piston stem 426 is provided with a longitudinally extending groove or way 449 and, within this groove, the stem is engaged by the head of a pin 450 secured to the casing. By reason of such engagement, axial rotation of the stem is prevented, so that the piston stem cannot bind against the arm 439.

From an inspection of Fig. 17 it will be seen that upon the removal of the cap plate 653, the supporting member 652 and lever mounted thereon may be removed or replaced as a unit through the open end of the chamber 431, thus facilitating the assembly of the device and repairs thereto.

The vent valve device 17 may be of the usual type and as shown in Fig. 3 of the drawings, comprises a casing in which there is operatively mounted a piston 451 having a stem 452 adapted to control the operation of a vent valve 453 contained in a chamber 454 with which the brake pipe 1 is in constant open communication by way of a pipe 455 and a pipe and passage 456. The vent valve controls a communication from the valve chamber 454 to a recess 457 which is open to the atmosphere and is normally maintained seated by the action of a coil spring 458. At one side of the piston there is a chamber 459 which is open to a pipe 460 connected to a passage 461 leading from the seat of the rotary valve 127, and which is connected, through a small port 462 in the piston, to the recess 457.

The compressor governor 16 may be of the usual type which comprises a steam valve device 463 which is adapted to be controlled by the usual mechanisms contained in the high and low pressure tops 464 and 465, respectively, of the governor for governing the operation of the usual fluid compressor, (not shown). The low pressure top is in communication through a pipe 466 with a passage 467 leading from the seat of the rotary valve 127 of the automatic brake valve device.

The hold-back and timing control valve device 7 and valve device 8, as hereinbefore mentioned, are provided for the purpose of controlling the operation of the application portion 6 of the distributing valve device in effecting an application of the train brakes. The valve device 7 may comprise a casing in which there is mounted a timing valve mechanism 170 which is under the control of the equalizing portion 5 of the distributing valve device, a hold-back valve mechanism 171 which is controlled by the timing valve mechanism, and a regulating valve mechanism 172 for controlling the operation of the application portion 6 of the distributing valve device to increase the braking power of the locomotive brakes, as will hereinafter more fully appear.

The timing valve mechanism 170 may comprise a supply valve 173 which is contained in a chamber 174 and which is normally maintained seated by the action of a coil spring 175 contained in the valve chamber 174, said valve having a fluted stem 176 which extends through a wall in the casing and terminates within a chamber 177. The end of the valve stem 176 is in operative engagement with the end of a fluted stem 178 of an exhaust valve 179 contained in a chamber 180 which is constantly open to the atmosphere through a port 181 in the casing, the exhaust valve being normally maintained unseated by the spring 175 acting through the medium of the supply valve 173 and valve stems 176 and 178.

For controlling the operation of the supply and exhaust valves 173 and 179, respectively, a movable abutment is provided comprising a flexible diaphragm 182 which is mounted in the casing, and which is adapted to operate a follower member 183 slidably guided in the casing within the chamber 180. At one side of the diaphragm 182 there is a chamber 184 which is in communication with the control passage 99 in the distributing valve casing by way of a passage 185, a pipe 186, a port 187 in the plug valve 188 of a manually operable cut-out cock 189 and pipes 190 and 191. The chamber 180, containing the follower member, is, of course, at the other side of the diaphragm.

The follower member 183 is provided with a portion 192 which extends rearwardly from the head of the follower and is provided with a bore 193 which is open at its rear end. Contained in the bore 193 is a plunger 194 which operatively engages the exhaust valve 179 and which is constantly subjected to the pressure of a coil spring 195 also contained in the bore. The plunger 194 is provided with a stop flange 196 which is adapted to be engaged by an annular stop shoulder formed by the inner end of a short tubular bushing 197 having screw-threaded connection with the follower portion 192 within the bore 193. The exhaust valve 179 is provided with an annular flange 198 which is located inside of the bushing 197 and which is adapted to cooperate with the bushing to guide the exhaust valve during its operation. It will be noted that when the several parts of the timing valve mechanism are in their normal positions, as shown in Fig. 4, the spring 195, due to the bushing 197 limiting the movement of the plunger 194, will not tend to unseat the supply valve 173. When the diaphragm is flexed toward the right hand, the follower will be brought to a stop by its engagement with an annular shoulder 199 of the casing after the exhaust valve has been seated. When the exhaust valve is seated, the seating pressure exerted on the valve will be only that caused by the reaction of the spring 195 which is slightly compressed after the valve is seated. This prevents undue wear or damage to the exhaust valve or its seat which might result if the full force of the diaphragm were transmitted to the seated valve.

The hold-back valve mechanism may comprise a flexible diaphragm 200 which is mounted in the casing. At one side of the diaphragm 200 there is a chamber 201 which is in communication, through a passage 202, with the chamber 177 of the timing valve mechanism, said passage 202 being in communication, through a pipe 203 with a timing chamber or reservoir 204. At the other side of the diaphragm there is a valve chamber 205 which is constantly open to the atmosphere by way of a port 206 in the casing. Contained in the valve chamber 205 is a slide valve 207 which is adapted to be operated by a stem member 208 which is contained in the chamber 205 and which is slidably mounted in the casing. The left hand end of the stem member is in operative engagement with the flexible diaphragm 200. Secured to the right hand end of the stem member 208 is a combined spring seat and stop flange 209. Interposed between and engaging the spring seat 209 and a cap nut 210, which has screw-threaded connection with the casing, is a coil spring 211 which constantly tends to urge the stem member 208 toward its normal position. As shown in Fig. 4, the movement of the stem member toward the left hand is limited by the spring seat 209 engaging a suitable stop shoulder carried by the casing.

For the purpose of exerting a seating pressure on the slide valve 207, a rockable spring-pressed strut 212 is provided which at one end is rockably anchored to the casing and which at the other end rockably engages the slide valve.

The regulating valve mechanism 172 may comprise a piston 213 having a stem 214 which has its rear end portion slidably guided by the casing within a bore 215. At one side of the piston there is a chamber 216 which is in constant communication with the passage 185 leading to the pipe 186. At the other side of the piston there is a chamber 217 which is constantly connected to a control passage 218. Contained in the chamber 217 is a valve operating lever 219 which is rockably connected, intermediate its ends, to the piston stem 214 by means of a pin 220 and which is adapted to operate an exhaust control valve 221 contained in chamber 217 and a supply valve 222 contained in a valve chamber 223 which is in constant communication, through a passage and pipe 224, with the main reservoir pipe 75. One arm of the lever is pivotally connected to the stem of the exhaust control valve 221 by a pin 556 and the other arm is pivotally connected to the stem of the supply valve by a pin 557. The piston 213, as shown in Fig. 4, is normally maintained in its extreme outer position by the action of a coil spring 225 interposed between and engaging the piston stem 214 and casing. With the piston in this position the supply valve 222 is maintained seated and the exhaust control valve 221 unseated. With the exhaust control valve unseated, the chamber 217 is open, through a port 226 in the casing to the atmosphere.

The cut-off valve mechanism 9 functions to render the valve devices 7 and 8 ineffective to vary the braking power of the locomotive brakes only when an independent application of the locomotive brakes is effected, and may comprise a piston 227 subject on one side to the pressure of a spring 638 and having a stem 228 which is provided with a bore 229 containing a movable circular plate 230 which is disposed within the central bore of a bushing 231 having screw-threaded connection with the piston stem 227 within the bore 229. Contained in the bore 229 is a spring 232 which at all times tends to urge the plate 230 toward the open end of the bore. Movement of the plate in this direction is limited by its engagement with an annular stop shoulder 233 carried by the bushing. At one side of the stem 227 there is a chamber 239 which is connected to a pipe 240 leading from the rotary valve seat of the independent brake valve device 3 and at the other side of the piston there is a chamber 241 which is open to the atmosphere through a port 242 in the casing.

The cut-off valve mechanism 9 may also comprise a supply valve 243 and an exhaust valve 244, both of which are contained in a chamber 245 which is in constant communication with a pipe 246 leading to the valve device 8. The valves 243 and 244 are constantly in operative engagement with each other within the chamber 245 and are adapted to be operated in unison by either the piston 227 or a spring 247 acting through the medium of a plunger 248 contained in a chamber 249 to which the pipe 238 is connected by way of a pipe 250, a port 251 in the cock device 189, a pipe 252, past the check valve 253 of a check valve device 254 and a pipe and passage 255. The spring-pressed plunger 248 normally maintains the supply valve 243 unseated so that there is an open communication from the chamber 249 to the valve chamber 245, and through the medium of the valve 243, the plunger maintains the valve seated, so as to maintain closed a communication from the valve chamber 245 to the vented chamber 241.

The pipe 252 is also connected to a volume reservoir 256 and to a passage 257 which is normally open to the atmosphere through a cavity 258 in the hold-back slide valve 207 of the valve device 7, a passage and pipe 259, past the blow down valve 260 of a valve device 261 and a passage 262 in the casing of the valve device. The valve is urged toward its seat by the action of a coil spring 263.

The pipe 255, besides being connected to the plunger chamber 249 of the cut-off valve mechanism, is also connected to the passage 218 by way of a pipe 264, past the check valve 265 of a check valve device 266 and pipe 267. The passages 218 and 257 are connected by way of a restricted passage 268.

The pipe 240, besides being connected to the piston chamber 239 of the cut-off valve mechanism 9, is also connected to the valve chamber 174 of the valve mechanism 170, past a check valve 269 which is constantly urged toward its seat by a spring 270 and through a pipe and passage 271. A pipe 272 connected to a passage 120 leading from the chamber 121 above the rotary valve 167 of the independent brake valve device 3 is connected to the passage 271 through a passage in a choke plug 273.

The control valve device 8, included in the tender equipment, comprises a casing 274 which, in the present embodiment of the invention, is secured to the draft sill 20 or any other desired rigid part of the tender. A valve chamber 275 is provided in the casing 274, to which chamber the application piston chamber 53 of the distributing valve device is normally connected by way of passage 234, pipes 238 and 250, passage 251 in the plug valve 188 of the cock 189, pipe 252, past the check valve 253, pipe and passage 255, chamber 249 of the cut-off valve device 9, past the valve 243, valve chamber 245, passage and pipe 246, a passage 276 in the rotary plug valve 277 of an angle cock device 278, and a pipe 279. The angle cock device has screw-threaded connection with the brake pipe in the usual manner and the plug valve is provided with the usual passage 280 establishing communication from the brake pipe to the usual hose connection.

Contained in the valve chamber 275 is an exhaust valve 281 having a fluted stem 282 which is slidably mounted in spaced walls 283 and 284 of the casing, the space between the walls defining a passage 285 which is open to the atmosphere. This valve is constantly urged toward its seat by the action of a coil spring 286 contained in the chamber 275.

For controlling the operation of the exhaust valve 281, a mechanism is provided which is contained in a chamber 287 open to the atmosphere through a port 288 in the casing. This mechanism may comprise a carrier member 289 which is rockably mounted, adjacent one end, on a pin 290 suitably mounted in the casing and which is provided with spaced arms 291. A lever 292 is interposed between the arms 291, and this lever, intermediate its ends, is rockably mounted on a pin 293 which is secured, at each end, to one of the arms 291. This lever, intermediate its ends, is provided with an opening 294 which accommodates a roller 295 rotatably mounted on the pin 293.

One end of the lever 292 is adapted to operatively engage the end of the exhaust valve stem 282. The other end of the lever is provided with an adjusting screw having a head 296 which is adapted to operatively engage with the end of the stem 297 of a piston 298 mounted in the casing. Contained in the chamber 287 is a coil spring 299 which is interposed between and engages the casing and the left hand end of the carrier member. It will be noted that this spring 299 is located on the left hand side of the pin 290 so that its action tends to rotate the carrier member in a clockwise direction and thus maintains the lever 292 in engagement with the valve stem 282 and piston stem 297.

For controlling the operation of the lever 292, a cam 300 is provided, which is contained in the chamber 287 and which is secured to a shaft 301 rotatably mounted in the casing, the outer end of the shaft having an operating arm 302 secured thereto, the outer end of the arm carrying a roller 303 which is adapted to be operatively engaged by the lug 304 of a member 317 rigidly carried by a bracket 318 in any desired adjusted position welded or otherwise secured to the draft gear yoke 23. As shown in detail in Figs. 18, 20 and 21 of the drawings, the member 317 is secured to the bracket 318 by means of headed bolts 319, each of which passes through a circular opening in the member 317 which is of slightly greater diameter than the diameter of the bolt and also passes through a slotted opening 320 in the bracket 318, said bolt being provided with a nut adapted to be screwed down on the bracket 318 to clamp the bracket and member together in a rigid manner. This construction provides for the adjustment of the member 317 relative to the bracket 318 in a direction toward the forward end of the yoke or toward the rear end of the yoke. For the purpose of maintaining the roller 303 in operative engagement with the lug 304, as the coupler shank is moved longitudinally, a tension spring 305 is provided having one of its ends anchored to the draft sill 20 or any other desired fixed part of the tender and having its other end anchored to the arm 302.

The cam 300 is provided with a cam surface having curved portions 306 and 307 and a sloping portion 308 merging into the curved portions 306 and 307, the portions 307 and 308 being adapted to operatively engage the roller 295 for controlling the operation of the lever 292 and thereby the exhaust valve 282, when the roller is positioned in the path of travel of the cam surface.

At one side of the piston 298 there is a chamber 309 which is connected, through a passage 310 in the casing wall 284, with the chamber 287 which is open to the atmosphere. Contained in this chamber is a coil spring 311 which acts to normally maintain the piston in its extreme outer position as shown in Fig. 23. At the other side of the piston there is a chamber 312 which is constantly open, through a pipe 313, to the brake cylinder pipe 58 on the tender.

It will here be noted that while the train brakes are released, the piston 298 will be in its extreme outer position, and due to this, the carrier member 289 will be maintained in such a position, by the action of the spring 299, that the roller 295 will be beyond the path of travel of the cam as shown in Fig. 23. With the roller maintained in this position, the exhaust valve will be maintained seated by the spring 286. When, however, in effecting an application of the brakes, fluid under pressure is supplied from the brake cylinder pipe 58 to the piston chamber 312 by way of pipe 313, the piston will be moved to its extreme inner position as shown in Figs. 24 and 25, such movement of the piston being limited by the engagement of a stop shoulder 314 with the casing. If, when the piston is being moved inwardly, the cam 300 should be in the position in which it is shown in Figs. 23 and 24, the lever 292 will fulcrum on the end of the exhaust valve stem 282 and cause the carrier member to rotate sufficiently in a counter-clockwise direction, to advance the roller 295 into the path of travel of the sloping portion 308 of the cam surface. The spring 286 is of greater value than the spring 299 so that when the valve controlling mechanism is being positioned by the action of the piston, the exhaust valve will be maintained seated.

If, however, the cam 300 is in the position in which it is shown in Fig. 25, the roller 295 will engage the portion 307 of the cam surface before the piston has moved to its extreme inner position. After the roller has thus engaged the cam, the continued movement of the piston causes the lever to rock about the pin 293 in a clockwise direction, unseating the exhaust valve 281.

From an inspection of Figs. 20 and 21 of the drawings, it will be understood that the position of the cam surface 308 may be varied relative to the roller 295 by varying the position of the member 317 relative to the bracket 318, thus the lost motion between the cam surface and the roller 293 may be varied to meet any desired operative conditions.

When the train is rounding a curve a slight arcuate movement may be imparted to the tender coupler 21 which will cause a movement of the operating arm 302 and cam 300 which will be so slight that if the parts of the valve device are in the position as shown in Fig. 24, the cam will not engage the roller 295, and if they are in the position as shown in Fig. 25, the valve 281 will not be permitted to close. By reason of this, arcuate movement of the coupler will not cause the device 8 to function to vary the locomotive and tender brake cylinder pressure.

As shown in Figs. 1 and 5 of the drawings, the car brake apparatus may be of substantially the same construction, and may function in substantially the same manner to control the car brakes, as the car brake apparatus fully shown and described and broadly claimed in my aforementioned pending application, Serial No. 612,465. In view of this the following description will be more or less limited to the details and function which it is deemed necessary for a clear understanding of the present invention.

Briefly described, the car brake apparatus comprises a brake controlling valve device 321, an auxiliary reservoir 322, an emergency reservoir 323, the brake pipe 1, a combined cut-out cock and centrifugal dirt collector 324, a quick service modifying or limiting valve device 325, a quick action valve device 326, an emergency inshot valve device 327, a timing valve device 328, a strainer device 329, a brake cylinder 330 and a brake cylinder pressure retaining valve device 331.

The car brake controlling valve device 321 may comprise a pipe bracket 332, a triple valve device 333 and an emergency valve device 334, the casings of the triple valve device and emergency valve device being secured to the pipe bracket.

The triple valve casing has formed therein a piston chamber 335 containing a piston 336 having a stem 337 adapted to operate a main slide valve 338 and an auxiliary slide valve 339 contained in a valve chamber 340 which is connected through a passage and pipe 341 to the auxiliary reservoir 322.

Slidably mounted in the triple valve casing is a piston stop 315 which is urged in a direction toward the triple valve piston by a spring 342, movement of the stop, in this direction, being limited by its engagement with an annular shoulder 343 formed by the casing. This stop is adapted to engage a shoulder 344 on the piston stem 337 and yieldably resist rearward movement of the piston 336 from its normal release position, in which position, the several parts of the triple valve device are shown in Fig. 5.

The rear end portion of the piston stem 337 is provided with a bore 345, in one end of which there is a plug 346 which has screw-threaded connection with the stem, said plug being provided with a central bore 347. Below the lower surface of the major portion of the piston stem, the other end of the bore 345 is open. The inner end wall of the bore 345 forms a stop shoulder adapted to be engaged by a plunger 348 which is in slidable engagement with the piston stem within the bore 345. The plunger is provided with a stem 349 which is slidably guided by the plug 346 within the bore 347. Interposed between and engaging one side of the plunger 348 and the plug 346 is a spring 350 which acts to normally maintain the plunger in engagement with the end wall of the bore 345. In this position, the face of the plunger will be closer to the rear face of the main slide valve 338 than will be the outer face of an operating collar 351 carried by the piston stem, so that in effecting an application of the brakes, the plunger will engage the main slide valve and yieldably resist relative movement of the piston and auxiliary slide valve before the collar 351 on the piston stem engages the main slide valve. The purpose of this is to stabilize the action of the triple valve parts as will hereinafter appear.

The emergency valve casing has formed therein an emergency piston chamber 352 containing an emergency piston 353 having a stem 354 adapted to operate a main slide valve 355 and an auxiliary slide valve 356 contained in a valve chamber 357 which is connected through a passage 358 with a quick action reservoir 359 formed in the pipe bracket. The piston chamber 352 is normally open through a choke plug 360 to the passage 358.

Within the emergency piston chamber, the casing provides a stop shoulder 361 against which a stop member 362, slidably mounted in the casing, is adapted to abut, said member being urged toward the stop shoulder 361 by a spring 363. The stop member 362 is adapted to engage a collar 364 carried by the piston stem 354 and yieldably resists movement of the emergency piston and slide valves from their normal release position, in which they are shown in Fig. 5, toward their innermost position.

The rear end portion of the emergency piston stem 354 carries a stabilizing mechanism which, in construction, is quite similar to the stabilizing mechanism carried by the rear end of the triple valve piston stem and comprises a plunger 316 which is subject to the pressure of a spring 365 interposed between and engaging the plunger and a plug 366 which has screw-threaded connection with the stem 354. The plunger is slidably guided within a bore 367 provided in the piston stem and has a stem 368 which is slidably guided by the plug 366 within a bore 369 in the plug. This mechanism is adapted to cooperate with the main slide valve 355 to prevent the emergency piston from operating to shift the auxiliary slide valve 356 to a position to initiate an emergency application of the brakes when a service reduction in brake pipe pressure is effected or upon unintentional fluctuations in brake pipe pressure.

The quick service modifying or limiting valve device 325 is carried by the triple valve casing and is provided for the purpose of limiting the local quick service reduction in brake pipe pressure according to a predetermined increase in brake cylinder pressure to insure the development of a predetermined but light brake cylinder pressure on each car of the train upon a light reduction in brake pipe pressure such as may be effected when the automatic brake valve device 2 on the locomotive is turned to slack gathering and maintaining position, so as to prevent the slack in the train from running in harshly. This device 325 comprises a flexible diaphragm 370 which is subject on one side to the pressure of a coil spring 371 contained in a chamber 372 which is open through a passage 373 to the atmosphere. At the other side of the diaphragm is a chamber 374 which is connected through a passage 375 with an application and release passage 376 leading from the seat of the main slide valve of the triple valve device. The chamber 374 is normally open through a passage 377 in the casing to a valve chamber 378 containing a valve 379 which is adapted to seat on a seat rib 380 to close communication through the passage 377, said valve being subject to the action of a coil spring 381 which tends to urge the valve toward the seat rib 380. Leading from the seat of the main slide valve 338 of the triple valve device to the valve chamber 378 is a passage 382 having a choke plug 383 interposed therein, and within the valve chamber 378 there is a ball check valve 384 which is adapted to prevent back flow of fluid from the chamber to passage 382. One end of the spring 381 seats on the ball check valve 384, so that the spring tends to maintain the check valve seated.

The quick action valve device 326 is associated with the emergency valve device 334 and is mounted in the emergency valve casing. This valve device 326 may comprise a piston 385 which, through the medium of its stem 386, controls the operation of a vent valve 387 contained in a valve chamber 389 and which is normally maintained seated on a seat rib 388 of the casing by the action of a coil spring 390 to close a communication from the valve chamber to a passage 391 which is open to the atmosphere. The brake pipe 1 is connected to the valve chamber 389 by way of a pipe 392, an open communication 393 through the combined cut-out cock and centrifugal dirt collector 324, a passage 394, a chamber 395 which surrounds the strainer device 329, and a passage 396. At one side of the piston 385 there is a chamber 397 to which fluid under pressure is adapted to be supplied by way of a passage 398 when, as will hereinafter more fully appear, an emergency application of the brakes is initiated. At the other side of the piston there is a chamber 399 which is open through the passage 391 to the atmosphere. The piston chamber is connected to the atmosphere through a small port 400 in the piston. The purpose of this port is to control the rate of flow of fluid from the emergency valve chamber 357 and quick action reservoir 359 to the atmosphere, so as to insure the vent valve remaining open until fluid under pressure is substantially completely vented from the brake pipe in effecting an emergency application of the brakes.

The triple valve piston chamber 335 and the emergency piston chamber 359 are both in communication through the strainer and chamber 395 with the passage 394 leading from the brake pipe 1.

Also contained in the casing of the emergency valve device is the inshot valve device 327 which is operative, when effecting an emergency application of the brakes, to provide an initial inshot of fluid to the brake cylinder until a predetermined brake cylinder pressure (about 15 pounds) is developed and to then restrict the rate of flow of fluid to the brake cylinder, said mechanism comprising a valve 401 contained in a chamber 402 which is constantly open to the application and release passage 376, and also comprises a valve piston 403 having a stem 404, through the medium of which the operation of the valve 401 is controlled. Normally, the valve piston 403 is maintained in sealing engagement with the casing by the action of a coil spring 405 contained in a chamber 406, and when in this position, the stem 404 maintains the valve 401 unseated against the action of a coil spring 407 tending to seat the valve.

With the valve 401 unseated, the valve chamber 402 is open to the brake cylinder 330 by way of a passage 408, a chamber 409, a passage 410 and a passage and pipe 411, and is also open to the chamber 404 through a choke plug 412. The inner seated area of the valve piston 403 is open to the passage 410. The chamber 406 at the other side of the valve piston is open through a passage 413 to a small chamber 414 which is connected to a passage 415 leading to the seat of the main slide valve 355 of the emergency valve device.

The timing valve device 328 is also contained within the emergency valve casing and operates in effecting an emergency application of the brakes to supply a final inshot of fluid under pressure to the brake cylinder 330 at a predetermined time after the valve device 327 operates to restrict the flow of fluid to the brake cylinder. This device may comprise a flexible diaphragm 416 which is adapted to control the operation of a valve 417 contained in a chamber 418 at one side of the diaphragm, said chamber being connected through a restriction 419 to the brake cylinder passage 411. At the other side of the diaphragm there is a chamber 420 which is connected through a passage 421 to the emergency valve chamber 357. The diaphragm 416 is normally subject to the pressure of fluid in chamber 420, as supplied from the emergency valve chamber 357 and quick action reservoir 359, for holding the valve 417 seated as shown in Fig. 5. The inner seated area of the valve is connected to the application and release passage 376.

The retaining valve device 331 may be of the usual construction having a cut-out position in which fluid under pressure is adapted to be completely vented from the brake cylinder 330 in releasing the brakes and also having a cut-in position in which it operates, in releasing the brakes, to retain a predetermined pressure in the brake cylinder.

Since as hereinbefore stated the car brake equipment is broadly claimed in my pending application, Serial No. 612,465, claims to such equipment per se have not been included in the present application.

The foregoing description has been limited more or less to the details of construction of the several parts of the train brake equipment and the following description will be directed more particularly to the functioning of said parts in controlling the train brakes.

Assuming the coupler 21 at the rear end of the tender to be coupled to the coupler 480 at the front end of the first car of a train of coupled cars and the brake pipes of the several units of the train to be coupled, all as shown in Fig. 2 of the drawings, the operation of the several parts of the train brake equipment is as follows:

*Initial charging*

In initially charging the fluid pressure brake equipment of the train, fluid under pressure supplied to the main reservoir 15 by a fluid compressor, (not shown), in the usual well known manner, flows to the valve chamber 66 of the application portion of the distributing valve device by way of pipe and passage 75, chamber 65, and passage in the choke plug 481. From the pipe 75, fluid under pressure flows, by way of pipe and passage 224, to the supply valve chamber 223 of the regulating valve mechanism 172. From the pipe 75 fluid also flows through pipe 154 and passage 155 to the feed valve device 10, to the reducing valve device 11 and to the chamber 153 at one side of the valve piston 149 mounted in the cover section of the casing of the automatic brake valve device 2. From the passage 155 fluid flows through a branch passage 482 to the seat of the rotary valve 127 and, with the rotary valve in either running or release position, fluid flows from the passage 482 to the low pressure top 465 of the compressor governor by way of a cavity 483 in the rotary valve 127, passage 467 and pipe 466.

Fluid under pressure supplied to the feed valve device 10 flows therefrom through passage 148 to the chamber 146 at the back of the rotary valve 127 of the automatic brake valve device 2, and fluid under pressure supplied to the reducing valve device 11 flows therefrom through passage 120 to the chamber 121 at the back of the rotary valve 167 of the independent brake valve device 3.

In charging the train brake equipment, the independent brake valve device 3 will be placed in running position and the rotary valve 127 of the automatic brake valve device 2 will be first moved, by the engineer, to release position and maintained in this position for a predetermined period of time and will be then moved to running position. With the rotary valve 127 in release position, the supply of fluid to charge the equipment is from the main reservoir 15 and with the rotary valve in running position, the final supply of fluid is from the feed valve device 10. By thus supplying fluid under pressure from the main reservoir the time required to fully charge the equipment is materially reduced over that which would be required if fluid were supplied by the feed valve device only.

With the rotary valve 127 in release position, a cavity 484 in the valve connects the passage 160, leading from the chamber 159 at the spring side of the valve piston 149, to a passage 485 leading to the atmosphere, so that the fluid in chamber 159 is reduced at a faster rate than fluid can flow from chamber 153 through the restricted port 158 to chamber 159, and consequently, an increase in the pressure of chamber 159 will not be effected. With the chamber 159 thus vented, fluid under pressure in chamber 153, acting on that portion of the face exposed to the chamber 153 causes the valve piston 149 to move inwardly from the position in which it is shown in Fig. 3, first unseating the valve 150 and then seating the valve 156.

With the valve 150 unseated, fluid under pressure flows from the chamber 153 to the rotary valve chamber 146 by way of passage 152, recess 145 and cavities 147. As long as the rotary valve 127 is in release position, the valve piston 149 will remain in its innermost position and fluid at main reservoir pressure will be supplied to the rotary valve chamber 146.

From the rotary valve chamber 146 fluid under pressure flows by way of a port 486 in the rotary valve 127 and passage 430 to piston chamber 428 of the equalizing discharge valve device 18 and from passage 430 fluid flows through pipe 429 to the equalizing reservoir 12. Fluid under pressure from the rotary valve chamber 146 also flows through a port 487 in the rotary valve and passage 448 to the valve chamber 431 of the equalizing discharge valve device 18. From the passage 448 fluid flows to the brake pipe 1 by way of a passage 488 in the plug valve 163, a passage 489 and pipe 455.

With the rotary valve 127 in running position, the port 487 in the valve continues to establish communication from the rotary valve chamber 146 to the passage 448 and also establishes an open communication from the chamber 146 to a passage 532 open by way of a passage 533 in the plug valve 162, and passage 446 to the maintaining valve chamber 445 of the equalizing valve device 18, so that the brake pipe 1 and connected chambers, and exhaust and maintaining valve chambers 431 and 445, respectively, of the equalizing valve device are charged with fluid at feed valve pressure.

With the rotary valve 127 in release position, the reduction reservoir 13 is open to the atmosphere by way of a pipe 490, a passage 491, a passage 492 in the plug valve 162, a passage 493, a cavity 494 in the rotary valve and passage 485. The reduction reservoir is constantly open to the atmosphere through a small passage in a choke plug 495 which has screw-threaded connection with the reservoir casing.

From an inspection of Fig. 6 of the drawings it will be seen that when the rotary valve 127 of the automatic brake valve device is being moved from release toward running position, the communication from the chamber 145 and consequently from the main reservoir by way of the cavities 147 is gradually closed so that the supply of fluid from the main reservoir to the brake pipe is gradually reduced, and at substantially the same time as this communication is closed, the passage 160 is lapped by the rotary valve which permits fluid flowing through the port 158 in the valve piston 149 to chamber 159 to build up a pressure therein. When the pressure in chamber 159 has been increased to substantially the pressure of fluid acting on the other side of the valve piston, the spring 161 acts to move the valve piston to its outer seated position, thus closing off the further flow of fluid from the main reservoir to the recess 145.

Heretofore it has been the usual practice to have the main reservoir in constant open communication with the rotary valve chamber of the automatic brake valve device so that when the brake equipment is charged with fluid under pressure, the rotary valve is urged against its seat by fluid at main reservoir pressure. In cases where the rotary valve is of relatively large diameter this has been found to be objectionable, in that it renders difficult the rotation of the valve to its several brake controlling positions. In the present embodiment of the invention the rotary valve 127 is urged toward its seat by fluid at main reservoir pressure only in release position and in all other positions is urged toward its seat by fluid at a lower pressure as supplied by the feed valve device 10 or any other desired source of fluid pressure. With fluid at this lower pressure in chamber 146 it will be understood that the rotary valve 127 is more easily operated to its several brake controlling positions than has heretofore been possible.

Fluid supplied from the main reservoir 15 or feed valve device 10 to the brake pipe 1 in the manner hereinbefore described flows through branch pipe and passage 28 and strainer device 46, to the equalizing piston chamber 27 of the distributing valve device 1.

The increase in the pressure of fluid in the piston chamber 27 will be at such a rapid rate that the equalizing piston 25 will be moved inwardly from its normal position, in which position, it is shown in Fig. 4, to its innermost position. In this latter position the rear face of the piston engages the annular bead of a gasket 496 carried by the casing, so that fluid under pressure flows from the piston chamber 27 to the valve chamber 26 by way of a feed groove 497, a passage 498, a flow restricting passage in a choke plug 499, having screw-threaded connection with the casing, and a passage 500. This flow of fluid to the valve chamber 26 is so regulated by the series arranged feed groove and passage in the choke plug 499 as to prevent the pressure chamber 35 from becoming charged to a pressure higher than that carried in the brake pipe during the time the automatic brake valve device is in release position.

When, in initially charging the equipment, the rotary valve 127 of the automatic brake valve device is turned from release position to running position, the pressure of fluid in the brake pipe and in the equalizing piston chamber 27 reduces, due to equalization toward the rear end of the train, to that of the fluid supplied by the feed valve device 10, and after the brake pipe pressure thus reduces, the spring 42, which is carried by the rear end of the equalizing piston stem 26, and which has been compressed upon movement of the equalizing piston to its innermost position, acting through the medium of the plunger 39 and stem 26, moves the equalizing piston outwardly to its normal release position, in which position it is shown in Fig. 4. The piston, as it is thus moved, shifts the auxiliary slide valve 31 to its normal release position relative to the main slide valve 30, the latter valve remaining in its inner release position.

With the equalizing slide valves 30 and 31 in any one of their three above mentioned release positions, and the rotary valve 127 in running position, as shown in Fig. 3, the application chamber 117 is open to the atmosphere by way of passage 118, a cavity 501 in the main slide valve 30, a passage 502, a passage in a choke plug 503, passage and pipe 104, a passage 504 in the pedestal 119, a branch passage 505, a cavity 506 in the rotary valve 167 of the independent brake valve device 3, a passage 507, a cavity 508 in the rotary valve 127 of the automatic brake valve device 2 and passage 485.

The spring 84 of the reduction chamber cut-off valve device 77, acting through the medium of the piston and its stem, holds the cut-off valve 79 unseated against the opposing pressure of the spring 81. With the valve 79 unseated, the equalizing main slide valve 30 in a release position and the automatic brake valve device 2 in running position, the reduction chamber 94 is open to the atmosphere by way of passage 93, chamber 92 in the cut-off valve device 77, past the unseated cut-off valve 79, valve chamber 80, passage 95, a port 510 in the equalizing main slide valve 30, a cavity 511 in the auxiliary slide valve 31, a port 512 in the main slide valve 30 and a port 513.

The piston chamber 216 of the regulating valve mechanism 172 is open to the pipe 186 and the diaphragm chamber 184 is open to the passage 185 which is in open communication with the pipe 186, said pipe being open to the atmosphere by way of passage 187 in the cut-out cock 189, pipes 190 and 191, passage 99, a port 514 in the main slide valve 30 of the distributing valve device, a passage 515 in the main slide valve 30, cavity 501 in the main slide valve, passage 502, the passage in a choke plug 503, and passage 104 which, as hereinbefore described, is open to the atmosphere. With the chamber 184 thus connected to the atmosphere, the spring 175 maintains the valve 173 seated and the valve 179 unseated. With the valve 179 unseated, the diaphragm chamber 201 of the hold-back mechanism 171 is open to the atmosphere by way of passage 202, chamber 177, past the unseated valve 179, chamber 180 and passage 181. The timing reservoir 204 being connected through the pipe 203 to the passage 202 is open to the atmosphere. With the diaphragm chamber 201 and timing reservoir thus connected to the atmosphere, the spring 211 acts to maintain the several parts of the hold-back valve mechanism 171 in their normal position as shown in Fig. 4.

The piston chamber 216 of the regulating valve mechanism 172 being open to the atmosphere, the spring 225 maintains the regulating piston 213 in its extreme left hand position, and in this position the piston maintains the supply valve 222 seated and the exhaust valve 221 unseated as shown in Fig. 4.

The piston chamber 239 of the cut-off valve mechanism 9 is open to the atmosphere by way of pipe 240, a passage 122 in the brake valve pedestal 119 and bracket 166, a cavity 516 in the rotary valve 167 of the independent brake valve device 3 and a passage 517. With the chamber 239 thus connected to the atmosphere, the spring 247 acts to maintain the valve 243 unseated and the valve 244 seated.

The application piston chamber 53 of the distributing valve device is in communication with the atmosphere by way of passage 234, pipes 238 and 250, passage 251 in the valve of the cock 189, pipe 252, past the check valve 253, pipes 255 and 264, past the check valve 265, pipe 267, passage 218, valve chamber 217 of the regulating valve mechanism 172, past the unseated valve 221 and passage 226, and the application piston 52 will be in its release position. The volume reservoir 256, being open to the pipe 252, is also open to the atmosphere.

With the application piston 52 in release position, as shown in Fig. 4, the locomotive and tender brake cylinders 14 and 19 respectively, are open to the atmosphere by way of pipe and passage 58, passage 57, application slide valve chamber 56, past the slide valve 61, and a passage 518. Since the pipe 313 of the tender equipment is in constant open communication with the brake cylinder pipe 58, the piston chamber 312 of the valve device 8, which chamber is in constant open communication with the pipe 313, is in communication with the atmosphere. With the piston chamber 312 at atmospheric pressure, the spring 311 acts to maintain the piston 298 in its extreme outer position, as shown in Fig. 23.

With the independent brake valve device 3 in running position, the piston chamber 107 of the release valve device 78 is in communication with the atmosphere by way of passage 108, pipe 109, a passage 519 in the pedestal 119 and bracket 166, a cavity 520 in the rotary valve 167 and passage 517. With the piston chamber 107 at atmospheric pressure, the spring 101 acts to maintain the cut-off valve 96 seated on the seat rib 100, and a spring 521, interposed between and engaging the casing and the piston stem 106, acts to maintain the piston 105 in its normal position as shown in Fig. 4.

On each car of the train, fluid under pressure supplied to the brake pipe 1, in the manner hereinbefore described, flows therefrom to the triple valve piston chamber 335 and to the emergency piston chamber 352 by way of pipe 392, passage 393, past the open valve of the combined cut-out cock and centrifugal dirt collector 324, passages 393 and 392, chamber 395 and strainer device 329.

With the triple valve piston 336 in its normal release position as shown in Fig. 5, fluid under pressure flows from the piston chamber 335 by way of a feed groove 522 around the piston to the valve chamber 340, and from thence flows by way of passage and pipe 341 to the auxiliary reservoir 322. Fluid under pressure from the valve chamber 340 also close to the emergency reservoir 323 by way of a port 523 in the main slide valve 338 and a passage and pipe 524, said port having a restriction 525 therein.

On the cars at the front end of the train where the rise in brake pipe pressure will be at a rapid rate, the triple valve piston 336 may be moved inwardly from its normal release position to its inner release position, in which the flow area of the feed groove is decreased so as to retard the rate of charge of the auxiliary reservoir. This provides for a more rapid increase in brake pipe pressure toward the rear end of the train, which results in the more uniform charging of the equipment than would be the case if the flow through the feed groove were not restricted.

With the triple valve parts in either their normal release or inner release position, the brake cylinder 330 is in communication with the atmosphere by way of pipe and passage 411, passage 410, chamber 409 of the emergency inshot valve device 327, passage 408, past the valve 401 which is normally maintained unseated by the spring 405 acting through the medium of the piston 403 and its stem 404, valve chamber 402, passage 376, a cavity 526 in the main slide valve 338 of the triple valve device, passage and pipe 527 and retainer valve device 331.

From the emergency piston chamber 358, fluid flows through a passage in a choke plug 528 and a passage 529 to the emergency piston chamber 357 and quick action chamber 359. From the valve chamber 357, fluid under pressure flows through passage 421 to the diaphragm chamber 420 of the timing valve device 328 and the fluid under pressure in this chamber 420 acts on the flexible diaphragm 416 to maintain the timing valve 417 seated on the seat rib 418.

Assuming, when the vehicle units of the train are coupled together, the tender draft rigging to be in its release or neutral position, the operating arm 302 of the valve device 8 on the tender will be in the position indicated by the dot and dash line marked "Neutral" in Figs. 23, 24 and 25 of the drawings and the cam 300 will be in its corresponding position. It will here be noted that with the train brake equipment fully charged and in release position, the roller 295 is maintained out of engagement with the cam 300.

Now when the locomotive and tender move forwardly as a unit, that is, in the direction toward the left hand, in setting the train in motion, the fixed parts of the tender move relative to the coupler 21 until such time as the cars of the train are in motion, the maximum relative movement being indicated by the dot and dash lines marked "Full draft" in Figs. 23, 24 and 25 of the drawings. As the parts of the tender thus move relative to the coupler 21, the spring 305 acts to maintain the arm 302 of the valve device so positioned that the roller 303 is in operative engagement with the lug 304 which is carried by the draft gear yoke 23, so that, as the control valve device 8 moves forwardly with the tender, a rotary movement, in a clockwise direction, is imparted to the cam 300. It will here be understood that while the train is in motion and the brakes released the distance between the tender and the first car of the train may increase and decrease and that, due to this, the position of the cam 300 will be adjusted according to such variations, but since the roller 295 of the valve device 8 is maintained out of the path of travel of the cam, movement will, in no way, control the locomotive brakes.

*Service application*

When it is desired to effect a service application of the brakes on a train, especially on a long train, the engineer, by the use of brake valve handle 129, first moves the rotary valve 127 to slack gathering and maintaining service position and leaves it in this position for a predetermined period of time, say for instance from twenty to twenty-five seconds, and then moves the rotary valve to service position.

As the brake valve handle is being moved toward the slack gathering and maintaining service position and just before the handle is in this position, the cam surface 135 of the cam 132 secured to the valve stem 128, engages the lug 144 of the member 142 and causes the member to rock about the pin 143 in a clockwise direction. The member 142, as it is thus rocked, acting through the medium of the valve stem 138, causes the exhaust valve 137 to be unseated against the opposing pressure of the spring 141. At substantially the same time as the rotary valve reaches the slack gathering and maintaining service position, the surface 134 of the cam engages the lug 144, so that the valve is maintained open. The surface 134 will also remain in contact with the lug 144 during movement of the rotary valve to lap, service and emergency positions. It will thus be seen that the exhaust valve 137 will be maintained unseated in every position of the rotary valve except release and running positions.

With the rotary valve 127 in slack gathering and maintaining service position, the communication from the rotary valve chamber 146 to the passage 448 leading to the brake pipe 1 and valve chamber 431 of the equalizing discharge valve device 18 is lapped so as to close off the flow of fluid from the rotary valve chamber to the brake pipe and valve chamber 431. With the rotary valve in this position, a cavity 530 in the rotary valve connects the passage 430 to the passage 493, said cavity having therein a restriction 531. The passage 430 leads from the equalizing reservoir 12 and piston chamber 428 of the equalizing discharge valve device 18 and the passage 493 leads to the reduction reservoir 13 by way of passage 492 in the plug valve 162, passage 491 and pipe 490, so that when the passages 430 and 493 are connected in the manner just described, fluid under pressure flows from the equalizing reservoir 12 and piston chamber 428 at substantially a service rate, as governed by the flow of fluid past the restriction 531, until such time as the equalizing reservoir pressure equalizes into the reduction reservoir, when the reduction in equalizing reservoir pressure continues at a slower rate, as governed by the flow of fluid from the reduction reservoir to the atmosphere, by way of a passage of small diameter in the choke plug 495. The reduction reservoir is of such a volume that, upon the substantial equalization of the pressures in the equalizing and reduction reservoirs, the equalizing reservoir pressure will have been reduced approximately five pounds and this reduction will be accomplished within a short period of time.

Further, with the rotary valve 127 in the slack gathering and maintaining service position, the port 487 in the rotary valve continues to establish communication from the rotary valve chamber 146 to the passage 532, so that the maintaining valve chamber 445, of the equalizing discharge valve device 18, is maintained charged with fluid at feed valve pressure.

Upon the reduction of the pressure of fluid in the piston chamber 428 of the equalizing discharge valve device 18, in the manner hereinbefore described, fluid at brake pipe pressure, in exhaust valve chamber 431, causes the equalizing discharge valve piston 425 to move to its extreme outer position, that is to say into sealing engagement with a gasket 534 which is clamped between the casing of the equalizing discharge valve device and the pedestal 119. As the piston is being thus moved, the stem 426 thereof causes the bell-crank lever, contained in the exhaust valve chamber 431, to rock on the pin 438 in a clockwise direction. As the lever is thus rocked, the arm 440 thereof engages the collar 436 and, through the medium of said collar and the exhaust valve stem 434, moves the exhaust valve 432 away from its seat. With the exhaust valve thus unseated, fluid under pressure is vented from the chamber 431 and consequently from the brake pipe 1 to the atmosphere by way of passage 433, the passage in a choke plug 535 which is interposed in the passage 433, exhaust valve chamber 136 in the brake valve device 2, past the unseated exhaust valve 137 and its fluted stem 138 and recess or passage 140.

Now when the pressure of fluid in the exhaust valve chamber 431 of the equalizing discharge valve device 18 has been reduced by the flow of fluid past the exhaust valve 432 to the atmosphere, to a point slightly less than the pressure of fluid in the piston chamber 428, fluid under pressure in this latter chamber causes the piston 425 to move inwardly toward its normal position of rest. As the piston 425 is thus being moved, the piston stem 426 causes the bell-crank lever to rock in a counter-clockwise direction on the pin 438. This movement of the lever causes the arm 440 to move in a direction away from the collar 436 carried by the exhaust valve stem 434 and upon such movement of the arm 440 the spring 437 acts to advance the exhaust valve 432 toward its seat and restrict the flow of fluid from the valve chamber 431 to the atmosphere. Now if the rate of reduction in the pressure of fluid in the exhaust valve chamber 431 does not exceed that of the reduction in the reduction reservoir pressure, by the flow of fluid through the small passage in the choke plug 495, the piston 425 will come to a stop and the flow of fluid from the chamber 431 and brake pipe 1 past the partially closed exhaust valve 432, to the atmosphere, will continue. In some cases, the piston may not come to a stop until after the exhaust valve has seated, but will operate to again unseat the valve when the pressure of fluid in piston chamber 428 is reduced to a point slightly less than the pressure of fluid in chamber 431.

If, due to brake pipe leakage, the pressure of fluid in exhaust valve chamber should be caused to reduce at a faster rate than the rate at which the pressure of fluid in piston chamber 428 of the equalizing discharge valve device 18 is being reduced by the flow of fluid from the reduction reservoir 13, through the small passage in the choke plug 495, fluid at the higher pressure in chamber 428, will cause the piston 425 to move inwardly, that is to say, in a direction toward the left hand, from its normal position. As the piston is thus moved, the stem 426 thereof causes the bell-crank lever to rock on the pin 438 in a counter-clockwise direction. When so rocked, the arm 439 engages the stem of the maintaining valve 444 and, through the medium of the stem, unseats the maintaining valve, so that fluid at feed valve pressure now flows from the valve chamber 445 to the exhaust valve chamber 431 and from thence flows to the brake pipe 1 by way of passage 448, passage 488 in the plug valve 163, passage 489 and pipe 455. By thus supplying fluid under pressure to the brake pipe, the brake pipe pressure will not be permitted to reduce at a faster rate than that at which the equalizing reservoir pressure is being reduced.

When, after the maintaining valve has been moved to supply fluid under pressure to the brake pipe 1, the brake pipe pressure in chamber 431 of the equalizing discharge valve device 18 becomes slightly greater than the equalizing reservoir pressure in piston chamber 428, fluid at the higher pressure in chamber 431 causes the piston 425 to move in a direction toward the right hand, causing the bell-crank lever, contained in exhaust valve chamber 431, to rock on the pin 438 in a clockwise direction, and as the lever is thus moved, the spring 447 causes the maintaining valve 444 to seat and close off the flow of fluid from the chamber 441 to the chamber 431 and brake pipe 1.

Upon effecting a reduction in brake pipe pressure in the manner just described, a corresponding reduction is effected in the pressure of fluid in the equalizing piston chamber 27 of the distributing valve device 4.

Upon reducing the equalizing piston chamber pressure, fluid under pressure in the equalizing valve chamber 29 causes the equalizing piston 25, and thereby the auxiliary slide valve 31, to move outwardly relative to the main slide valve 30. As the piston thus moves, it closes communication from the piston chamber 27 to valve chamber 29 by way of the feed groove 497. At substantially the same time as the piston closes the feed groove, the plunger 39, which is carried by the piston stem 26, is brought into contact with a rear end surface of the main slide valve 30. When the plunger is thus brought into contact with the main slide valve, the auxiliary slide valve 31, due to its movement relative to the main slide valve, will have disestablished the communication between the ports 510 and 511 in the main slide valve, and will have brought a port 540 in the auxiliary slide valve 31 into open communication with a port 541 in the main slide valve 30.

As the piston 25, piston stem 26, and auxiliary slide valve 31 continue to move outwardly relative to the main slide valve 30, the main slide valve prevents forward movement of the plunger 39, so that the piston stem, as it moves relative to the main slide valve and plunger, compresses the spring 40 until the shoulder 38 on the piston stem engages the rear end surface of the main slide valve 30.

When the shoulder 38 abuts the rear end of the main slide valve 30, the auxiliary slide valve will have uncovered the port 510 in the main slide valve, so that fluid under pressure flows from the valve chamber 29 and connected pressure chamber 35 to the reduction chamber 94 by way of said port, passage 95, valve chamber 80 of the reduction reservoir cut-off valve device 77, past the normally unseated valve 79, chamber 92 and passage 93.

By thus venting fluid under pressure from the valve chamber 29 and connected pressure chamber 35 to the reduction chamber 94 at the same time as the brake pipe pressure is being reduced in the piston chamber 27, the creation of a pressure differential on the piston 25, sufficient to cause the piston to move and shift the main slide valve, is prevented. This venting of fluid to the reduction chamber 94 continues until a predetermined pressure, say for instance about fifty pounds, is obtained in the reduction chamber 94 and chamber 92 of the reduction reservoir cut-off valve device 77. From the chamber 92 fluid under pressure flows through passage 91 in bushing 89 to chamber 90 at one side of the cut-off valve piston 83 and increases the pressure of fluid in the chamber as the pressure of fluid in the chamber 94 increases. Now, when fifty pounds pressure is obtained in the reduction chamber 94, fluid at the same pressure in chamber 90 moves the cut-off valve piston 83 to its extreme outer position against the opposing pressure of the spring 84.

As the cut-off valve piston 83 is being thus moved, the end of the stem thereof is moved away from the cut-off valve 79, permitting said valve to be seated on the rib 82 by the action of the spring 81. With the valve 79 seated, the further flow of fluid under pressure from the pressure chamber 35 and equalizing valve chamber 29 to the reduction chamber 94, is prevented.

The combined volumes of the pressure chamber 35 and equalizing valve chamber 29 and the volume of the reduction chamber 94 are so proportioned with relation to each other, that when a fluid pressure of fifty pounds is obtained in the reduction chamber, a reduction of approximately five pounds is effected in the pressure of fluid in the pressure chamber 35 and valve chamber 29, regardless of the pressure to which the pressure chamber is initially charged from the brake pipe. It will thus be seen that regardless of the normal degree of brake pipe pressure carried, the reduction reservoir cut-off valve device operates to limit the reduction in the pressure of fluid in the pressure chamber and equalizing valve chamber to about five pounds, which corresponds to the reduction in brake pipe pressure effected by the operation of the equalizing discharge valve device 18 upon the equalization of the pressure of the equalizing reservoir 12 into the reduction reservoir 13 and which also corresponds to the reduction required in the pressure of fluid in the auxiliary reservoir on a car for moving the brake cylinder piston on a car to brake applying position.

The equalization of the equalizing reservoir pressure into the reduction reservoir 13 is accomplished within a very short period of time after which, as hereinbefore described, the reduction in equalizing reservoir pressure will be at a slower rate as governed by the flow area of the passage in the choke plug 495, as long as the rotary valve 127 of the automatic brake valve device is in slack gathering and maintaining service position. Since the equalizing reservoir 12 continues to reduce at this slower rate, the equalizing discharge valve device 18 is caused to operate in the manner hereinbefore described to effect a correspondingly slow reduction in brake pipe pressure.

Upon the initiation of the reduction in brake pipe pressure which is effected upon the reduction of equalizing reservoir pressure into the reduction reservoir 13 at a service rate, a reduction in the pressures of fluid in the triple valve piston chamber 335 and in the emergency piston chamber 352 of the car apparatus is effected.

When the reduction in the triple valve piston chamber 335 is initiated, fluid at auxiliary reservoir pressure in triple valve chamber 340 causes the triple valve piston 336 to move outwardly in a direction toward the left hand, and the piston, through the medium of its stem 337, shifts the auxiliary slide valve 339 in the same direction relative to the main slide valve 338. As the auxiliary slide valve is thus shifted, it laps the port 523 in the main slide valve, thus closing the communication between the triple valve chamber 340 and the emergency reservoir 323. At substantially the same time as the port 523 is closed by the auxiliary slide valve 339, the triple valve piston 336 closes communication from the piston chamber 335 to the valve chamber 340 by way of the feed groove 522, so as to prevent back flow of fluid from the valve chamber to the piston chamber. After the communication through the feed groove is thus closed, the continued outward movement of the piston causes the auxiliary slide valve to uncover a service port 543 in the main slide valve 338, following which, the plunger 348 mounted in the rear end of the triple valve piston stem 337, engages the rear end surface 544 of the main slide valve. The further outward movement of the auxiliary slide valve 339 relative to the main slide valve by the piston 336, is now resisted by the spring 350 acting through the piston stem 337.

Now when a predetermined light reduction in brake pipe pressure has been effected, say for instance about one pound, a sufficient fluid pressure differential is created on the triple valve piston 336 to cause the piston and thereby the auxiliary slide valve 339 to move outwardly against the resistance offered by the spring 350 to initial quick service position.

In the initial quick service position of the auxiliary slide valve, a cavity 545 in the valve connects ports 546 and 547 in the main slide valve 338. The port 546 is in registration with a passage 548 with which the brake pipe 1 is normally in open communication by way of the strainer chamber 395 and a double check valve device 549 which may be of the same construction as the corresponding device fully shown and described in my aforementioned application Serial No. 612,465. The port 547 is in registration with a passage 550 leading to a quick service bulb 551 of small volume which is constantly open to the atmosphere through a passage 552 and a passage of smaller diameter in a choke plug 553. With the ports 546 and 547 thus in open communication with each other, fluid under pressure flows from the brake pipe 1 to the quick service bulb 551 and from thence fluid is permitted to flow by way of passage 552 and choke plug 553 to the atmosphere.

The initial local quick service flow of fluid from the brake pipe to the quick service bulb 551 is at a fast rate until the brake pipe pressure substantially equalizes into the bulb 551 and then continues at a slower rate as governed by the flow of fluid through the passage in the choke plug 553. The initial flow of fluid to the bulb 551 produces a sudden limited quick service reduction in pressure in the brake pipe 1 for hastening the operation of the triple valve device on the next car of a train. The triple valve device on said next car then operates in a similar manner, and in this way, a quick serial response to the brake pipe reduction is transmitted from one car to the next throughout the length of the train.

When the triple valve piston 336 and auxiliary slide valve 339 are in their initial quick service position, the front face of the lug 351 of the triple valve piston stem 337 engages the rear end face 544 of the main slide valve 338, so that upon further outward movement of the piston toward its application position, the main slide valve will be shifted in the same direction.

With the triple valve piston 336 and slide valves 338 and 339 in application position, that is to say, in their extreme outer position in which the piston seals against a gasket 554 clamped between the triple valve casing and the pipe bracket 332, the service port 543, in the main slide valve 338, which has been previously uncovered by the auxiliary slide valve 339, registers with a passage 376, so that fluid under pressure flows from the valve chamber 340 and the auxiliary reservoir 322 connected therewith, by way of the service port, passage 376, valve chamber 402 of the inshot valve device 327, past the normally unseated valve 401, passage 408, chamber 409, passage 410 and passage and pipe 411. Further, with the triple valve piston and triple valve slide valves in application position, fluid under pressure flows at a slow rate from the brake pipe to the brake cylinder by way of passage 548, a cavity 555 in the main slide valve 338, passage 382, choke plug 383 interposed in passage 382, past the ball check valve 384 in the quick service modifying valve device 325, valve chamber 378, communication 377, diaphragm chamber 374, passage 375 and passage 376 which, as hereinbefore described, is in communication with the brake cylinder 330.

On each car, when the brake cylinder pressure has been increased to about nine pounds, the diaphragm 370 of the quick service modifying valve device is flexed upwardly against the opposing pressure of the spring 371, permitting the spring 381 to act to seat the quick service modifying valve 379. With the valve thus seated, the quick service flow of fluid from the brake pipe to the brake cylinder 330 is closed off, so that the only reduction in brake pipe pressure which now takes place is that effected at a very slow rate by the operation of the equalizing discharge valve device 18. The reduction in the pressure of fluid in the valve chamber 340 of the triple valve device which is effected by the flow of fluid therefrom to the brake cylinder will be at a faster rate than the rate at which the brake pipe pressure is now being reduced. As the pressure of fluid in chamber 340 reduces, fluid at brake pipe pressure in piston chamber 335 together with the force of the compressed spring 350 causes the piston 336 and thereby the auxiliary slide valve 339 to slowly move from service position toward service lap position. As the valve 339 thus moves, it begins to close the service port 543 in the main slide valve 338 and continues to close this port until the rate of reduction in the chamber pressure is equal to the rate of reduction in brake pipe pressure, at which time the inward movement of the piston and slide valve will cease. In some instances the movement of the piston may be such as to cause the auxiliary slide valve 339 to completely close the service port, but when this occurs, the continued slow reduction in brake pipe pressure will again cause the piston and slide valve to move outwardly to again supply fluid to the brake cylinder. It will thus be seen that regardless of which of the two above mentioned ways the triple valve piston and auxiliary slide valve may operate, any increase in brake cylinder pressure above nine pounds will be at a very slow rate.

It will be evident from the foregoing description that by closing off the quick service flow of fluid from the brake pipe when the brake cylinder pressure has been increased to about nine pounds, a substantially uniform brake cylinder pressure is quickly obtained on each car of the train, thus ensuring the gentle gathering of the slack in the train. The reduction in brake pipe pressure which is effected through the medium of the equalizing discharge valve device 18, after the closing of the quick service modifying valve 379, is at such a slow rate that the increase in brake cylinder pressure resulting from this continued reduction will be so gradual that the slack in the train will continue to gently gather.

On the cars at the front end of the train the triple valve piston and slide valves move to application position at about the same time as the equalizing piston 25 and auxiliary slide valve 31 of the distributing valve device move to the position for venting fluid under pressure from the pressure chamber 35 and equalizing valve chamber 29.

It will be remembered that the reduction in equalizing reservoir pressure is being continued at a slow rate as governed by the flow of fluid from the reduction reservoir to the atmosphere by way of the passage in the choke plug 495, and that, due to this, the equalizing discharge valve device 18 continues to reduce the brake pipe pressure at a slow rate.

After the reduction reservoir cut-off valve device 77 functions to close communication from the pressure chamber 35 and equalizing valve chamber 29 to the reduction chamber 94, and when the brake pipe pressure in the piston chamber 27 is reduced by the quick service flow of fluid effected on the cars and by the slow venting of fluid by the equalizing discharge valve device below the reduced pressure in the equalizing valve chamber 29, the equalizing piston moves outwardly toward service position shifting the auxiliary slide valve 31 and main slide valve 32. As the main slide valve is thus moved, the port 541, to which the port 540 is in open communication, is moved into open communication with the passage 99, so that fluid under pressure now flows from the equalizing valve chamber 29 and connected pressure chamber 35 to the piston chamber 216 of the regulating valve mechanism 172 and to the diaphragm chamber 184 of the timing valve mechanism 170 by way of ports 540 and 541, passage 99, pipes 191 and 190, passage 187 in the plug valve 188 of the cock 189, pipe 186 and passage 185. From the passage 99 fluid under pressure also flows to the application chamber 117 by way of port 514 in the main slide valve 30, passage 515 and cavity 501 also in the main slide valve and passage 118.

When the quick service flow of fluid on the cars is closed off by the quick service modifying valve devices, the pressure of fluid in the equalizing chamber 27 of the distributing valve device, due to the reduction in the equalizing valve chamber pressure caused by the continued flow of fluid from the equalizing valve chamber to the piston chamber 216 and diaphragm chamber 184 of the regulating valve 172 and timing valve mechanism 170, respectively, will cause the equalizing piston and thereby the auxiliary slide valve 31 to move rearwardly relative to the main slide valve 30, and as the valve is thus moved it begins to close the port 541 in the main slide valve 30. Now when the flow of fluid from the valve chamber is at substantially the same rate as the flow of fluid from the brake pipe by way of the equalizing discharge valve, the piston and auxiliary slide valve will come to a stop and will remain in this position so long as the reduction in brake pipe pressure is not varied. Fluid under pressure thus supplied to the piston chamber 216 of the regulating valve mechanism 172 causes the piston 213 to move inwardly. It will be observed from Fig. 4 of the drawings, that since the supply valve 222 is seated, the pin 557, which pivotally connects the lever 219 and stem of the supply valve together, serves as a fulcrum for one end of the lever, so that as the piston 213 moves inwardly, the stem 214 thereof causes the lever to rock on the pin 557 in a clockwise direction, causing the exhaust valve 221 to seat and close communication from the valve chamber 217 to the atmosphere by way of passage 276. When the exhaust valve seats, the pin 556, which pivotally connects the lever 219 and stem of the exhaust valve together, serves as a fulcrum for the lever, so that as the piston continues to move inwardly, the piston stem causes the lever to rock on the pin 556 in a counter-clockwise direction so as to unseat the supply valve 222.

With the supply valve 222 unseated, fluid at main reservoir pressure flows by way of pipe and passage 224 and supply valve chamber 223 to the chamber 217 and from thence flows through passage 218, pipe 267, a restricted passage 607 in the casing of the check valve device 266 and pipe 264 to the pipe 255 and all of the passages, pipes and chambers with which the pipe 255 is in open communication, thus charging the communicating pipes and passages from the pipe 255 to the under side of the seated valve 281 of the control valve device 8 on the tender. From the passage 218 fluid under pressure also flows through the restricted passage 268, passage 257 and pipe 252 to the volume reservoir 256, and also to the application piston chamber 53 of the distributing valve device. The flow area of the restricted passage 607 is greater than that of the restricted passage 268 so that the communicating pipes and passages from the pipe 255 to the under side of the valve 281 is charged with fluid under pressure at a more rapid rate than that at which the volume reservoir and application piston chamber are being charged. Due to this, there will be no flow of fluid from the reservoir 256 and application piston chamber to the pipe 255 by way of the check valve 253, consequently the charging of the communication which extends from the check valve 253 to the valve 281 will not interfere with the rate of increase in the pressure of fluid in the reservoir and application piston chamber.

When the pressure of fluid in chamber 217 becomes substantially equal to the pressure of fluid in chamber 216, the spring 225 acts to move the piston 213 and thereby the supply valve 222 in a direction toward the left hand until the rate of flow of fluid past the valve 222 has been reduced to that at which fluid flows to the piston chamber 216, at which time the piston comes to a stop.

Fluid under pressure thus supplied to the piston chamber 53 causes the application piston 52 to move inwardly toward application position, the piston in its traverse, shifting the slide valve 61 so as to close the normally open communication from the valve chamber 56, and consequently from the brake cylinders 14 and 19, to the passage 518 leading to the atmosphere. After the slide valve 61 laps the passage 518, the end of the application piston stem 60 engages the end of the fluted stem 71 of the application pilot valve 72, and through the medium of the stem, unseats the valve against the resistance offered by the spring 73. Fluid under pressure supplied to the chamber 66 from the main reservoir 15 by way of pipe and passage 75, chamber 65 and the passage in the choke plug 481 now flows past the unseated pilot valve to the slide valve chamber 56 and from thence flows through passage 57 and pipe 58 to the brake cylinders 14 and 19. The flow of fluid past the pilot valve may be at a faster rate than fluid can flow from the chamber 65 to the chamber 66 through the passage in the choke plug 481, so that when the end of the piston stem 60 engages the bushing 70, only the spring 69 will offer resistance to the movement of the valve piston 63 to unseat the valve or gasket 68.

When, with the gasket 68 unseated, the flow of fluid from the chamber 56 to the brake cylinders is at substantially the same rate as fluid under pressure is supplied to the piston chamber 53, the piston 52 will come to a stop so that the flow of fluid to the brake cylinder will be at a slow rate as governed by the degree to which the valve 68 is opened. In case the rate of flow of fluid past the pilot valve is greater than the rate at which fluid is supplied to the piston chamber 53, the piston 52 will be automatically brought to a stop before the stem thereof can cause the valve piston to move from its normal seated position. In such a case the pilot valve alone will control the rate of flow of fluid to the brake cylinders.

When the pressure of fluid in the volume reservoir 256, application piston chamber 53 and in the chamber at the under side of the valve 260 of the blow down valve device 261 has been increased to a predetermined degree, the fluid under pressure in the valve chamber causes the valve 260 to move away from its seat against the resistance offered by the spring 263, so that pressure of fluid supplied to the volume reservoir 256 and application piston chamber 53 is prevented from increasing above said predetermined degree by flow past the valve 260 by way of pipe 252, passage 257, cavity 258 in the slide valve 207 of the timing mechanism 171, passage and pipe 259, the chamber at the under side of the valve 260, past the unseated valve 260, the blow down valve chamber and passage 262 in the casing of the blow down valve device.

Now when the pressure of fluid being supplied to the slide valve chamber 56 of the application portion of the distributing valve device and consequently to the brake cylinders 14 and 19 slightly exceeds the pressure of fluid in the piston chamber 53, the application piston 52 is caused to move outwardly relative to the slide valve 61, permitting the spring 69 to act to move the valve piston 63 to seat the gasket 68 and the spring 73 to seat the pilot valve 72, thus the flow of fluid to the brake cylinders 14 and 19 is cut off. When the valve 72 seats, the opposing pressures acting on the piston 52 will be substantially equal so that the piston will immediately come to a stop. Since this movement of the piston is relative to the slide valve 61, said valve will still lap the passage 518 leading to the atmosphere.

It will here be understood that the pressure developed in the locomotive and tender brake cylinders 14 and 19, respectively, at the time the pilot valve 72 seats, is just enough to insure the usual brake cylinder pistons (not shown) moving a sufficient distance to cause the usual locomotive and tender brake shoes to move either into contact with the locomotive and tender wheels or nearly so. When the brake shoes are moved into contact with the wheels, the brake cylinder pressure will be such that no material retardation of the locomotive and tender will result.

Fluid under pressure supplied to the pipe 58, besides flowing to the brake cylinders 14 and 19, also flows, through the branch pipe 313 of the tender apparatus, to the piston chamber 312 of the control valve device 8 and causes the piston 298 to move to its extreme inner position as shown in Figs. 24 and 25 of the drawings. As the piston is thus being moved, the stem 297 thereof, which is in operative engagement with one end of the lever 292, causes the lever to rock, in a clockwise direction, on the pin 293 which connects the lever to the carrier member 289. When the lever is being thus rocked, the other end thereof fulcrums on the stem 282 of the exhaust valve 281, so that the carrier member, through the medium of the lever and the pin 293, is rocked on the pin 290 in a counter-clockwise direction against the resistance of the spring 299, thus the roller 295, mounted on the pin 293, is moved into operative position with relation to the cam 300. It will be understood that the spring 286 is of such a value as to prevent the exhaust valve 281 from being unseated by the force required to actuate the lever to move the roller 295 toward the cam.

It will be apparent from the foregoing description, that by the time fluid under pressure is supplied to the locomotive and tender brake cylinders 14 and 19, respectively, and to the piston chamber 312 of the control valve device 8 on the tender, the brakes on the cars are being applied with sufficient force to initiate the retardation of the cars. Due to this and to the fact that the locomotive and tender brakes are not, as yet, applied with sufficient force to set up any appreciable retarding action, the inertia of the locomotive and tender will tend to maintain the tender draft rigging in approximately its full draft position. With the draft rigging in this position, the force of the spring 305 maintains the roller 303, mounted on the outer end portion of the cam operating arm 302, in operative contact with the lug 304 which is carried by the draft yoke 23. With the arm 302 in this position, the cam 300 will be in the position in which it is shown in Fig. 24 of the drawings.

As hereinbefore described, when the several parts of the equalizing portion of the distributing valve device are moved to application position, fluid under pressure is supplied to the piston chamber 216 of the regulating valve mechanism 172 and to the diaphragm chamber 184 of the timing valve mechanism 170. The operation of the regulating valve mechanism 172, under the influence of fluid under pressure supplied to the piston chamber 216, has just been described, and the operation of the timing valve mechanism 170, under the influence of fluid under pressure supplied to diaphragm chamber 184, to control the operation of the hold-back valve mechanism, will now be described in detail.

Fluid under pressure supplied to the diaphragm chamber 184 causes the diaphragm 182 to flex inwardly, that is to say, in a direction toward the right hand, shifting the follower member 192 to its extreme inner position. As the follower member is thus being moved it compresses the spring 195 and the spring as it is compressed, acting through the medium of the plunger 194, causes the exhaust valve 179 to be seated and the supply valve 173 to be unseated against the resistance offered by the spring 174. The valve 179, when it is seated, closes the atmospheric communication from the chamber 177 and connected timing reservoir 204 and diaphragm chamber 201 of the hold-back valve mechanism 171. With the supply valve 173 unseated, fluid under pressure supplied by the reducing valve device 11, through passage 120, pipe 272, choke plug 273 and passage 271, to the supply valve chamber 174, flows past the unseated supply valve and its fluted stem 176, passage 202 and pipe 203 to the timing reservoir 204. Fluid under pressure supplied to the passage 202 also flows to the diaphragm chamber 201 of the hold-back valve mechanism 171.

Now when the pressure of fluid in the diaphragm chamber 201 has been increased to a predetermined degree, the diaphragm 200 will flex inwardly, that is to say, in a direction toward the left hand, and will shift the stem or follower 208 and thereby the slide valve 207 to their extreme inner position against the resistance offered by the spring 211 which acts upon the inner end of the follower 208. The volume of the timing reservoir 204 and flow area of the passage in the choke plug 273 are so proportioned with relation to each other as to delay the build up of the operating fluid pressure in the diaphragm chamber 201 for a period of time of sufficient duration to have permitted the slack in the train to gather.

The valve 207 of the hold-back valve mechanism, in its extreme inner position, closes communication from the passage 257 to the passage 259, so that fluid under pressure is no longer permitted to flow from the passage 257. As a consequence, fluid under pressure supplied to the volume reservoir 256 and application piston chamber 53, by way of the restricted passage 268, passage 257 and pipe 52, will now increase the pressure in the volume reservoir and piston chamber 53. When the pressure of fluid in piston chamber 53 is increased to a degree slightly greater than fluid at brake cylinder pressure present in slide valve chamber 56, the application piston 52 is caused to move inwardly until the rate of flow of fluid to the brake cylinders 14 and 19 is substantially equal to the rate of flow of fluid to the piston chamber 53 as governed by the flow of fluid past the partially open supply valve 222 and through the restricted passage 268. Upon thus increasing the locomotive and tender brake cylinder pressure the brake cylinders 14 and 19 function to gradually apply the locomotive and tender brakes with an effective braking force.

If, with the locomotive and tender brakes applied, the deceleration of the locomotive and tender is at a faster rate than that of the cars of the train, the cars will, of course, tend to run in against the tender, shortening the distance between the front end of the first car and the rear end of the tender. When this occurs, the coupler 21 and draft yoke 23 of the draft rigging on the tender, move inwardly relative to the tender. Since the roller 303, carried by the operating arm 302 of the valve device 8 on the tender, is in operative engagement with the lug 304 carried by and movable with the draft yoke, the inward movement of the yoke causes the arm 302 to be moved inwardly and as the arm is thus moved it rotates the shaft 301 and thereby the cam 300 in a counter-clockwise direction.

As hereinbefore described, the carrier member 289, lever 292 and roller 295 of the valve device 8 have been moved to and are maintained in the position in which they are shown in Fig. 24, by the piston 298 which is subjected to fluid at brake cylinder pressure in piston chamber 312. When, with the roller 295 thus positioned, the roller 303 and cam operating arm 302 are moved inwardly, as above described, from the position indicated by the dot and dash lines marked "Full draft" in Figs. 23, 24 and 25, to the position indicated by the dot and dash lines marked "A", the surface 308 of the cam 300 is moved into engagement with the roller 295 and starts to force the roller inwardly causing the carrier member 289 to rock on the pin 290 in a clockwise direction. Since the piston stem 297 serves as a fulcrum for one end of the lever 292, the inward movement of the roller 295 also causes the lever 292 to move inwardly. The lever, as it is thus moved, acting through the medium of the valve stem 282, moves the valve 281 away from its seat. It will be noted that the valve 281 is not fully open until the surface 307 of the cam is moved into contact with the roller 295 as shown in Fig. 25 of the drawings, that is to say, until the roller 303 and cam operating arm are moved inwardly to the position as indicated by the dot and dash lines marked "B" in Figs. 23, 24 and 25. The surface 307 of the cam is of sufficient length to remain in engagement with the roller 295 to maintain the valve 281 fully open if the roller 303 and cam operating arm 302 should be moved inwardly beyond the line "B" to either the position indicated by the dot and dash lines marked "Neutral" or further inwardly to any buffing position.

With the valve 281 unseated, fluid under pressure is vented from the application piston chamber 53 and volume reservoir 256 to the atmosphere, the flow of fluid from the piston chamber being by way of passage 234, pipes 238 and 250, passage 251 in the plug valve of the cut-out cock 189, pipe 252, past the check valve 253, pipe and passage 255, chamber 249 of the valve mechanism 9, past the unseated valve 243, valve chamber 245, passage and pipe 246, passage 276 in the plug valve 277 of the angle cock device 278, valve chamber 275 in the valve device 8, past the unseated valve 281 and the fluted portion of its stem 282 and atmospheric recess or passage 285. Since the volume reservoir 256 is constantly open to the pipe 252, the pressure of fluid in this reservoir will reduce with the pressure of fluid in the application piston chamber by way of the unseated valve 281.

Since the chamber 217 of the regulating valve mechanism 172 is in open communication with the pipe 255 by way of passage 218, pipe 267, passage 607 in the casing of the check valve device 266 and pipe 264, fluid under pressure will flow from the chamber when the valve 281 is unseated. The passage 607 has a greater flow area than the restricted passage 268 so that there will be very little or no flow of fluid from the chamber 217 to the pipe 252, consequently the reduction in the pressure of fluid in the chamber 53 and volume reservoir 256 will not be retarded.

When the pressure of fluid in the application piston chamber 53 of the distributing valve device has been reduced to a degree slightly less than the pressure of fluid in the valve chamber 56, fluid under pressure in chamber 56 causes the application piston 52 to move outwardly, that is to say, in a direction toward the left hand, permitting the valve device 62 to operate to close off the flow of fluid from the chamber 65 to the chamber 56, after which, the continued outward movement of the piston 52 causes the slide valve 61 to be shifted to a position in which it opens communication from valve chamber 56 to the passage 518 leading to the atmosphere. Fluid under pressure now flows from the locomotive and tender brake cylinders 14 and 19 respectively, through pipe and passage 58, passage 57, valve chamber 56 and passage 518. This venting of fluid under pressure from the brake cylinders 14 and 19 results in the relief of braking force on the locomotive and tender, the degree of relief depending upon the length of time the valve 281 is maintained unseated.

If, with the braking force of the locomotive and tender brakes relieved in the manner just described, the locomotive and tender should tend to exert a pull on the cars of the train, the tender will move forwardly relative to the coupler 21 and draft yoke 23, and due to such movement, the cam 300 will be rotated, through the medium of the operating arm 302 and spring 305, in a clockwise direction for a distance proportionate to the relative movement between the tender and draft yoke. If, for instance, the movement of the draft yoke is such that the roller 303 and cam operating arm 302 move to a position between the line marked "A" and the line marked "Full draft", the cam will be moved out of operative engagement with the roller 295 and the spring 286 will act to seat the valve 281, and thus close off the further flow of fluid from the application piston chamber 53 and the volume reservoir 256.

With the valve 281 of the valve device 8 seated, the continued flow of fluid at main reservoir pressure from the chamber 217 of the regulating valve mechanism 172, by way of restricted passage 268, to the pipe 252 and consequently to the application piston chamber 53 and volume reservoir 256, increases the pressure in said piston chamber and reservoir. When the pressure of fluid in chamber 53 is thus increased to a degree slightly greater than fluid at brake cylinder pressure in slide valve chamber 56, the application piston 52 will again be moved inwardly first shifting the slide valve 61 to a position to close off the flow of fluid from the brake cylinders 14 and 19 to the atmosphere, and then actuating the valve device 62 to again supply fluid under pressure to the brake cylinders to increase the braking force on the locomotive and tender.

When the rotary valve 127 of the automatic brake valve device has been in slack gathering and maintaining service position for about twenty-five seconds, the engineer will know that the slack in the train has gathered and, to hasten the service application of the brakes will now move the rotary valve through lap position to service position. When the desired brake cylinder pressure is obtained on the train, the rotary valve is moved to lap position.

The rotary valve 127, as it is moved from slack gathering and maintaining service position toward service position, disestablishes all of the communications which it established in the slack gathering and maintaining position, and in service position, a cavity 600 connects the passage 430 to the passage 485 leading to the atmosphere so that fluid under pressure is vented from the equalizing reservoir 12 and piston chamber 428 of the equalizing discharge valve device 18 at a service rate, as governed by a restriction 601 in the cavity 600.

Upon the reduction of the pressure of fluid in the piston chamber 428 resulting from the flow of fluid therefrom in the manner just described, fluid at brake pipe pressure in the exhaust valve chamber 431 causes the equalizing discharge valve piston 425 to move to its extreme outer position, that is to say, into sealing engagement with the gasket 534 and as the piston is thus moved it causes the exhaust valve 432 to be moved from its seat in the same manner as has heretofore been described in connection with the initial slack gathering service application of the brakes, so that fluid under pressure is vented from the chamber 431 and consequently from the brake pipe 1 to the atmosphere by way of passage 433, the passage in the choke plug 535, exhaust valve chamber 136 in the automatic brake valve device 2, past the unseated exhaust valve 137 and its fluted stem 138 and recess or passage 140, the flow area of the passage in the choke plug 535 being such as to insure the reduction in brake pipe pressure at a service rate.

When the brake pipe pressure is thus reduced at a service rate, the equalizing piston 25 of the distributing valve device is caused to move to its full service position in which the port 541 in the main slide valve 30 is in full registration with the port 99, consequently the rate of flow of fluid from the valve chamber 29 to the piston chamber 216 of the regulating valve mechanism 172 is increased.

With the rate of flow of fluid to the piston chamber 216 thus increased the piston 213 will be moved inwardly, that is to say, in a direction toward the right hand, moving the supply valve 222 further from its seat. The rate of flow of fluid from the chamber 217 to the volume reservoir 256 and application piston chamber 53 is now governed by the restricted passage 268 and is at a faster rate than when the rate was governed by the supply valve 222.

Upon thus increasing the rate of flow of fluid of fluid to the application piston chamber 53, the piston 52 is caused to move to its extreme inner position, actuating the valve device 62 to its full open position, so that the flow of fluid from the main reservoir to the brake cylinders 14 and 19 will be increased to the usual rate.

On each car, when the reduction in brake pipe pressure is increased to a service rate, the triple valve piston 336 and thereby the auxiliary slide valve 339 are caused to move to their extreme outer position, in which the service port 543 is fully open to the valve chamber 340, so that the rate of flow of fluid to the car brake cylinder 330 is increased to the usual rate.

In effecting a service application of the brakes, the degree of the application depends upon the degree of reduction in brake pipe pressure, the maximum application being obtained if a full service reduction in brake pipe pressure is effected. If less than a full service application of the brakes is desired the rotary valve 127 of the brake valve device 2 is moved from service position to lap position when the desired reduction in brake pipe pressure has been effected. The rotary valve in lap position closes the communication from the passage 430 to the passage 485, so that fluid under pressure no longer flows from the equalizing reservoir 12 and piston chamber 428 of the equalizing discharge valve device 18. Now when the brake pipe pressure present in chamber 431 of the equalizing discharge valve device reduces, by flow of fluid past the unseated valve 432 to the atmosphere, to a point slightly below the pressure of fluid in the valve chamber 428, the piston 425 will move inwardly, that is to say, in a direction toward the left hand, and through the medium of the piston stem 426, actuates the bell-crank lever contained in valve chamber 431 to permit the spring 437 to act to seat the valve 432, thus closing off the further flow of fluid from the brake pipe to the atmosphere. When the valve 432 closes, the pressures on opposite sides of the piston 425 will be substantially equal so that the piston and bell-crank lever will both come to a stop in the position in which they are shown in Fig. 3.

When, after the valve 432 of the equalizing discharge valve device is closed, the pressure of fluid in the equalizing valve chamber 29 is reduced, by the flow of fluid therefrom to the chamber 117 and chambers 216 and 184 of the regulating valve mechanism 172 and timing valve mechanism 170, respectively, to a degree slightly below the reduced brake pipe pressure in piston chamber 27, the equalizing piston 25 is caused to move in a direction toward the left hand to lap position, the piston shifting the auxiliary slide valve so as to lap the service port 541 through the main slide valve 30, and thereby cutting off the supply of fluid under pressure to the chambers 117, 216 and 184. When the auxiliary slide valve closes the port 541, the pressures of fluid on opposite sides of the piston 25 will be substantially equal, and as a consequence, the piston and thereby the auxiliary slide valve will come to a stop without the piston acting to move the main slide valve 30.

Now, when the pressure of fluid in the piston chamber 216 of the regulating valve mechanism 172, together with the pressure of the spring 225, slightly exceeds the pressure of fluid in the piston chamber 216, the piston 213 will be caused to move in a direction toward the left hand, seating the valve 222 and thus closing off the flow of fluid from the main reservoir to the valve chamber 217 and consequently to the connected volume reservoir 256 and application piston chamber 53 of the distributing valve device. When the valve 222 seats, the forces acting on opposite sides of the piston 213 will be substantially equal and due to this the exhaust valve 221 will remain seated, so that fluid under pressure in valve chamber 217, volume reservoir 256 and application piston chamber 53 is bottled up.

Fluid under pressure being supplied to the locomotive and tender brake cylinders 14 and 19 respectively, by the application portion of the distributing valve device through passage 57 and pipe 58 also flows through the passage in the choke plug 59 to the chamber 54, and when the pressure of fluid in this chamber acting on the inner face of the application piston 52, plus the pressure of fluid in the valve chamber 56 acting on one side of the baffle piston 55, becomes slightly greater than the pressure of fluid in chamber 53 acting on the outer face of the application piston 52, said application piston is moved relative to the slide valve 61 in a direction toward the left hand to lap position. As the piston thus moves, the spring 69 acts to move the valve piston 63 into engagement with the seat rib 67, following which, spring 73 seats the pilot valve 72, the seating of both valves closing off the supply of fluid under pressure to the brake cylinders 14 and 19. When the supply of fluid to the valve chamber 56 is thus closed off, the piston comes to a stop in lap position without having moved the valve 61 out of lapping relation with the atmospheric passage 518.

On each car of the train, when the auxiliary reservoir pressure is reduced by the flow of fluid therefrom to the brake cylinder 330 to substantially the reduced brake pipe pressure in the triple valve piston chamber 335, the stabilizing mechanism carried by the piston stem 337 and cooperating with the main slide valve 338 causes the triple valve piston 336 and thereby the auxiliary slide valve 339 to move to lap position in which the auxiliary slide valve laps the service port 543 and thus closes off the further flow of fluid to the brake cylinder.

If less than a full service application of the brakes has been effected, a further reduction in brake pipe pressure will cause the several parts and devices of the locomotive tender and car brake equipment to move from lap position to service position to increase the brake cylinder pressure.

With the rotary valve 127 of the automatic brake valve device 2 in either service position or lap position, the control valve device 8 on the tender and the regulating valve mechanism 172 will function, in substantially the same manner as hereinbefore described, to control the operation of the application portion of the distributing valve device to vary the braking force on the locomotive and tender according to longitudinal movement of the tender and first car of the train relative to each other.

In handling a railway train it may be desired while recharging the brake pipe in effecting a release of the brakes to reapply the brakes before the brake pipe is fully charged. In releasing the brakes, the brake pipe pressure on the front end of the train is quickly restored to substantially the pressure normally carried, while at the rear end of the train, the increase in brake pipe pressure will be at a slower rate. Thus during the recharging of the brake pipe the brake pipe pressure at the front end of the train will be considerably higher than at the rear end. Obviously this difference in pressures will be greater than when the brake pipe is fully charged, for when the brake pipe is fully charged the pressure of fluid equalizes toward the rear of the train. Due to this difference in pressures the flow of fluid toward the rear of the train will be at a rapid rate. Now, if the brake pipe pressure is reduced in two stages by first moving the rotary valve to slack gathering and maintaining position and then to service position, the triple valve device on each car, due to the quick service venting of fluid from the brake pipe and to the operation of the quick service modifying valve device 325, will move to application position and a ten pound brake cylinder pressure will be obtained as will be understood from the foregoing description, consequently the auxiliary reservoir pressure will be reduced to the same extent as the brake pipe pressure is reduced. The quick service reduction in brake pipe pressure does not materially change the difference in brake pipe pressures between the front and rear ends of the train, so that there may be a continued rapid flow of fluid from the front to the rear end of the train, which flow, if not prevented or checked to some extent will increase the brake pipe pressure at the rear end of the train over the reduced auxiliary reservoir pressure at the rear end of the train and cause the triple valve devices to move to release position and thereby effect an undesired release of the brakes. If the reduction in brake pipe pressure were not continued after the equalization of equalizing reservoir pressure into the reduction limiting reservoir 13, the above undesired release of the brakes is liable to occur, but due to the continued reduction in brake pipe pressure by way of the choke 495 in the reduction reservoir 13 the brake pipe pressure at the head end of the train is reduced sufficiently to slow down the flow of fluid toward the rear of the train, so that the increase in brake pipe pressure at the rear end of the train is checked or limited to such an extent that the brake pipe pressure will not be sufficient to cause the triple valve devices to move to release position.

*Release of the brakes after a service application*

To initiate a release of the brakes the rotary valve 127 of the automatic brake valve device 2 may be turned to release position in which fluid under pressure is supplied from the main reservoir to the brake pipe 1 and then after a predetermined interval of time has elapsed, the rotary valve 127 is turned to running position in which fluid at feed valve pressure is supplied to the brake pipe, the course of the flow of fluid in each position being substantially the same as hereinbefore traced in connection with the initial charging of the equipment.

The initial supply of fluid at high pressure to the brake pipe rapidly increases the brake pipe pressure on the locomotive and on the cars at the head end of the train, and on the locomotive and some of the front cars of the train, the brake pipe pressure may be increased to that carried in the main reservoir. This high head of pressure at the front end of the train is adapted to cause a rapid flow of fluid under pressure toward the rear end of the train, so as to accelerate the release of the brakes and the charging of the brake equipment on the cars at the rear end of the train.

The rapid increase in brake pipe pressure on the locomotive creates a sufficient fluid pressure differential on the equalizing piston 25 to cause said piston and thereby the equalizing slide valves 30 and 31 to move to their innermost release position in which the piston seats on the gasket 498.

With the piston in this position, fluid supplied from the brake pipe 1 to the piston chamber 27 flows through the feed groove 497, the passage in the choke plug 499 and passage 500 to the valve chamber 29 and pressure chamber 35. The rate of flow of fluid through the feed groove 497 and the passage in the choke plug 499 is so retarded as to prevent the valve chamber 29 and pressure chamber 35 from becoming charged to a pressure higher than that normally carried in the brake pipe.

When the rotary valve 127 of the automatic brake valve device 2 is turned from release position to running position, the pressure of fluid in the brake pipe and equalizing piston chamber 27 reduces, due to equalization toward the rear of the train, to that of the fluid supplied by the feed valve device 10, and when the brake pipe pressure is thus reduced, the spring 42, carried by the equalizing piston stem 26 and which has been compressed as the equalizing piston moved to its innermost position, acts to move the equalizing piston and thereby the auxiliary slide valve 31 outwardly from the inner release position to the normal release position. The main slide valve 30 remains in its inner release position while the piston and auxiliary slide valve move to normal release position. The same communications are maintained through both slide valves 30 and 31 in either the inner or normal release position, so that the functioning of the valves in effecting a service application of the brakes is the same as hereinbefore described.

With the equalizing slide valves 30 and 31 in either the inner or normal release position, the passage 95, which is in open communication with the valve chamber 80 in the reduction reservoir cut-off valve device, is open to the atmosphere through port 510 in the main slide valve 30, cavity 511 in the auxiliary slide valve 31, port and cavity 512 in the main slide valve and passage 513, so that fluid is vented from said valve chamber which permits fluid in chamber 92, which is at reduction reservoir pressure, to unseat the poppet valve 79. Fluid under pressure now flows from the chamber 92 and reduction reservoir 94 to the atmosphere by way of chamber 80, passage 95 and the atmospheric communication established by the slide valves. When the reduction reservoir pressure in chamber 92, acting on the piston 83, is reduced below the opposing force of the compressed spring 84, said spring acts to move the piston to its normal release position. With the piston in this position, the stem thereof maintains the poppet valve 79 unseated as shown in Fig. 4, so as to permit the complete release of fluid under pressure from the reduction reservoir 94.

It will here be noted that with the rotary valve 127 of the automatic brake valve device 2 in release position and the equalizing portion of the distributing valve device in either the inner or normal release position, the piston chamber 216 of the regulating valve mechanism and diaphragm chamber 184 of the timing valve mechanism 170 are connected to an exhaust passage 610 in the casing of the automatic brake valve device which is closed by a plug 611 having screw-threaded connection with the casing. The connection from said chambers to the passage 610 being by way of passage 185, pipe 186, passage 187 in the plug valve 188 of the cut-out cock 189, pipes 190 and 191, passage 99, port 514 in the main slide valve 31 of the distributing valve device, passage valve 31 of the distributing valve device, passage 515 and cavity 501 in the slide valve 31, passage 502, choke plug 503, passage and pipe 104, passage 504 in the brake valve pedestal 119, cavity 506 in the rotary valve 167 of the independent brake valve device 3, passage 507 and a cavity 612 in the rotary valve 127 of the automatic brake valve device 2. Since the passage 610 is closed, fluid under pressure in the piston chamber 216 and diaphragm chamber 184 will be bottled up, and as a consequence the regulating valve mechanism 172 and timing valve mechanism 170 will not be permitted to move to their normal positions. With the regulating valve mechanism thus maintained out of its normal position, fluid under pressure in the application piston chamber cannot be vented except through the operation of the control valve device 8 on the tender, consequently the application portion of the distributing valve device cannot move to brake releasing position, so that the locomotive and tender brakes are maintained applied while the brakes on the cars are being released.

With the rotary valve 127 of the automatic brake valve device 2 in release position, the rapid increase in brake pipe pressure on the cars at the front end of the train creates a pressure differential on the triple valve piston 336 which causes the piston and thereby the slide valves 338 and 339 to promptly move to their outer release position, in which position the collar 351 on the piston stem 337 engages the movable stop member 315. With the triple valve piston in its normal or outer release position, the feed groove 522 is open from the piston chamber 335 to the valve chamber 340, so that fluid under pressure supplied from the brake pipe to the piston chamber is permitted to flow to the valve chamber, but the flow capacity of this feed groove is not great enough to permit fluid to flow therethrough at as fast a rate as fluid is supplied to the piston chamber on cars at the head end of the train, consequently a sufficient pressure differential is created on the piston to cause the piston and thereby the slide valves 338 and 339 to move to the inner release position against the opposing pressure of the spring 342.

In either the outer or inner release position of the triple valve parts, fluid under pressure is supplied at a restricted rate from the triple valve piston chamber 335 through feed groove 522 to the valve chamber 340 and connected auxiliary reservoir 322. Fluid under pressure is also supplied to the chamber 340 and auxiliary reservoir from the fully charged emergency reservoir 323 by way of pipe and passage 524 and restricted port 523 in the main slide valve which has been uncovered by the auxiliary slide valve 339. Due to the rstricting of the flow of fluid from the brake pipe to the auxiliary reservoir and to the supply of fluid from the emergency reservoir to the auxiliary reservoir, the amount of fluid taken from the brake pipe will not be great, and for this reason, more fluid will flow toward the rear of the train than would otherwise be the case, thus the charging of the brake pipe on the cars at the rear end of the train is hastened.

The restricted port 523 in the main slide valve limits the rate at which fluid flows from the emergency reservoir 323 to the auxiliary reservoir 322 to such an extent that, after the automatic brake valve device 2 is moved from release to running position and the brake pipe pressure on the cars at the front end of the train drops to or below that supplied by the feed valve device 10, the auxiliary reservoir pressure in valve chamber 340 will be less than the brake pipe pressure in piston chamber 335, so that unintentional movement of the triple valve parts from a release position to quick service or service position, in releasing the brakes, is prevented. In this connection, it will also be understood that the feed groove 522 is preferably of small capacity, so that with the triple valve piston in either the inner or outer release position, the rate of charge from the brake pipe to the valve chamber 340 and the connected auxiliary reservoir is relatively low, being substantially equivalent, in feeding capacity, of the restricted recharge port in brake mechanisms heretofore in use. This slow rate of flow through the feed groove of the triple valve device is of particular advantage in the present mechanism, which is primarily intended to make possible the operation of much longer trains than heretofore, since it tends to prevent overcharge of the brake mechanisms at the head end of the train and to facilitate the release and recharge of the brake mechanisms toward the rear of the train.

With the triple valve parts in either the outer or inner release position, the cavity 526 in the triple valve main slide valve 338 connects the passage 376 to the passage 527, so that fluid under pressure is released from the brake cylinder by way of pipe and passage 411, passage 410, chamber 409 of the inshot valve device 327, passage 408, past the open inshot valve 401, inshot valve chamber 402, passage 376, cavity 526, passage and pipe 527 and retaining valve device 331.

The flow area of the choke 360 which is interposed between the emergency piston chamber 352 and the passage 358 is so small that in releasing the brakes, the initial high brake pipe pressure at the head end of the train creates a sufficient pressure differential on the emergency piston 353 to cause the piston and thereby the emergency slide valves 355 and 356 to move to their extreme inner position. This operation of the emergency valve device has no effect upon the release of the brakes after service applications and is in fact merely incidental.

The volume of the quick action chamber 359 and the connected emergency slide valve chamber 357 is not great, and even though the choke 360 is small there would be a possibility, on cars at the head end of the train, of said chambers being charged to a pressure greater than that normally carried in the brake pipe, in which case the emergency valve device would tend to operate to effect an undesired emergency application of the brakes when the brake pipe pressure reduces to normal upon movement of the rotary valve 127 of the automatic brake valve device 2 to running position. In order to prevent the chambers from becoming overcharged, the emergency valve chamber 357 is connected to the emergency reservoir 323 through a passage 613, past check valves 614 and 615, a passage 616 and passage and pipe 524. This prevents the pressure of fluid in said chambers from ever exceeding emergency reservoir pressure which at no time becomes higher than the brake pipe pressure normally carried.

*Operation of the release insuring value device*

When in releasing the brakes the brake pipe pressure exceeds auxiliary reservoir pressure by a predetermined amount, say for instance about one and one-half pounds, the release insuring value device 549 operates to vent fluid under pressure from the auxiliary reservoir by way of a passage 617, the passage in a choke plug 618 interposed in the passage 617, cavity 526 in the main slide valve 338 of the triple valve device, passage and pipe 527 and retaining valve device 331. The triple valve piston 336 and slide valves 338 and 339 are intended to move from application position to release position when the brake pipe pressure exceeds the auxiliary reservoir pressure in valve chamber 340 by about one and one-quarter pounds, so that the main slide valve will lap the passage 617 before the release insuring valve device is operated, thus preventing the release of fluid under pressure from the auxiliary reservoir. If, however, a greater pressure differential is required to move the triple valve parts out of application position than is required to cause the release insuring valve device to operate, said release insuring valve device will function to vent fluid under pressure from the auxiliary reservoir as hereinbefore described.

On the cars toward the rear end of the train where the rate of increase in brake pipe pressure will be slow, the triple valve parts have a tendency to be delayed in their movement from application toward release position, and in some cases, may have a tendency to remain in application position. However, these objectionable tendencies will be eliminated, for where the rise in brake pipe pressure above the auxiliary reservoir pressure exceeds the desired amount, fluid under pressure will be vented from the auxiliary reservoir by the release insuring valve device until a sufficient differential is created on the triple valve piston 336 to cause it to move the main slide valve 338 toward release position and into lapping relation with the pasage 618, when the further venting of fluid from the auxiliary reservoir is cut off. The advantage of this release insuring valve device will be readily appreciated if it be kept in mind that the release of the brakes, especially at the rear end of a long train, has been one of the greatest difficulties in railroad operation up to the present time.

The release insuring valve device may be identical with the release insuring valve device shown and described in detail in my aforementioned application Serial No. 612,465 and for this reason a detailed description here of the device is deemed unnecessary.

*Operation of the locomotive and tender equipment when the automatic brake valve device is moved from release to running position*

When the rotary valve 127 of the automatic brake valve device is moved from release to running position, the cavity 508 therein connects the passage 507 to the atmospheric passage 485, and since pipe 104 is in open communication with the passage 507, and the several parts of the equalizing portion of the distributing valve device are in release position as before described, fluid under pressure which has been bottled up in the piston chamber 216 of the regulating valve mechanism 172 and diaphragm chamber 184 of the timing valve mechanism 170, now flows to the atmosphere through passage 185, pipe 186, passage 187 in the plug valve of the cock 189, pipes 190 and 191, passage 99, port 514 in the main slide valve 30 of the equalizing portion of the distributing valve device, passage 515 and cavity 501 also in the slide valve 30, passage 502, choke plug 503 and passage and pipe 104.

With the chamber 216 thus vented fluid under pressure in chamber 217 causes the regulating piston 213 to move to its extreme outer position and the spring 225 acts to hold it in this position. With the piston 213 in its outer position the supply valve 222 is seated and the exhaust valve 221 is unseated, so that fluid under pressure in the application piston chamber is vented to the atmosphere by way of passage 234, pipes 238 and 250, passage 251 in the plug valve of the cock 189, pipe 252, past the check valve 253 of the check valve device 254, through pipes 255 and 264, past the check valve 265, through pipe 267, passage 218, chamber 217, past the open exhaust valve 221 and finally through passage 268. Since the volume reservoir 256 is connected in open communication with the pipe 252, fluid under pressure is also vented therefrom to the atmosphere.

With the application piston chamber 53 thus vented, fluid at brake cylinder pressure in the chambers 54 and 56 causes the application piston 52 and thereby the slide valve 61 to move to their release position in which fluid under pressure is vented from the brake cylinders 14 and 19 through pipe and passage 58, passage 57, chamber 56 and passage 518, the latter passage having been uncovered by the slide valve 61 in its traverse to release position. Thus the release of the locomotive and tender brakes is effected.

When the brake cylinders 14 and 19 are thus connected to the atmosphere, fluid under pressure in the piston chamber 312 of the valve device 8 on the tender flows to the atmosphere with fluid under pressure from the brake cylinders. By reason of this the force of the spring 311 causes the piston 298 to be shifted to its normal position, said piston as it is thus moved permitting the carrier 291 and lever 292 to be returned to their normal position by the action of the spring 299.

Upon the venting of fluid under pressure from the diaphragm chamber 184 of the timing valve mechanism, the force of the spring 195 will cause the follower 183 to move outwardly to its normal position, permitting the spring 175 to act to seat the valve 173 and to unseat the valve 179.

With the valve 173 seated, the flow of fluid at feed valve pressure from the chamber 174 to the hold-back diaphragm chamber 201 and timing reservoir 204 is closed off, and with the valve 179 unseated fluid under pressure is vented from the timing reservoir 204 and hold-back diaphragm chamber 201 to the atmosphere by way of passage 202, chamber 177, valve chamber 188 and passage 181.

With the hold-back diaphragm chamber 201 thus vented, the force of the spring 211 causes the follower 208 and thereby the slide valve 207 to move to their outermost or normal position in which the cavity 258 in the slide valve again connects the passage 257 to the passage 239.

On some railroads it is desired to initiate the release of both the locomotive and car brakes when the brake valve device is moved to release position, and when such is the case, the plug 611 is removed from the casing of the automatic brake valve device, so that when the brake valve device is moved to release position, fluid under pressure is vented from the piston chamber 216 of the regulating valve mechanism and from the diaphragm chamber 184 of the timing valve mechanism with the result that the locomotive brakes are released in substantially the same manner as when the brake valve device is in running position.

*Emergency application of the brakes*

When it is desired to effect an emergency application of the brakes, the rotary valve 127 of the automatic brake valve device 2 is moved to emergency position, in which position the cavity 600 connects the passage 430 to the passage 485 and the cavity 494 connects the passage 448 to the passage 485. With these connections made, fluid under pressure is vented from the chambers 428 and 431 on opposite sides of the equalizing discharge valve piston 425, the flow of fluid from the chamber 428 being by way of passage 430 and the flow of fluid from the chamber 431 being by way of passage 448. Since both chambers are connected to the atmosphere, the equalizing discharge valve device will not function to vent fluid under pressure from the brake pipe.

With the rotary valve in emergency position, the cavity 483 establishes communication from the passage 482 to the passage 461, so that fluid under pressure from the main reservoir 15 flows to the chamber 459 of the quick action vent valve device by way of pipe 75, passages 155 and 482, cavity 483, passage 461 and pipe 460. Fluid under pressure thus supplied to the piston chamber 459 causes the piston 451 to move to its extreme inner position, unseating the vent valve 453 against the resistance offered by the spring 458. Fluid under pressure now flows at an emergency rate from the brake pipe to the atmosphere by way of pipe 455, pipe and passage 456, valve chamber 454, past the unseated vent valve 453 and passage 457, thus effecting a sudden reduction in brake pipe pressure.

Further, with the rotary valve in emergency position, the port 487 registers with a passage 619 which is open to the pipe 190 and consequently to the piston chamber 216 of the regulating valve mechanism 172 and diaphragm chamber 184 of the timing valve mechanism 170 by way of a pipe 620, past the check valve 621 of a check valve device 622 and a pipe 623.

Upon the sudden reduction in brake pipe pressure a reduction in the pressure of fluid in the equalizing piston chamber 27 of the distributing valve device is effected, so that fluid under pressure in valve chamber 29 causes the equalizing piston 25 and thereby the slide valves 30 and 31 to move from release position to emergency position, in which latter position the piston 25 engages the gasket at the outer end of the piston chamber 27.

In the emergency position of the main slide valve 30, fluid under pressure is permitted to flow from valve chamber 29 and pressure chamber 35 through an emergency port 625 in the main slide valve to passage 99 and from thence to the piston chamber 216 of the regulating valve mechanism 172 and diaphragm chamber 184 of the timing valve mechanism 170, causing the regulating valve mechanism to operate to supply fluid under pressure to the application piston chamber 52 and volume reservoir 256 and also causing the timing valve mechanism to operate to supply fluid at feed valve pressure to the diaphragm chamber 201 of the hold-back valve mechanism 171 and to the timing reservoir 204. Fluid under pressure supplied to the chamber 201 causes the several parts of the hold-back valve mechanism to move to close the communication from the passage 257 to the passage 239 when a predetermined pressure has been obtained in said chamber and timing reservoir.

Fluid under pressure supplied to the application piston chamber 53 and volume reservoir 256 causes the application portion of the distributing valve device to operate to supply fluid under pressure to the brake cylinders 14 and 19. When the pressure of fluid in the application piston chamber has been increased sufficiently to cause the piston 52 to move to application position, the check valve 260 of the check valve device 261 will be caused to move from its seat and permit fluid under pressure supplied by the regulating valve mechanism 172 to flow to the atmosphere, thus preventing any further increase in the pressure of fluid in the piston chamber 53. Upon the check valve 260 functioning to prevent the further increase in the pressure of fluid in the piston chamber 53, fluid at brake cylinder pressure in chambers 54 and 56 causes the application piston 52 to move to lap position, permitting the valve device 62 to operate to close off the further flow of fluid from the main reservoir to the brake cylinders 14 and 19. When however the hold-back valve mechanism operates to close the communication from the passage 257 to the passage 239 leading to the check valve device 261, the pressure of fluid in the piston chamber will, as a consequence, be increased at a rate governed by the flow of fluid through the restricted passage 268. Upon thus increasing the pressure of fluid in the application piston chamber, the piston 52 is caused to move to its application position and as a consequence fluid under pressure is supplied to the brake cylinders to apply the brakes with an effective braking force. The rate of increase in brake cylinder pressure will be governed according to the rate of increase in the pressure of fluid in the application piston chamber 53 as controlled by the flow of fluid through the restricted passage 268.

The main slide valve 30 of the equalizing portion of the distributing valve device in emergency position laps the passage 118 which leads from the application chamber 117 to the slide valve seat so that there is no communication from the passage 99 to the chamber 117. By reason of this, the pressure of fluid in the pressure chamber 35 and valve chamber 29 equalizes into the small volumes of the chambers 184 and 216 of the timing valve mechanism and regulating valve mechanism, thus producing a high emergency pressure in these chambers and consequently in the application piston chamber 53. This high emergency pressure in chamber 53 acts on the application portion of the distributing valve device to produce a high emergency pressure in the brake cylinders 14 and 19.

The flow of fluid under pressure from the feed valve device to the pipe 623 and consequently to the chambers 184 and 216 of the timing valve mechanism 170 and regulating valve mechanism 172, respectively, and to the equalizing valve chamber 29 and pressure chamber 35 is adapted to maintain the pressure in said chambers in the event of leakage therefrom.

The pressure of fluid obtained in the piston chamber 216 of the regulating valve mechanism, due to the equalization of fluid under pressure from the pressure chamber 35 and to the supply of fluid under pressure from the feed valve device, normally exceeds the setting of the safety valve device 112. The main slide valve in emergency position uncovers the passage 114 leading to the safety valve device, said passage being provided with a restriction 626. When the pressure of fluid in chamber 216 exceeds the setting of the safety valve device, said device will operate to vent fluid under pressure from the chamber 216, equalizing valve chamber 29 and pressure chamber 35, the restriction 626 in the passage 114 being adapted to so restrict the flow of fluid from said chambers as compared to the rate of supply of fluid from the feed valve device, that the pressure in said chambers will be maintained higher than the setting of the safety valve device, so as to insure a high emergency brake cylinder pressure being obtained.

The sudden reduction in brake pipe pressure which is effected upon the movement of the rotary valve 127 of the automatic brake valve device 2 to emergency position, causes a sudden reduction in the pressure of fluid in the piston chambers 335 and 352 of the triple valve device and the emergency valve device, respectively, of the car brake equipment. Upon said reduction, the triple valve device operates, in the same manner as in effecting a service application of the brakes, to supply fluid under pressure from the auxiliary reservoir 322 to the brake cylinder 330.

At substantially the same time as the triple valve device operates upon an emergency reduction in brake pipe pressure, fluid under pressure in the emergency valve chamber 357 causes the piston 353 and thereby the emergency slide valves 355 and 356 to move to emergency position. With the main slide valve 355 in emergency position, the passage 398 is uncovered so that fluid under pressure flows through said passage from the emergency valve chamber 357 and connected quick action chamber 359 to the quick action piston chamber 397.

The pressure of fluid thus supplied to the quick action piston chamber 397 causes the quick action piston 385 to move to its extreme inner position against the opposing pressure of the spring 390, unseating the quick action vent valve 387. With the vent valve unseated, fluid under pressure is suddenly vented from the brake pipe for the purpose of serially transmitting emergency action through the train in the usual well known manner.

With the slide valve 355 in emergency position, a cavity 628 in the valve connects the passage 524, leading from the emergency reservoir 323, to a passage 629 which is in open communication with the passage 376 leading to the chamber 402 of the inshot valve device, so that fluid under pressure is supplied from the emergency reservoir to said chamber 402 and from thence to the brake cylinder 330 by way of the unseated valve 401, passage 408, chamber 409, passage 410 and passage and pipe 411. Fluid under pressure may also flow from the chamber 402 to the chamber 409 through the choke plug 412. From the passage 410 fluid under pressure flows to the inner seated area of the piston 403.

Now when the pressure of fluid being supplied to the brake cylinder 330 through passages 410 and 411 and acting on the inner seated area of the inshot valve piston 403 becomes great enough to overcome the opposing force of the spring 405, the piston moves to its extreme outer position. As the piston is thus moved, the spring 407 acts to seat the inshot valve 401, thereby closing off the rapid flow of fluid to the brake cylinder by way of passage 408. With the inshot valve 401 thus seated, fluid under pressure continues to flow from the inshot valve chamber 402 to the brake cylinder by way of the passage in the choke plug 412, chamber 409, passage 410 and passage and pipe 411, the passage in the choke plug 412 forming a by-pass communication around the closed valve 401.

The flexible diaphragm 416 of the timing valve device 328 is subjected on one side to fluid at brake cylinder pressure and on the other side is subjected to the reducing quick action chamber pressure in the emergency valve chamber 357. When the increasing brake cylinder pressure on one side of the diaphragm becomes sufficient to overcome the reduced quick action chamber pressure on the other side of the diaphragm, said diaphragm is flexed outwardly, permitting fluid at brake cylinder pressure acting on the inner seated area of the valve 417 to move the valve from the seat rib 418. With the valve 417 unseated, fluid under pressure flows from the passage 376 past the unseated valve 417, through the choke 419 and passage and pipe 411 to the brake cylinder. Since fluid under pressure continues to flow through the passage in the choke plug 412 to the brake cylinder, this third stage of increase in brake cylinder pressure will be at a fairly fast rate. The brake cylinder pressure continues to build up to equalization with the pressure in said reservoirs.

In effecting an emergency application of the brakes of the train, the control valve device 8 will function in substantially the same manner as in effecting a service application of the brakes to vary the braking force on the locomotive and tender according to relative movement between the rear end of the tender and the adjacent end of the first car of the train.

*Release of brakes after an emergency application*

To effect a release of the brakes after an emergency application, the rotary valve 127 of the automatic brake valve device 2 is moved from emergency position to release position and then after a predetermined period of time has elapsed is moved from release position to running position. As in effecting a release of the brakes after a service application, the locomotive and tender brakes are maintained applied with the rotary valve 127 in release position and released with the rotary valve in running position.

Fluid under pressure supplied to the brake pipe 1 flows to the triple valve piston chamber 335 and to the emergency piston chamber 352. Fluid in valve chamber 340 of the triple valve device is at reduced auxiliary reservoir pressure and flu'd in the valve chamber 357 of the emergency valve device is at atmospheric pressure, so that upon a slight increase in brake pipe pressure, the emergency piston 353 will move to either its inner or outer release position before the triple valve piston is caused to move toward a release position. As before described, the rate of flow of fluid through the choke 360, forming the communication from the emergency piston chamber 352 to the passage 358, is inadequate to offset the rate at which the pressure of fluid is increased on cars at the head end of the train, so that the emergency piston 353 is moved upon a slight increase in brake pipe pressure, say for instance seven pounds, to its inner or back dump position, the movement of the piston from its normal position to back dump position being opposed by the spring 363 acting through the medium of the movable stop 362 and piston stem 354.

With the several parts of the emergency valve device in their innermost or back dump position, the passage 629 with which the brake cylinder is in open communication by way of the unseated timing valve 417, is connected, through cavity 628 in the emergency main slide valve 355, to a passage 630 leading to the under side of a ball check valve 631 contained in a chamber 632 open to the brake pipe 1 by way of passage 396 and strainer chamber 395 in the pipe bracket, so that fluid under pressure flows from the brake cylinder to the brake pipe, the pressure of fluid in passage 630 moving the check valve 632 from its seat against the opposing pressure of a spring 633 also contained in chamber 632. Passage 629 is also supplied with fluid under pressure from the auxiliary reservoir 322 through the triple valve device which is still in application position and passage 376, and as a result of this there is a rapid flow of fluid under pressure from the auxiliary reservoir to the brake pipe which accelerates the recharge of the brake pipe. This action naturally occurs first on the cars at the head end of the train where the increase in brake pipe pressure is first effective, and the sudden increase in brake pipe pressure on one car causes the emergency valve device on the next car to function in the same manner, so that this back dump operation is rapidly transmitted serially from car to car throughout the length of the train. Further, this back dump action effects several desirable results; first, it serves to save fluid under pressure which would be otherwise lost; second, it suddenly increases the brake pipe pressure from zero to about forty pounds, and thus hastens the charging of the equipment on the train after an emergency application of the brakes; and finally, by reducing auxiliary reservoir pressure to a low degree (substantially to equalization with the brake pipe pressure), it ensures movement of the triple valve device to effect a release of the brakes on the cars at the rear end of the train.

After the brake pipe pressure is suddenly increased by the supply of fluid under pressure from the brake cylinder 330 and auxiliary reservoir 322, and the auxiliary reservoir pressure is reduced in the manner hereinbefore described, the charging of the brake pipe is continued in the usual manner, causing the triple valve device and release insuring valve device to function in substantially the same manner as in effecting a release of the brakes after a service application. When the triple valve device is in a release position, fluid at the reduced pressure in the emergency reservoirs flows back and equalizes into the auxiliary reservoir 322, by way of pipe and passage 524 and port 523 in the main slide valve 338 of the triple valve device, after which both reservoirs are fully charged with fluid under pressure from the brake pipe by way of the feed groove 522 extending around the triple valve piston 336.

After the quick action chamber 359 and emergency slide valve chamber 357 become charged with fluid under pressure, supplied from the brake pipe through choke 360, to within possibly three pounds of the brake pipe pressure in emergency piston chamber 352, the spring 363, acting through the medium of the stop member 362 and piston stem 354, moves the emergency valve parts to their normal release position.

It will here be noted that when in releasing either a service or an emergency application of the brakes the automatic brake valve device is moved to either release or running position, the exhaust valve 137 closes the communication from the passage 433 to the atmosphere and this prevents the loss of fluid from the brake pipe if by reason of fluctuations in brake pipe pressure the equalizing discharge valve piston 425 should unintentionally operate and unseat the valve 432.

It has been stated in the foregoing description that the exhaust valve 137 associated with the automatic brake valve device 2 is maintained in its closed position when the brake valve handle 129 is in either its release or running position. In its closed position this valve is adapted to prevent the flow of fluid from the brake pipe to the atmosphere in the event of the equalizing discharge valve device 18 being unintentionally operated to open the communication from the brake pipe to the exhaust passage 433. In this connection it will be understood that while it is intended that the chambers 428 and 431 at the opposite sides of the equalizing discharge valve piston 425 charge substantially together so that an operating fluid pressure differential will not be created on the piston, it is possible, under certain conditions, that such a differential may be created by a more rapid increase in brake pipe pressure in chamber 431 than in the equalizing reservoir pressure in chamber 428. When such a pressure differential is created, the piston 425 will be caused to move in a direction toward the right hand and cause the bell-crank lever rockably mounted on the pin 438 to move and unseat the brake pipe discharge valve 432, thus establishing communication from the brake pipe to the exhaust passage 433, but since the exhaust valve 137 is closed no reduction in brake pipe pressure will be effected.

*Summary as to the feature involving brake cylinder pressure build up in service*

From the foregoing description of the functioning of the train brake equipment in effecting a service application of the brakes, it will be understood, that upon effecting the initial limited reduction in brake pipe pressure at substantially a service rate which is the result of the operation of the equalizing discharge valve device 18 in response to the reduction in the pressure of fluid in the equalizing piston chamber 428, due to the substantial equalization of equalizing reservoir pressure into the small reduction limiting reservoir 13, the car brake equipments will function to supply fluid under pressure to the brake cylinders 330 at the usual service rate until the brake cylinder pressure on each car has been increased to some predetermined degree, say for instance to nine pounds, when the quick service modifying valve device 325 functions to close off the further quick service flow of fluid from the brake pipe.

Due to the quick service reduction in brake pipe pressure which is effected by the car equipments as well as to the reduction in brake pipe pressure which is effected by the flow of fluid past the equalizing discharge valve, the equalizing portion of the distributing valve functions to supply fluid under pressure to the piston chamber 216 of the regulating valve mechanism 172 and to the diaphragm chamber 184 of the timing valve mechanism 170, causing the timing valve mechanism to function to supply fluid at feed valve pressure to the timing reservoir 204 and to the diaphragm chamber 201 of the hold-back valve mechanism 171, and causing the regulating valve mechanism to supply fluid under pressure from the main reservoir to the application piston chamber 53. Fluid under pressure thus supplied to the chamber 53 causes the application piston 52 to move and actuate the valve mechanism 62 to supply fluid under pressure from the main reservoir to the locomotive and tender brake cylinders 14 and 19, respectively. Now when the pressure of fluid in these brake cylinders is increased sufficiently to cause the usual brake shoes to be moved either in contact with the treads of the wheels or into close proximity therewith, the valve device 261 operates to prevent any further increase in the pressure of fluid in the application piston chamber, with the result that on the locomotive and tender the brakes will not be applied with an effective braking force.

When the pressure of fluid in the timing reservoir and the connected diaphragm chamber 201 of the hold-back valve mechanism has been increased sufficiently to overcome the resistance of the spring 211, the hold-back valve mechanism functions to close the communication from the application piston chamber 53 to the atmosphere by way of the valve device 261. It will be understood that the volume of timing reservoir 204 and diaphragm chamber 201 is such that a predetermined period of time, say about fifteen seconds, will elapse between the initiation of the brake pipe reduction and the creation of a sufficient pressure differential to cause the hold-back valve mechanism to function in the manner just described.

With the communication from the application piston chamber 53 and the atmosphere thus closed by the hold-back valve 207, the brake cylinder pressure is increased, thus producing an effective braking force on the locomotive and tender.

It will be understood from the foregoing description, that upon the reduction in brake pipe pressure resulting from the movement of the rotary valve 127 of the automatic brake valve device 2 to slack gathering and maintaining service position, a light brake cylinder pressure on the cars is developed to set up a slight retardation of the cars to cause the slack in the train to start to gather gently before the locomotive and tender brakes are applied. As the slack in the train is gathering the inertia of the locomotive and tender tends to maintain the gathering slack stretched out, and thus contributes to the gentle gathering of the slack. In about fifteen seconds after the reduction in brake pipe pressure has been initiated, in which time the slack will have gently gathered, the locomotive and tender brakes are applied with an effective retarding force, so that the locomotive and tender no longer exert a forward pull on the cars.

Now if the rate of retardation of the locomotive exceeds that of the cars, the braked cars will run in toward the tender, and through the medium of the draft rigging of the tender, cause the control valve device 8 to operate to vent fluid under pressure from the application piston chamber 53, so that fluid at brake cylinder pressure in the chambers 54 and 56 causes the application piston and thereby the slide valve to move to a release position in which the slide valve 61 uncovers the port 518, permitting fluid under pressure to flow from the brake cylinder to the atmosphere, thus reducing the locomotive and tender brake cylinder pressure and consequently relieving the braking force on the locomotive and tender.

If, when the braking force on the locomotive and tender is thus relieved, the locomotive and tender tend to exert a forward pull on the cars, the control valve device 8 will be caused to function to close off the flow of fluid from the application piston chamber 53, with the result that the flow of fluid to the chamber 53 by way of the restricted passage 268, will again increase the pressure in the chamber 53. When the pressure in chamber 53 slightly exceeds the pressure in the chambers 54 and 56, the application piston will be caused to again move to application position and permit fluid under pressure to flow to the brake cylinders 14 and 19 and increase the braking force of the locomotive and tender brakes.

It will thus be seen that the braking force of the locomotive and tender brakes will be automatically varied in accordance with the relative longitudinal movement between the rear end of the tender and the adjacent end of the first car of the train, so that the locomotive and tender will not cause run in or run out shocks to be effected.

After the rotary valve 127 of the automatic brake valve device 2 has been in slack gathering and maintaining service position for a period of about twenty-five seconds, by which time the engineer will know the slack in the train has gathered, it is moved to service position in which the reduction in brake pipe pressure is at the usual service rate. While the rotary valve is in slack gathering and maintaining service position, the equalizing valve device operates to vent fluid under pressure from the brake pipe at substantially the same rate as the equalizing reservoir pressure is being vented through the choke 495 in the reduction reservoir 13, with the result that the braking force of the locomotive, tender and cars will be increased gradually. When the brake pipe pressure is reduced at a service rate, both the locomotive and car brake equipments will be caused to function to increase the rate of flow of fluid to the brake cylinders, so as to promptly bring the train to a stop.

It will here be understood that with the rotary valve 127 in either service or lap position the control valve device 8 controls the braking force on the locomotive and tender according to the relative longitudinal movement of the locomotive and first car of the train in the same manner as when the rotary valve is in slack gathering and maintaining service position.

*Summary as to the feature involving brake cylinder pressure build up in emergency*

From the foregoing description of the function of the train brake equipment in effecting an emergency application of the brakes it will be understood that the equalizing portion of the distributing valve device on the locomotive and the several parts of the car equipments, in response to the sudden reduction in brake pipe pressure, will promptly move to emergency position. It will also be understood that in effecting an emergency application of the brakes, both the timing valve mechanism 172 and hold-back valve mechanism 171 will function in substantially the same manner as in effecting a service application of the brakes to delay, for a period of about fifteen seconds, the operation of the application portion of the distributing valve device to supply fluid under pressure to the brake cylinders 14 and 19.

On each car of the train the supply of fluid under pressure to the brake cylinder 330 is continuous from the time the emergency application is initiated until the full brake cylinder pressure is developed, the increase in brake pipe pressure is nevertheless in three distinct stages. First there is an initial quick inshot of fluid under pressure to the brake cylinder which is limited upon the seating of the inshot valve 401, then there is a slow increase in brake cylinder pressure by the flow of fluid through the choke 412, and finally there is a rapid increase in brake cylinder pressure by the flow of fluid through the choke 419 and past the unseated timing valve 417 and through the choke 412. The initial inshot of fluid to the brake cylinder 330 is such as to insure a predetermined light brake cylinder pressure to be developed, say for instance about fifteen pounds, to set up a slight retardation on the cars to cause the slack in the train to start to gather gently. The following slow flow of fluid through the choke 412 may only increase the car brake cylinder pressure by about six pounds, but is of such duration as to permit the train slack to sufficiently gather as to prevent harsh shocks, after which the timing valve device 328 functions to increase the rate at which fluid flows to the brake cylinder. This final rapid flow of fluid to the brake cylinder is for the purpose of bringing the train to a stop promptly after the slack in the train has gathered.

Since the locomotive and tender brakes are not applied with an effective braking force until about fifteen seconds after the sudden reduction in brake pressure has been initiated, the inertia of the locomotive and tender tends to maintain the gathering slack in the train stretched out.

In effecting an emergency application of the brakes the control valve device 8 on the locomotive will operate, in substantially the same manner as in effecting a service application to vary the braking force on the locomotive and tender according to relative longitudinal movement between the tender and first car of the train.

*Independent application of the locomotive and tender brakes*

When it is desired to effect an independent application of the locomotive and tender brakes, the rotary valve 167 of the independent brake valve device is moved to either slow application position in which fluid under pressure supplied to the rotary valve chamber 121 flows through a port 635 in the valve to passage 504, or to quick application position in which fluid under pressure flows from the valve chamber 121 through a port 636 in the valve and passage 505 to the passage 504. The only difference between these two positions is that in slow application position the flow of fluid through the port 635 is at a slower rate than through the port 636.

With the rotary valve 167 in either of the above mentioned application positions, fluid under pressure flows from the rotary valve chamber 121 through a port 637 in the valve, passage 122, and pipe 240 to the piston chamber 239 of the cut-off valve device 9, causing the cut-off piston 227 to move to its extreme inner position, unseating the valve 244 and seating the valve 243. With the valve 243 seated, communication from the pipe 255 and consequently from the application piston chamber 53 to the control valve device 8 on the tender is disestablished, and with the valve 244 unseated the pipe and passage 246 leading from the valve device 8 is open to the atmosphere by way of chambers 245 and 229 and passage 242. Fluid under pressure supplied to the pipe 240 also flows past the check valve 269 and through pipe and passage 271 to the valve chamber 174 of the timing valve mechanism 170.

Fluid under pressure supplied to the passage 504 flows to the application chamber 117 by way of pipe and passage 104, choke 503, passage 502, cavity 501 in the equalizing main slide valve 30 and passage 118. From the cavity 501 fluid under pressure flows to the diaphragm chamber 184 of the timing valve mechanism 170 and to the piston chamber 216 of the regulating valve mechanism 172 by way of passage 515 and port 514 in the main slide valve passage 99, pipes 191 and 190, passage 187 in the plug valve 188 of the cock 189, pipe 186 and passage 185. Fluid under pressure supplied to the diaphragm chamber 184 causes the diaphragm 182 to flex inwardly and as the diaphragm is thus flexed, it causes the valve 179 to be seated, so as to close communication from the timing reservoir and hold-back diaphragm chamber 201 to the atmosphere, and also causes the valve 173 to be unseated. With the valve 173 unseated fluid at feed valve pressure supplied to the valve chamber 174 by way of pipe and passage 171, flows at a rapid rate through chamber 177 and passage 202 of the timing reservoir 204 and hold-back diaphragm chamber 201, causing the hold-back valve mechanism to quickly function to close the communication from the passage 257 and consequently from the application piston chamber 53 to the passage 259 leading to the valve device 261.

Fluid under pressure supplied to the piston chamber 216 of the regulating valve mechanism causes the piston 213 to move inwardly so as to seat the valve 221 and unseat the valve 222. With the valve 222 unseated, fluid under pressure from the main reservoir is supplied to the chamber 217. When the pressure of fluid in chamber 217 is substantially equal to that in chamber 216, the piston will be moved outwardly by the action of the spring 225 and will cause the valve 222 to be seated, closing off the further flow of fluid from the main reservoir to the chamber 217, so that the piston comes to a stop without unseating the exhaust valve 221.

Fluid under pressure supplied to the pipe 104 flows therefrom through pipe 235, past the spring weighted check valve 236, through pipe 238 and passage 234 to the application piston chamber 53. From the pipe 238 fluid under pressure also flows to the chamber 217 of the regulating valve mechanism 172 by way of pipe 250, passage 251 in the plug valve of the cock device 189, pipe 252, past the check valve 253, pipe 264, past the check valve 265, pipe 267 and passage 218. Fluid also flows from the pipe 252 to the volume reservoir 256.

It will be noted that due to the spring weighting of the check valve 236, the pressure in chamber 216 of the regulating valve mechanism will be higher than that in chamber 217 so that the regulating valve mechanism will remain in lap position.

Fluid under pressure supplied to the application piston chamber 53 causes the application piston 52 to move to application position in which the slide valve 61 closes the brake cylinder exhaust passage 518 and the valve device 62 supplies fluid under pressure from the main reservoir to the brake cylinders 14 and 19 to effect an independent application of the locomotive and tender brakes.

When it is desired to limit the locomotive and tender brake cylinder pressure the rotary valve 167 of the independent brake valve device 3 is moved from either application position to lap position, in which latter position the further flow of fluid from the rotary valve chamber 121 to the application piston chamber 53 is closed off. The application portion of the distributing valve device now operates to close off the further flow of fluid from the main reservoir to the brake cylinders 14 and 19 in the same manner as hereinbefore described in connection with the release of the brakes after an automatic service application.

With the rotary valve 167 in lap position, the port 637 therein is open to the passage 122, so that the cut-off valve device 9 is maintained in its cut-off position in which the control valve device 8 on the tender is ineffective to control the brakes.

It will be understood that with the independent brake valve device 3 in either one of the two application positions or in lap position, the cut-off valve mechanism 9 renders the control valve device 8 ineffective to control the locomotive and tender according to relative longitudinal movement between the tender and first car of the train.

*Independent slow release of the brakes*

When it is desired to effect a slow independent release of the locomotive and tender brakes, the rotary valve 167 of the independent brake valve device 3 is moved to running position in which the cavity 506 connects the passage 505 to the passage 507 which is open to the atmosphere by way of cavity 508 in the rotary valve 127 of the automatic brake valve device and passage 485. With this connection made, fluid under pressure is vented from the piston chamber 216 of the regulating valve mechanism 172 and from the diapraghm chamber 184 of the timing valve mechanism 170 by way of passage 185, pipe 186, passage 187 in the plug valve of the cock device 189, pipes 190 and 191, passage 99, port 514 in the main slide valve 30, passage 515, cavity 501, passage 502, choke 503, passage and pipe 104 and passage 504. Upon the venting of fluid under pressure from the piston chamber 216, the piston will be caused to move outwardly, so that it unseats the exhaust valve 222. With the valve thus unseated, fluid under pressure is vented from the application piston chamber and volume reservoir by way of pipe 252, past the check valve 253, pipe 264, past the check valve 265, pipe 267, passage 218, chamber 217 and passage 226. The flow of fluid from the chamber 216 will be at slow rate as governed by the flow of fluid through the choke 503 and due to this the valve 222 will only be opened to such an extent as to provide the same rate of flow of fluid from the application piston chamber 53. By reason of this the application portion will function to release fluid under pressure from the brake cylinders 14 and 19 at a corresponding rate so that the locomotive and tender brakes are released slowly.

Upon the venting of fluid under pressure from the chamber 184 the timing valve mechanism 170 will operate to vent fluid under pressure from the diaphragm chamber 201 of the hold-back valve mechanism 171, so that the hold-back valve mechanism will be returned to its normal position as will be understood from the foregoing description of the release of the brakes after an automatic application.

With the rotary valve 167 in running position the cavity 516 therein connects the passage 122 to the atmospheric passage 517. With this connection made, fluid under pressure is vented from the piston chamber 239 of the cut-off valve mechanism 9 by way of pipe 240. The spring 633 now acts to return the piston 227 to its normal position in which it is shown in Fig. 4, permitting the spring 247, acting through the medium of the plunger 248, to unseat the valve 243 and to seat the valve 244, thus again establishing communication between the application piston chamber 53 and the valve device 8 on the tender.

*Independent quick release of the brakes*

When it is desired to effect a quick independent release of the locomotive and tender brakes, the rotary valve 167 of the independent brake valve device is moved to release position, in which a cavity 639 connects the passage 505 to the atmospheric passage, and a port 640 registers with the passage 519. With the port 640 in registration with the passage 519 fluid under pressure flows to the piston chamber 107 of the reduction cut-off valve device 78 by way of said port and passage, pipe 109 and passage 108, causing the reduction cut-off piston 105 to move inwardly and unseat the valve 96, so that fluid under pressure is vented from the piston chamber 216 of the regulating valve mechanism and diaphragm chamber 184 of the timing valve mechanism, by way of passage 185, pipe 186, passage 187 in the plug valve of the cock device 189, pipes 190 and 191, passages 99 and 98, valve chamber 97 in the reduction cut-off valve device, past the unseated valve 96, passage and pipe 104 and passage 504. The passage 104 by-passes the choke 503, so that the flow of fluid from the piston chamber 216 to the atmosphere will be at a rapid rate, consequently the regulating valve mechanism and therefore the application portion of the distributing valve device will function to effect the quick release of the locomotive and tender brakes.

Upon the venting of fluid from the diaphragm chamber 184 of the timing valve mechanism, said mechanism and hold-back valve mechanism will return to their normal positions in the same manner as pointed out in connection with the release of the brakes after an automatic application.

It will here be noted that with the rotary valve 167 in release position, the passage 122 is lapped, so that fluid under pressure is bottled up in the piston chamber 239 of the cut-off valve mechanism 9, consequently said mechanism is maintained in its cut-off position. However, when the rotary valve is returned in the usual manner to running position, the chamber 239 will be vented by way of port 516 in the rotary valve and passage 517, and as a consequence the cut-off valve mechanism will be returned to its normal cut-in position.

Upon the return of the rotary valve to running position, the passage 519 is connected to the atmospheric passage 517 by way of the cavity 520 in the valve, so that fluid under pressure is now vented from the piston chamber 107 of the reduction cut-off valve device 78. With the chamber 107 thus vented, the action of the spring 101 seats the valve 96 and at the same time causes the piston 105 to move toward its normal position.

*Cut-out of the timing, hold-back and control features of the locomotive and tender equipment*

When it is desired to render the timing valve mechanism 170, hold-back valve mechanism 171, regulating valve mechanism 172 and control valve device 8 on the tender ineffective to control the operation of the application portion of the distributing valve device in effecting and releasing an automatic application of the brakes, the plug valve 187 of the cock device 189 is turned ninety degrees from the position in which it is shown. This closes the communication between the pipes 190 and 186 and also closes the communication between the pipes 250 and 252. It is obvious, that with these communications closed, the mechanisms above enumerated and the valve device 8 on the locomotive are rendered ineffective to control the operation of the application portion of the distributing valve device.

When the cock device 189 is closed the plug valve of a cock device 641 is rotated ninety degrees so that a passage 642 in said valve establishes communication between the pipes 191 and 250, and consequently between the equalizing valve chamber 26 and the application piston chamber. It will be seen that by reason of this, the equalizing portion of the distributing valve device controls the operation of the application portion to control the automatic application and release of the locomotive and tender brakes.

When, with the cock devices 189 and 641 closed, the automatic brake valve device 2 is moved to either service position, the reduction in brake pipe pressure resulting therefrom causes the equalizing valve device to function in substantially the same manner as has been fully described in the application filed by Ellis E. Hewitt and myself, Serial No. 619,052, June 24, 1932.

In effecting a service application of the brakes, the pressure of fluid in the pressure chamber 35 and equalizing valve chamber 29 is reduced about five pounds as before described in connection with an automatic service application of the brakes, which, as is fully described in the above mentioned application Serial No. 619,052, produces a substantially synchronous application of the locomotive and car brakes, in other words produces such an application of the locomotive brakes that the locomotive and tender will not cause the slack in the train to start to gather harshly.

In Fig. 29 I have illustrated a single cock device 643 which may be substituted for the cock devices 189 and 641. This cock device 643 comprises a plug valve 644 having passages 645 and 646 which correspond to the passages 187 and 251, respectively, in the plug valve of the cock device 189 and having a cavity 647 which is adapted to establish communication between the pipes 190 and 250 when the plug valve is turned ninety degrees from the position in which it is shown. It will thus be seen that the cock device 643 is adapted to establish the same communications which are established by the cock devices 189 and 641.

*Use of the angle cock of the tender for rendering the control valve device ineffective to control the braking force of the locomotive and tender brakes*

It will be noted that when the draft rigging of the tender is in its neutral position and an automatic application of the brakes is initiated, the valve 281 of the valve device 8 on the tender will be in its unseated position so that fluid under pressure will be vented from the application piston chamber to effect the operation of the application portion of the distributing valve device to vent fluid under pressure from the brake cylinders 14 and 19. This would, of course, be very objectionable when a locomotive is used in pusher service since an automatic application of the brakes could not be effected, and to insure the locomotive and tender brakes being applied the plug valve 277 of the angle cock device 278 is turned from the position in which it is shown to its closed position in which the communication from the application piston chamber 53 to the atmosphere past the unseated valve 281 is closed, thus rendering the valve device 8 ineffective to control the locomotive and tender brakes. At the same time as this communication is closed, the brake pipe communication through the angle cock device is also closed by the plug valve.

While I have shown and described the angle cock device 278 as being adapted to control the communication from the application piston chamber to the valve device 8, I do not wish to be limited to this for it will readily be seen that the same results may be obtained by controlling the communication from the brake cylinder pipe 58 to the piston chamber 312 of the valve device 8 by the use of the angle cock device. In such an arrangement when the angle cock device is closed, fluid under pressure cannot be supplied to the piston chamber, consequently the piston 298 will not move from its normal position, so that the cam 300, as it is moved, will not engage the roller 295 and the valve 281 will remain closed, thus preventing the venting of fluid under pressure from the application piston chamber 53.

As shown in Fig. 4 of the drawings, the distributing valve device is provided with a plug 654 which closes communication between the passage 234, connected to the application piston chamber 53, and the passage 99 leading from the seat of the slide valve 30. By reason of this the proper control of the application portion by the valve devices 7 and 8 is provided for. If, however, the distributing valve device is to be used in a locomotive brake equipment in which the valve devices 7 and 8 are not employed, the plug 654 is not used so that the application portion of the distributing valve device will be directly controlled by the equalizing portion. When the plug is omitted the distributing valve device will be substantially of the same construction as that of the distributing valve device covered in the aforementioned application, Serial No. 619,052.

In Fig. 27 a modified form of connection between the outer end of the cam operating arm 302 of the control valve device 8 and the member 317 is illustrated, in which the member 317 is provided with a flange 648 to which the outer end of the arm 302 is pivotally connected by a pin 649. When the arm is thus positively connected to the member 317 the roller 303 and spring 305 are of course omitted.

In Fig. 28 a modification of the hold-back valve mechanism 171 is illustrated in which the slide valve 207 normally closes communication between the valve chamber 217 of the regulating valve mechanism 172 and the passage 257 leading to the application piston chamber 53 and volume reservoir 256. When in effecting an automatic application of the brakes, fluid under pressure is supplied by the valve mechanism 170 to the diaphragm chamber 201, the diaphragm 200 will be flexed inwardly, and through the medium of the stem 208, shifts the slide valve to a position in which the cavity 258 connects the passage 218 to the passage 257, so that fluid under pressure flows from the chamber 217 to the application piston chamber 53 and volume reservoir 256 and causes the application portion of the distributing valve device to operate to effect the application of the locomotive brakes with an effective braking force.

The rate of the flow of fluid from the chamber 217 to the passage 257 is governed by a restriction 650 in the passage 218.

It will be noted that when this modified form of hold-back valve mechanism is employed, the brake cylinders 14 and 19 will not be caused to operate to move the locomotive and tender brake shoes from their normal release position until the predetermined delay period has elapsed, and in this way differs from the hold-back valve mechanism shown in Fig. 4 which operates to cause the brake shoes to be moved out of their normal release position during the delay period.

In this specification, I have described the control valve device 8 and the draft rigging for controlling the operation of this valve device as being carried by the tender, but I do not wish to be limited to this, for it will be readily understood that these portions of the equipment may be carried by a power unit such as an electric locomotive, motor car or the like in which a tender is not employed.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a train fluid pressure brake system, the combination with a brake pipe, of means on the cars of the train operative upon a light reduction in brake pipe pressure and regardless of the pressure gradient of the brake pipe for effecting an initial predetermined light application of the brakes on the cars with a braking force substantially uniform as to each car of the train, means on the locomotive operative upon a reduction in brake pipe pressure to initiate an application of the locomotive brakes with an effective braking force in substantial synchronization with the initiation of an effective braking force on at least the first car of the train, a brake valve device operative to effect a reduction in brake pipe pressure at least at a service rate, and means for automatically limiting the period of time in which the brake pipe pressure is reduced at said rate.

2. In a train fluid pressure brake system, the combination with a brake pipe, of means on the cars of the train operative upon a light reduction in brake pipe pressure and regardless of the pressure gradient of the brake pipe for effecting an initial predetermined light application of the brakes on the cars with a braking force substantially uniform as to each car of the train, means on the locomotive operative upon a reduction in brake pipe pressure to initiate an application of the locomotive brakes with an effective braking force in substantial synchronization with the initiation of an effective braking force on at least the first car of the train, a brake valve device operative to effect a reduction in brake pipe pressure at least at a service rate, means for automatically limiting the period of time in which the brake pipe pressure is reduced at said rate, and means for automatically continuing the reduction in brake pipe pressure at a slower rate.

3. In a train fluid pressure brake system, the combination with a brake pipe, of means on the cars of the train operative upon a light reduction in brake pipe pressure and regardless of the pressure gradient of the brake pipe for effecting an initial predetermined light application of the brakes on the cars with a braking force substantially uniform as to each car of the train, means on the locomotive operative upon a reduction in brake pipe pressure to initiate an application of the locomotive brakes with an effective braking force in substantial synchronization with the initiation of an effective braking force on at least the first car of the train, a brake valve device operative to initiate a reduction in brake pipe pressure at a certain rate to effect the operation of the means on the cars and the means on the locomotive, means operative automatically for limiting the reduction in brake pipe pressure resulting from the operation of the brake valve device and for continuing the reduction at a slower rate when the limited reduction has been effected.

4. In a train fluid pressure brake system, the combination with a brake pipe, of means on the cars of the train operative upon a light reduction in brake pipe pressure and regardless of the pressure gradient of the brake pipe for effecting an initial predetermined light application of the brakes on the cars with a braking force substantially uniform as to each car of the train, means on the locomotive operative upon a reduction in brake pipe pressure to initiate an application of the locomotive brakes with an effective braking force in substantial synchronization with the initiation of an effective braking force on at least the first car of the train, a brake valve device operative to initiate a reduction in brake pipe pressure at a certain rate to effect the operation of the means on the cars and the means on the locomotive, means operative automatically for limiting the reduction in brake pipe pressure resulting from the operation of the brake valve device and for continuing the reduction at a slower rate when the limited reduction has been effected and to supply fluid under pressure to the brake pipe to compensate for leakage of fluid from the brake pipe.

5. In a train brake system, the combination with means on the cars of a train operative to effect an initial predetermined light application of the car brakes with a braking force substantially uniform as to each car, of means on the locomotive operative to initiate an application of the locomotive brakes, means operative to initiate the operation of both the car braking means and the locomotive braking means, and means operative automatically for controlling the locomotive braking means to regulate the braking force on the locomotive so as to substantially synchronize the braking effect on the locomotive with the braking effect on the cars.

6. In a train brake system, the combination with means on the cars of a train operative to effect an application of the car brakes, of means on the locomotive operative to effect an application of the locomotive brakes, and means operative automatically for controlling the locomotive braking means after the locomotive brakes are applied for substantially synchronizing the braking effect on the locomotive with the braking effect on the cars.

7. In a train brake system, the combination with means on the cars of a train operative to effect an application of the car brakes, of means on the locomotive operative to effect an application of the locomotive brakes after the application of the car brakes has been initiated, and means operable automatically after the application of the locomotive brakes has been initiated for controlling the locomotive braking means to vary the braking force of the locomotive brakes according to the relative braking effect on the locomotive and cars.

8. In a train brake system, the combination with means on the cars of a train operative to effect an application of the car brakes, of means on the locomotive operative to effect an application of the locomotive brakes, means for delaying the operation of the locomotive braking means for a predetermined period of time after an application of the car brakes is initiated, and means operable automatically after the application of the locomotive brakes has been initiated for increasing or decreasing the braking force on the locomotive according to the relative effect of the braking forces on the locomotive and cars.

9. In a train brake system, the combination with means on the cars of a train operative to effect an application of the car brakes, of means on the locomotive operative to effect an application of the locomotive brakes, means for delaying the operation of the locomotive braking means for a predetermined period of time after an application of the car brakes is initiated, and means operable automatically after the application of the locomotive brakes has been initiated for synchronizing the braking effect on the locomotive with that on the cars.

10. In a train brake system, the combination with means on the cars of a train operative to effect an application of the car brakes, of means on the locomotive operative to effect an application of the locomotive brakes, means for delaying the operation of the locomotive braking means for a predetermined period of time after an application of the car brakes is initiated, and means operable automatically after the application of the locomotive brakes has been initiated for controlling the locomotive braking means to maintain the retarding effect on the locomotive substantially equal with the retarding effect on the cars.

11. The combination in a train of at least two vehicles one of which is a power vehicle, of a brake equipment on each of said vehicles, manually controlled means on the power vehicle for initiating the operation of the brake equipments on both of said vehicles to effect an application of the brakes, means for varying the braking power of the brake equipment on the power vehicle, and means on the power vehicle automatically operated upon a relative movement between the vehicles for regulating the operation of the second mentioned means.

12. The combination in a train of at least two vehicles, one of which is a power vehicle, of a brake equipment on each of said vehicles, manually controlled means on the power vehicle for initiating the operation of the brake equipments on both of said vehicles to effect an application of the brakes, means for increasing or decreasing the braking power of the brake equipment on the power vehicle, and means on the power vehicle automatically operated upon a relative movement between the vehicles for operating the second mentioned means to increase or decrease the braking force of the equipment on the power vehicle.

13. In a brake system for a train of one or more cars and a power vehicle, the combination with means on the cars of the train operative to effect an application of the car brakes, of means on the power vehicle operative to apply the power vehicle brakes at a predetermined time after the initiation of the application of the car brakes, and means operated according to relative movement between said power vehicle and the adjacent car of the train for regulating the braking action on the power vehicle after an application of the brakes on the power vehicle has been initiated.

14. In a fluid pressure brake system for a train of one or more cars and a power vehicle, the combination with a brake pipe, of means on the car or cars of the train operated upon a reduction in brake pipe pressure for effecting an application of the car brakes, valve means on said power vehicle operated upon said reduction in brake pipe pressure to effect an application of the power vehicle brakes at a predetermined time after said reduction in brake pipe pressure is initiated, and valve mechanism included in said valve means operated according to a relative movement between said power vehicle and an adjacent car of the train for regulating the braking power on said power vehicle.

15. In a fluid pressure brake system for a train of one or more cars and a power vehicle, the combination with a brake pipe, of means on the car or cars of the train operated upon a reduction in brake pipe pressure for effecting an application of the car brakes, valve means on said power vehicle operated upon said reduction in brake pipe pressure to effect an application of the power vehicle brakes at a predetermined time after said reduction in brake pipe pressure is initiated and valve mechanism included in said valve means operative in accordance with relative longitudinal movement between the power vehicle and an adjacent car of the train for varying the braking power on the power vehicle after an application of the brakes on the power vehicle has been initiated.

16. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve means for varying the braking power of the power vehicle brakes, and means operated according to a relative movement between the power vehicle and an adjacent car of the train to control the operation of the last mentioned valve means to vary the braking power on the power vehicle.

17. In a fluid pressure brake system for a train of one or more cars and a power vehicle, the combination with a brake pipe, of means on the car or cars of the train operated upon a reduction in brake pipe pressure for effecting an application of the car brakes, valve means on the power vehicle operated upon said reduction in brake pipe pressure to effect an application of the power vehicle brakes, valve means operative to vary the braking power of the power vehicle brakes, and means operated mechanically according to relative movement between the power vehicle and an adjacent car of the train to control the operation of the last mentioned valve means to vary the braking power on the power vehicle.

18. In a fluid pressure brake system for a train of one or more cars and a power vehicle, the combination with a brake pipe, of means on the car or cars of the train operated upon a reduction in brake pipe pressure for effecting an application of the car brakes, a valve device on the power vehicle operative to one position to effect an application of the power vehicle brakes and operative to another position to effect a release of the power vehicle brakes, valve mechanism operative upon said reduction in brake pipe pressure to supply fluid under pressure to said valve device at a predetermined time after said reduction in brake pipe pressure is initiated to effect the operation of said valve device to initiate an application of the power vehicle brakes, and a control valve device operated according to a relative movement between the power vehicle and an adjacent car of the train for controlling the supply of fluid under pressure to and the release of fluid under pressure from said valve device to effect the operation of said valve device to vary the braking power on the power vehicle.

19. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative by fluid under pressure for supplying fluid under pressure to said brake cylinder and operative upon a reduction in the pressure of fluid thus supplied to release fluid under pressure from said brake cylinder, valve mechanism operative upon the effecting of said reduction in brake pipe pressure for supplying fluid under pressure to said valve device, and a control valve device operated according to a relative movement between the power vehicle and an adjacent car of the train for controlling the pressure of fluid in said valve device.

20. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative by fluid under pressure for supplying fluid under pressure to said brake cylinder and operative upon a reduction in the pressure of fluid thus supplied to release fluid under pressure from said brake cylinder, valve mechanism operated upon said reduction in brake pipe pressure for supplying fluid under pressure to said valve device at a predetermined time after said reduction in brake pipe pressure is initiated, and a control valve device operated according to a relative movement between the power vehicle and the adjacent car of the train for controlling the pressure of fluid in said valve device.

21. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative by fluid under pressure for supplying fluid under pressure to said brake cylinder and operative upon a reduction in the pressure of fluid thus supplied to release fluid under pressure from said brake cylinder, valve mechanism operated upon said reduction in brake pipe pressure for supplying fluid under pressure to said valve device at a predetermined time after said reduction in brake pipe pressure is initiated, and means subject to the pressure of fluid supplied to the brake cylinder and operated according to a relative movement between said power vehicle and an adjacent car of the train for varying the pressure of fluid in said valve device.

22. In a fluid pressure brake system for a train of one or more cars and a power vehicle, the combination with a brake pipe, of means on the car or cars of the train operated upon a reduction in brake pipe pressure for effecting an application of the car brakes, a brake cylinder on the power vehicle, a valve device operative by fluid under pressure for supplying fluid under pressure to said brake cylinder and operative upon a reduction in the pressure of fluid thus supplied to release fluid under pressure from said brake cylinder, valve mechanism operated upon said reduction in brake pipe pressure for supplying fluid under pressure to said valve device at a predetermined time after said reduction in brake pipe pressure is initiated, regulating means being capable of adjustment and operative according to said adjustment to determine the pressure of fluid in said valve device, and means operated according to a relative movement between the power vehicle and the adjacent car of the train for adjusting said regulating means.

23. In a fluid pressure brake system for a train of one or more cars and a power vehicle, the combination with a brake equipment on the power vehicle operative to effect an application of the brakes on the power vehicle, means operative to vary the braking action of said brake equipment, and means controlled according to relative movement between the power vehicle and the adjacent car of the train for controlling the operation of the first mentioned means to vary the braking action of the brake equipment.

24. In a fluid pressure brake system for a train of one or more cars and a power vehicle, the combination with a brake equipment on the power vehicle operative to effect an application of the brakes on the power vehicle, means operative to vary the braking action of said brake equipment, and means controlled mechanically according to relative movement between the power vehicle and the adjacent car of the train for controlling the operation of the first mentioned means to vary the braking action of the brake equipment.

25. In a fluid pressure brake system for a train of one or more cars and a power vehicle, the combination with a brake pipe, of means on the car or cars of the train operated upon a reduction in brake pipe pressure to effect an application of the car brakes, a brake cylinder on the power vehicle, valve means operative to supply fluid under pressure to said brake cylinder at a predetermined time after said reduction in brake pipe pressure is initiated, a valve mechanism operative to control the operation of said valve means to vary the pressure of fluid in the brake cylinder, and means operable according to a relative movement between the power vehicle and the adjacent car of the train for controlling the operation of said valve mechanism.

26. In a fluid pressure brake system for a train of one or more cars and a power vehicle, the combination with a brake pipe, of means on the car or cars of the train operated upon a reduction in brake pipe pressure to effect an application of the car brakes, a brake cylinder on the power vehicle, valve means on the power vehicle operated upon said reduction in brake pipe pressure to supply said reduction in brake pipe pressure to supply fluid under pressure to the brake cylinder, and means operative according to relative movement between said power vehicle and the adjacent car of the train for controlling the operation of said valve means to vary the pressure of fluid in said brake cylinder.

27. The combination in a train of at least a power vehicle and one other vehicle, of means coupling said vehicles to each other comprising two coupled couplers capable of longitudinal and transverse arcuate movements relative to the power vehicle, a fluid pressure brake system operative to effect an application of the brakes on the train, regulating means operative to vary the braking action of the system on the power vehicle, and means responsive to the relative longitudinal movement between said power vehicle and couplers for controlling the operation of said regulating means and unresponsive to said arcuate movement.

28. The combination in a train of at least a power vehicle and one other vehicle, of means coupling said vehicles to each other and comprising two coupled couplers capable of longitudinal and transverse arcuate movements relative to the power vehicle, a fluid pressure brake system operative to effect an application of the brakes on the train, regulating means operative to vary the braking action of the system on the power vehicle, and means responsive only to said relative longitudinal movement of the couplers for controlling the operation of said regulating means.

29. In a brake system for a train of at least a head vehicle and a rear vehicle connected to the head vehicle, of a brake equipment on each vehicle operative to effect an application of the brakes, means operative to vary the braking force on the head vehicle, and means for controlling the operation of the first mentioned means, the last mentioned means being operative upon inward movement of the rear vehicle relative to the head vehicle for effecting the operation of the first mentioned means to reduce the braking force of the brake equipment on the head vehicle and operative upon outward movement of the head vehicle relative to the rear vehicle for effecting the operation of the first mentioned means to increase the braking force of the equipment on the head vehicle.

30. In a brake system for a train of at least a head vehicle and a rear vehicle connected to the head vehicle, of a brake equipment on each vehicle operative to effect an application of the brakes, means operative manually for initiating the operation of the brake equipment on both vehicles to effect an application of the brakes, means for varying the braking force of the brake equipment on the head vehicle only, and means operated automatically upon a relative movement between said vehicles for controlling the operation of the second mentioned means.

31. In a brake system for a train of at least a head vehicle and a rear vehicle connected to the head vehicle, of a brake equipment on each vehicle operative to effect an application of the brakes, means operative manually for initiating the operation of the brake equipment on both vehicles to effect an application of the brakes, means for varying the braking force of the brake equipment on the head vehicle only, and means carried by the head vehicle operated upon a relative movement between said vehicles for controlling the operation of the second mentioned means.

32. In a brake system for a train of at least a head vehicle and a rear vehicle connected to the head vehicle, of a brake equipment on each vehicle operative to effect an application of the brakes, means carried by the head vehicle operative to vary the braking force on the head vehicle, and means for controlling the operation of the first mentioned means, the last mentioned means being operative upon inward movement of the rear vehicle relative to the head vehicle for effecting the operation of the first mentioned means to reduce the braking force of the brake equipment on the head vehicle and operative upon outward movement of the head vehicle relative to the rear vehicle for effecting the operation of the first mentioned means to increase the braking force of the equipment on the head vehicle.

33. In a brake system for a train of at least a head vehicle and a rear vehicle connected to the head vehicle, of a brake equipment on each vehicle operative to effect an application of the brakes, means operative to vary the braking force on the head vehicle, and means for controlling the operation of the first mentioned means, the last mentioned means being operative upon the decreasing of the distance between said vehicles for effecting the operation of the first mentioned means to decrease the braking force of the brake equipment on the head vehicle and being operative upon the increasing of the distance between the vehicles for effecting the operation of the first mentioned means to increase the braking force of the equipment of the head vehicle.

34. In a brake system for a train of at least a head vehicle and a rear vehicle connected to the head vehicle, of a brake equipment on each vehicle operative to effect an application of the brakes, means operative manually for initiating the operation of the brake equipment on each of said vehicles to effect an application of the brakes, mechanism operative to regulate the braking force of the brake equipment on the head vehicle only, and means operated according to a relative movement between said vehicles for controlling the operation of said mechanism.

35. The combination in a train of at least a head vehicle and a rear vehicle, of means for coupling said vehicles to each other, the coupling means being movable longitudinally relative to the head vehicle, a braking system operative to effect an application of the brakes on said train, means for varying the braking power of the portion of the system on the head vehicle, and means operated upon forward movement of the coupling means relative to the head vehicle for effecting the operation of the second mentioned means to decrease the braking power of the system on the head vehicle and operated upon the forward movement of the head vehicle relative to the coupling means for effecting the operation of the second mentioned means to increase the braking power of the portion of the system on the head vehicle.

36. In a brake system for a train of one or more cars and a power vehicle, the combination with means on the cars of the train operative to effect an application of the car brakes, of means on the power vehicle operative to apply the power vehicle brakes at a predetermined time after the initiation of the application of the car brakes, and means operated upon the forward movement of the cars relative to the power vehicle for decreasing the braking power of the brake applying means on the power vehicle and operated upon the forward movement of the power vehicle relative to said cars for increasing the braking power of the brake applying means on the power vehicle.

37. In a fluid pressure brake system for a train of one or more cars and a power vehicle, the combination with a brake pipe, of means on the car or cars of the train operated upon a reduction in brake pipe pressure for effecting an application of the car brakes, valve means on said power vehicle operated upon said reduction in brake pipe pressure to effect an application of the power vehicle brakes at a predetermined time after said reduction in brake pipe pressure is initiated, and valve mechanism included in said valve means operated upon the forward movement of the car adjacent the power vehicle relative to the power vehicle for decreasing the braking power of the power vehicle brake and operated upon the forward movement of the power vehicle relative to the adjacent car for increasing the braking power of the power vehicle brake.

38. In a train brake system, the combination with means on the cars of a train operative to effect an application of the car brakes, of means on the locomotive operative to effect an application of the locomotive brakes, means operative automatically for controlling the locomotive braking means after the locomotive brakes are applied for substantially synchronizing the braking effect on the locomotive with the braking effect on the cars, and means operable for rendering the controlling means on the locomotive ineffective to control the operation of the locomotive braking means.

39. In a fluid pressure brake system for a train of one or more cars and a power vehicle, the combination with a brake pipe, of means on the car or cars of the train operated upon a reduction in brake pipe pressure for effecting an application of the car brakes, valve means on said power vehicle operated upon said reduction in brake pipe pressure to effect an application of the power vehicle brakes at a predetermined time after said reduction in brake pipe pressure is initiated, valve mechanism included in said valve means operated according to a relative movement between said power vehicle and the adjacent car of the train for regulating the braking action on the power vehicle, and means operative to render the valve mechanism ineffective to regulate the braking action on the power vehicle.

40. In a train brake system, the combination with means on the cars of a train operative to effect an application of the car brakes, of means on the locomotive operative to effect an application of the locomotive brakes, means operative automatically for controlling the locomotive braking means after the locomotive brakes are applied for substantially synchronizing the braking effect on the locomotive with the braking effect on the cars, and means operable manually for rendering the controlling means on the locomotive ineffective to control the operation of the locomotive braking means.

41. In a train brake system, the combination with means on the cars of a train operative to effect an application of the car brakes, of means on the locomotive operative to effect an application of the locomotive brakes, means operative automatically for controlling the locomotive braking means after the locomotive brakes are applied for substantially synchronizing the braking effect on the locomotive with the braking effect on the cars, and a valve operable manually for rendering the controlling means on the locomotive ineffective to control the operation of the locomotive braking means.

42. In a fluid pressure brake system for a train of one or more cars and a power vehicle, the combination with a brake pipe, of means on the car or cars of the train operated upon a reduction in brake pipe pressure for effecting an application of the car brakes, valve means on said power vehicle operated upon said reduction in brake pipe pressure to effect an application of the power vehicle brakes at a predetermined time after said reduction in brake pipe pressure is initiated, valve mechanism included in said valve means operated according to a relative movement between said power vehicle and the adjacent car of the train for regulating the braking action on the power vehicle, and a valve operated manually to a position for rendering said valve mechanism ineffective to regulate the braking action on the power vehicle.

43. In a fluid pressure brake system for a train of one or more cars and a power vehicle, the combination with a brake pipe, of means on the car or cars of the train operated upon a reduction in brake pipe pressure for effecting an application of the car brakes, valve mechanism operative to effect an application of the power vehicle brakes, valve means operated upon said reduction in brake pipe pressure for retarding the operation of said valve mechanism for a predetermined period of time after the initiation of said brake pipe reduction, regulating means operative according to a relative movement between the power vehicle and the adjacent car of the train for regulating the degree of brake application on the power vehicle, means operative to render said valve means ineffective to time the operation of said valve mechanism, and means operative to render the regulating means ineffective to regulate the degree of brake application on the power vehicle.

44. The combination in a train of at least a power vehicle and one other vehicle, of a brake equipment on each of said vehicles, an automatic brake valve device operative to effect the operation of both of said equipments to apply the brakes on the train, means operated automatically upon a relative movement between the vehicles for regulating the braking action of the brake equipment on the power vehicle, and another brake valve device operative to effect the operation of the brake equipment on the power vehicle to apply the power vehicle brakes and for rendering said means ineffective to regulate the braking action of the power vehicle brake equipment.

45. The combination in a train comprising a power vehicle and other vehicles, of a brake equipment on the power vehicle, a brake equipment on each of said other vehicles, a brake valve device operative to effect the operation of said equipments to apply the brakes on the train, automatically operative means for substantially synchronizing the braking effect of the power vehicle brakes with the braking effect of the other vehicle brakes, another brake valve device operative to effect the operation of only the brake equipment on the power vehicle to apply the power vehicle brakes, and means automatically operative to render the first mentioned automatically operative means ineffective to control the braking action of the brake equipment on the power vehicle when the second mentioned brake valve device is operated to effect an application of the power vehicle brakes.

46. The combination in a train comprising a power vehicle and other vehicles, of a brake equipment on the power vehicle, a brake equipment on each of said other vehicles, a brake valve device operative to effect the operation of said equipments to apply the brakes on the train, automatically operative means for substantially synchronizing the braking effect of the power vehicle brakes with the braking effect of the other vehicle brakes, another brake valve device operative to effect the operation of only the brake equipment on the power vehicle to apply the power vehicle brakes, and means operative by fluid under pressure to render the automatically operative means ineffective to control the action of the brake equipment on the power vehicle when the second mentioned brake valve device is operated to effect an application of the power vehicle brakes.

47. The combination in a train comprising a power vehicle and other vehicles, of a brake equipment on the power vehicle, a brake equipment on each of said other vehicles, a brake valve device operative to effect the operation of said equipments to apply the brakes on the train, automatically operative means for substantially synchronizing the braking effect of the power vehicle brakes with the braking effect of the other vehicle brakes, another brake valve device operative to control the operation of the brake equipment on the power vehicle to apply and release the power vehicle brakes independently of the other vehicle brakes, and means operative automatically upon movement of the second mentioned brake valve device to brake applying position to render said automatically operative means ineffective to control the braking action of the brake equipment on the power vehicle, and operative automatically upon movement of the second mentioned brake valve device to brake releasing position for conditioning said automatically operative means to control the action of the brake equipment on the power vehicle when the first mentioned brake valve device is operated to effect an application of the brakes on the train.

48. The combination in a train comprising a power vehicle and other vehicles, of a brake equipment on the power vehicle, a brake equipment on each of said other vehicles, a brake valve device operative to effect the operation of said equipments to apply the brakes on the train, automatically operative means for substantially synchronizing the braking effect of the power vehicle brakes with the braking effect of the other vehicle brakes, valve means operable by fluid under pressure for rendering said automatically operative means ineffective to control the braking action of the brake equipment on the power vehicle and operable upon the release of fluid under pressure therefrom for conditioning the automatically operative means for control of the brake equipment on the power vehicle, and another brake valve device having an application position in which an independent application of the power vehicle brakes is effected and fluid under pressure is supplied to said valve means and having a release position in which the power vehicle brakes are released and fluid under pressure is vented from said valve device.

49. In a train brake system, the combination with a brake controlling valve device on each car of the train operative to effect an application of the car brakes so as to retard the gathering of the train slack, of means on the locomotive operative to apply the locomotive brakes after the initiation of the brake application on the cars for a period of time of sufficient duration to permit the slack in the train to gather, under average conditions, so that the inertia of the locomotive opposes the retardation of the cars during the slack gathering period.

50. In a fluid pressure train brake system, the combination with a brake pipe, of valve means on each car of the train operated upon a reduction in brake pipe pressure for effecting an application of the car brakes and including means for temporarily restricting the rate of build up of the car brake application so as to retard the gathering of the train slack, and valve means on the locomotive of the train operated upon said reduction in brake pipe pressure to delay the application of the locomotive brakes after the reduction in brake pipe pressure is initiated for a period of time of sufficient duration to permit the slack in the train to gather under average conditions.

51. In a fluid pressure train brake system, the combination with a brake pipe, of valve means on the cars of the train operated upon a sudden reduction in brake pipe pressure for effecting an application of the car brakes so as to retard the gathering of the train slack, valve means on the locomotive of the train operative to effect an application of the locomotive brakes, and means operated upon said sudden reduction in brake pipe pressure for delaying the operation of the valve means on the locomotive for a predetermined period of time after the sudden reduction in brake pipe pressure is initiated.

52. In a fluid pressure train brake system, the combination with a brake pipe, of valve means on the cars of the train operated upon a reduction in brake pipe pressure for effecting an application of the car brakes so as to retard the gathering of the train slack, valve means on the locomotive of the train operative to effect an application of the locomotive brakes, and means set in operation upon the initiation of said reduction in brake pipe pressure for holding back the application of the locomotive brakes for a period of time of such duration as to permit the slack in the train to gather under average conditions.

53. In a fluid pressure train brake system, the combination with a brake pipe, of valve means on the cars of the train operated upon a reduction in brake pipe pressure at either a service rate or an emergency rate for effecting an application of the car brakes so as to retard the gathering of the train slack, and valve means on the locomotive of the train set in operation upon the reduction in brake pipe pressure being effected for effecting an application of the locomotive brakes when, after the initiation of the reduction in brake pipe pressure, a period of time sufficient to permit the slack in the train to gather has elapsed.

54. In a fluid pressure brake, the combination with a brake pipe, of valve means on the cars of a train operative upon a reduction in brake pipe pressure to apply the car brakes for gathering the train slack gently, valve means on the locomotive of the train operative upon a reduction in fluid pressure to apply the locomotive brakes, and means operative upon a reduction in brake pipe pressure on the locomotive for reducing the pressure of fluid on the locomotive valve means a predetermined time after the operation of the car valve means is initiated.

55. In a fluid pressure brake, the combination with a brake pipe, of valve means on the cars of a train operative upon a reduction in brake pipe pressure to gradually apply the car brakes for gathering the train slack gently, and valve means on the locomotive for applying the locomotive brakes and operative upon a reduction in brake pipe pressure to delay the application of the locomotive brakes until after the gradual application of the car brakes is completed.

56. In a fluid pressure brake, the combination with a brake pipe, of valve means on the cars of a train operative upon a reduction in brake pipe pressure to effect a limited application of the brakes on the cars for gathering the train slack gently, and valve means on the locomotive for applying the locomotive brakes and operative upon a reduction in brake pipe pressure to delay the application of the locomotive brakes until after, under average conditions, said train slack is gathered.

57. In a fluid pressure brake, the combination with a brake pipe, of valve means on the cars of a train operative upon a reduction in brake pipe pressure to gradually apply the car brakes for gathering the train slack gently, and valve means on the locomotive for applying the locomotive brakes and operative upon a reduction in brake pipe pressure to prevent the locomotive brakes from applying while the gradual application of the car brakes is being effected.

58. In a fluid pressure brake, the combination with a brake pipe, of valve means on the cars of a train operative upon a reduction in brake pipe pressure to effect a limited application of the brakes on the cars for gathering the train slack gently, and valve mechanism on the locomotive for applying the locomotive brakes and operative upon a reduction in brake pipe pressure to hold back the application of the brakes on the locomotive for a time sufficient for the train slack, under average conditions, to be gathered by said gradual application of the car brakes.

59. In a fluid pressure brake, the combination with a brake pipe, of valve means on the cars of a train operative upon a reduction in brake pipe pressure to effect a limited application of the brakes on the cars for gathering the train slack gently, and valve means on the locomotive operative upon a reduction in brake pipe pressure to apply the locomotive brakes, said valve means on the locomotive comprising a delay means for timing the initiation of the application of locomotive brakes to occur after, under average conditions, the gathering of the train slack by the gradual application of the car brakes.

60. In a fluid pressure brake, the combination with a brake pipe, of a brake controlling valve device on the cars of a train operative upon a reduction in brake pipe pressure to effect an application of the car brakes, said device comprising means for effecting a gradual application of the brakes and then effecting a rapid application of the brakes, and valve means on the locomotive of the train operative upon a reduction in brake pipe pressure to apply the locomotive brakes after the gradual application of the car brakes.

61. In a fluid pressure brake, the combination with a brake pipe, of a brake controlling valve device on the cars of a train operative upon a reduction in brake pipe pressure to effect an application of the car brakes, said device comprising means for effecting a gradual application of the brakes and then effecting a rapid application of the brakes, and valve means on the locomotive of the train operative upon a reduction in brake pipe pressure to rapidly apply the locomotive brakes at the same time as the rapid application of the car brakes is obtained.

62. In a fluid pressure brake, the combination with a brake pipe, of a brake controlling valve device on the cars of a train operative upon a reduction in brake pipe pressure to effect an application of the car brakes, said device comprising means for effecting a gradual application of the brakes and then effecting a rapid application of the brakes, and valve means on the locomotive of the train operative upon a reduction in brake pipe pressure to apply the locomotive brakes, said valve means comprising a hold back valve device for holding back the application of the locomotive brakes during the gradual application of the car brakes.

63. In a fluid pressure brake, the combination with a brake pipe, of a brake controlling valve device and a brake cylinder on each car of a train, said brake controlling valve device being operative upon a reduction in brake pipe pressure to supply fluid under pressure to said brake cylinder initially at a rapid rate, then at a slower rate and finally at a rapid rate, a distributing valve device and a brake cylinder on the locomotive of the train, said distributing valve device being operative upon a reduction in fluid pressure to supply fluid under pressure to said locomotive brake cylinder, and valve means operative upon a reduction in brake pipe pressure to delay the operation of said distributing valve device to supply fluid under pressure to the brake cylinder until after the slower rate of fluid pressure supply to the car brake cylinder is completed.

64. In a fluid pressure brake system for a train including a locomotive and cars, the combination with a brake pipe, a brake cylinder and apparatus on each car operated upon a sudden reduction in brake pipe pressure for supplying fluid under pressure to the brake cylinder to effect an emergency application of the brakes, means for restricting the rate of build up of brake cylinder pressure for a predetermined period of time, a locomotive brake cylinder, and apparatus on the locomotive operated upon a sudden reduction in brake pipe pressure for supplying fluid under pressure to the locomotive brake cylinder, and means for holding back the supply of fluid to the locomotive brake cylinder for a predetermined period of time.

65. In a fluid pressure train brake system, the combination with a brake pipe, of apparatus on cars of the train operated upon a sudden reduction in brake pipe pressure for effecting an application of the brakes on cars of the train, means for retarding the build up of braking force on the cars to thereby delay the running in of the slack, apparatus on the locomotive of the train operated upon a sudden reduction in brake pipe pressure for effecting an application of the brakes on the locomotive, including means for holding back the initiation of the brake application on the locomotive for a predetermined period of time.

66. In a fluid pressure brake, the combination with a brake pipe, of a brake controlling valve device operated by fluid under pressure for effecting an application of the brakes, a timing valve device operated by fluid under pressure for supplying fluid under pressure to said brake controlling valve device, means for limiting the build up of fluid pressure on said brake controlling valve device for a period of time and operative upon the expiry of said period of time to effect an increase in the pressure on the brake controlling valve device, a pressure chamber, and an equalizing valve device subject to the opposing pressures of the brake pipe and said chamber and operated upon a reduction in brake pipe pressure for supplying fluid under pressure from said chamber to said timing valve device to operate same.

67. In a fluid pressure brake, the combination with a brake pipe, of a brake controlling valve device operated by fluid under pressure for effecting an application of the brakes, a regulating valve device operated by variations in fluid pressure for controlling the supply and release of fluid under pressure to and from said brake controlling valve device, a valve device subject to brake pipe pressure and operated by variations in brake pipe pressure for varying the fluid pressure on said regulating valve device, and means operative upon a predetermined increase in the pressure of fluid supplied to the brake controlling valve device and for a predetermined period of time thereafter for venting to the atmosphere fluid under pressure supplied by the regulating valve device to limit the increase in fluid pressure acting on the brake controlling valve device.

68. In a fluid pressure brake, the combination with a brake pipe, of a brake controlling valve device operated by fluid under pressure for effecting an application of the brakes, a regulating valve device operated by variations in fluid under pressure for controlling the supply and release of fluid under pressure to and from said brake controlling valve device, an equalizing valve device subject to brake pipe pressure and operated upon a reduction in brake pipe pressure for supplying fluid under pressure for operating said regulating valve device, and means operative upon a predetermined increase in the pressure of fluid supplied to the brake controlling valve device and for a predetermined period of time thereafter for venting to the atmosphere fluid under pressure supplied by the regulating valve device to limit the increase in fluid pressure acting on the brake controlling valve device.

69. In a fluid pressure brake, the combination with a brake pipe, of a brake controlling valve device operated by fluid under pressure for effecting an application of the brakes, a regulating valve device operated by variations in fluid under pressure for controlling the supply and release of fluid under pressure to and from said brake controlling valve device, a pressure chamber, an equalizing valve device subject to the opposing pressures of the brake pipe and said chamber and operated upon a reduction in brake pipe pressure for supplying fluid under pressure from said chamber to said regulating valve device, and means operative upon a predetermined increase in the pressure of fluid supplied to the brake controlling valve device and for a predetermined period of time thereafter for venting to the atmosphere fluid under pressure supplied by the regulating valve device to limit the increase in fluid pressure acting on the brake controlling valve device.

70. In a fluid pressure brake, the combination with a brake pipe, of a brake controlling valve device operated by fluid under pressure for effecting an application of the brakes, a regulating valve device operated by variations in fluid under pressure for controlling the supply and release of fluid under pressure to and from said brake controlling valve device, a pressure chamber, an equalizing valve device subject to the opposing pressures of the brake pipe and said chamber and operated upon a reduction in brake pipe pressure for supplying fluid under pressure from said chamber to said regulating valve device and upon an increase in brake pipe pressure for releasing fluid under pressure from said regulating valve device, and means operative upon a predetermined increase in the pressure of fluid supplied to the brake controlling valve device and for a predetermined period of time thereafter for venting to the atmosphere fluid under pressure supplied by the regulating valve device to limit the increase in fluid pressure acting on the brake controlling valve device.

71. In a fluid pressure brake system, the combination with a brake pipe, a brake cylinder, and a fluid pressure brake equipment on one vehicle of a train operated upon a reduction in brake pipe pressure for supplying fluid under pressure to the brake cylinder and having means for venting fluid under pressure from the brake pipe until the brake cylinder pressure has been increased to a predetermined degree, of a fluid pressure brake equipment on another vehicle of the train operated upon a reduction in brake pipe pressure for supplying fluid under pressure to effect an application of the brakes and means for delaying the build up of fluid pressure for effecting an application of the brakes on the last mentioned vehicle until the brake cylinder pressure on the first mentioned vehicle has been increased to said predetermined degree.

72. In a train brake system, the combination with means on the cars of the train operative to effect an application of the brakes on the cars so as to retard the gathering of the train slack, of means on the locomotive operative to apply the locomotive brakes at a predetermined time after the initiation of the brake application on the cars, the inertia of the locomotive opposing the retardation of the cars during the time that the slack in the train is gathering, and means for varying the braking force of the locomotive brakes according to relative longitudinal movement between the locomotive and a car of the train.

73. In a train brake system, the combination with means on the cars of the train operative to effect an application of the brakes on the cars so as to retard the gathering of the train slack, of means on the locomotive operative to apply the locomotive brakes at a predetermined time after the initiation of the brake application on the cars, the inertia of the locomotive opposing the retardation of the cars during the time that the slack in the train is gathering, and means conditioned, upon the effecting of an application of the locomotive brakes, to operate to vary the braking force of the locomotive brakes according to relative longitudinal movement between the locomotive and a car of the train.

74. In a train brake system, the combination with means on the cars of the train operative to effect an application of the brakes on the cars so as to retard the gathering of the train slack, of means on the locomotive operative to apply the locomotive brakes at a predetermined time after the initiation of the brake application on the cars, the inertia of the locomotive opposing the retardation of the cars during the time that the slack in the train is gathering, means operative to vary the braking force of the locomotive brakes according to relative longitudinal movement between the locomotive and a car of the train, and means operative upon the effecting of an application of the locomotive brakes for conditioning the last mentioned means for operation to vary the braking force of the locomotive brakes.

75. In a train brake system, the combination with means on the cars of the train operative to effect an application of the brakes on the cars so as to retard the gathering of the train slack, of means on the locomotive operative to apply the locomotive brakes at a predetermined time after the initiation of the brake application on the cars, the inertia of the locomotive opposing the retardation of the cars during the time that the slack in the train is gathering, means operative to vary the braking force of the locomotive brakes according to relative longitudinal movement between the locomotive and a car of the train, and means operative pneumatically upon the effecting of an application of the locomotive brakes for conditioning the last mentioned means for operation to vary the braking force of the locomotive brakes.

76. In a train brake system, the combination with means on the cars of the train operative to effect an application of the brakes on the cars so as to retard the gathering of the train slack, of means on the locomotive operative to apply the locomotive brakes at a predetermined time after the initiation of the brake application on the cars, the inertia of the locomotive opposing the retardation of the cars during the time that the slack in the train is gathering, valve means operative to vary the braking force of the locomotive brakes according to relative longitudinal movement between the locomotive and a car of the train, and means operative upon initiating an application of the locomotive brakes for conditioning the last mentioned means for operation to vary the braking force of the locomotive brakes.

77. In a train brake system, the combination with means on the car of the train operative to effect an application of the brakes on the cars so as to retard the gathering of the train slack, of means on the locomotive operative to apply the locomotive brakes at a predetermined time after the initiation of the brake application on the cars, the inertia of the locomotive opposing the retardation of the cars during the time that the slack in the train is gathering, a valve operative to control the means on the locomotive to vary the braking force of the locomotive brakes according to relative longitudinal movement between the locomotive and a car of the train, a lever for controlling the operation of said valve, means for controlling the operation of said lever, said lever being normally out of operative engagement with the last mentioned controlling means, and means operative upon the initiation of an application of the locomotive brakes for moving said lever into operative relation with said controlling means.

78. In a train brake system, the combination with means on the cars of the train operative to effect an application of the car brakes, means on the locomotive of the train operative to effect an application of the locomotive brakes, and means conditioned upon the initiation of an application of the brakes on the train and operable automatically for controlling the operation of the means on the locomotive for substantially synchronizing the braking effect on the locomotive with the braking effect on the cars.

79. In a train brake system, the combination with means on the cars of the train operative to effect an application of the car brakes, means on the locomotive of the train operative to effect an application of the locomotive brakes, and means conditioned upon the initiation of an application of the brakes on the train and operable automatically according to relative longitudinal movement between the locomotive and first car of the train for controlling the operation of the means on the locomotive to vary the braking power of the locomotive brakes for effecting a substantial synchronization of the braking effect on the locomotive with the braking effect on the cars.

80. In a fluid pressure brake equipment for a train, the combination with a brake pipe, of valve mechanism on the cars of the train operable upon a reduction in brake pipe pressure for effecting an application of the car brakes, valve means operable upon a reduction in brake pipe pressure for effecting an application of the locomotive brakes, and control means for varying the braking force on the locomotive according to relative longitudinal movement between the locomotive and first car of the train, said control means being conditioned pneumatically for operation to vary the braking force of the locomotive brakes upon the initiation of the operation of said valve means in effecting an application of the locomotive brakes.

81. In a fluid pressure brake equipment for a train, the combination with a brake pipe, of valve mechanism on the cars of the train operable upon a reduction in brake pipe pressure for effecting an application of the car brakes, valve means operable upon a reduction in brake pipe pressure for effecting an application of the locomotive brakes, and control means for controlling the operation of said valve means to vary the braking force on the locomotive according to relative longitudinal movement between the locomotive and first car of the train, said control means comprising a control valve, means for actuating said valve, and means for conditioning said mechanism upon the operation of said valve means to initiate an application of the locomotive brakes for conditioning the mechanism to actuate said valve.

82. In a train brake system, the combination with means on the cars of the train operative to effect an application of the car brakes, of valve means operative by fluid under pressure to effect an application of the locomotive brakes and operative upon the release of fluid under pressure to effect a release of the brakes, valve mechanism operative after an application of the car brakes is initiated for supplying fluid under pressure to said valve means to cause the valve means to function to effect an application of the locomotive brakes, and a control mechanism conditioned upon the initiation of the application of the locomotive brakes to operate according to longitudinal movement of the cars relative to the locomotive for venting fluid under pressure from said valve means to effect the operation of the valve means to reduce the braking force of the locomotive brakes, and to operate according to longitudinal movement of the locomotive relative to the cars for closing off the flow of fluid from the valve means.

83. In a train brake system, the combination with a brake pipe, a brake cylinder on each car of the train and a brake cylinder on the locomotive, of valve means on the cars operative upon a reduction in brake pipe pressure to supply fluid under pressure to the car brake cylinders, valve mechanism operative upon a reduction in brake pipe pressure to supply fluid under pressure to the locomotive brake cylinder, said valve mechanism comprising a valve device operative by fluid under pressure to supply fluid under pressure to the locomotive brake cylinder and operative upon the venting of fluid under pressure thus supplied for releasing fluid under pressure from the brake cylinder, a control valve mechanism operative according to relative longitudinal movement between the locomotive and cars for either establishing a communication through which fluid under pressure is vented from said valve device or for disestablishing said communication, and means operable by fluid from the locomotive brake cylinder for conditioning said control valve mechanism for operation.

84. In a train brake system, the combination with a brake pipe, a brake cylinder on each car of the train and a brake cylinder on the locomotive, of valve means on the cars operative upon a reduction in brake pipe pressure to supply fluid under pressure to the car brake cylinders, valve mechanism operative upon a reduction in brake pipe pressure to supply fluid under pressure to the locomotive brake cylinder, said valve mechanism comprising a valve device operative by fluid under pressure to supply fluid under pressure to the locomotive brake cylinder and operative upon the venting of fluid under pressure thus supplied for releasing fluid under pressure from the brake cylinder, a control valve mechanism operative according to relative longitudinal movement between the locomotive and cars for either establishing a communication through which fluid under pressure is vented from said valve device or for disestablishing said communication, and a movable abutment operable by fluid under pressure from the locomotive brake cylinder for conditioning said control valve mechanism for operation.

85. In a train brake system, the combination with a brake pipe, a brake cylinder on each car of the train and a brake cylinder on the locomotive, of valve means on the cars operative upon a reduction in brake pipe pressure to supply fluid under pressure to the car brake cylinders, valve mechanism operative upon a reduction in brake pipe pressure to supply fluid under pressure to the locomotive brake cylinder, said valve mechanism comprising a valve device operative by fluid under pressure to supply fluid under pressure to the locomotive brake cylinder and operative upon the venting of fluid under pressure thus supplied for releasing fluid under pressure from the brake cylinder, a control valve mechanism operative according to relative longitudinal movement between the locomotive and cars for either establishing a communication through which fluid under pressure is vented from said valve device or for disestablishing said communication, and means subject to fluid at locomotive brake cylinder pressure for conditioning and maintaining conditioned for operation the control valve mechanism.

86. In a fluid pressure brake, the combination with a brake pipe, of an equalizing reservoir, a reduction chamber having a restricted atmospheric outlet, a brake valve device having two service positions, means operative upon movement of the brake valve to one of said service positions to vent fluid under pressure from the equalizing reservoir to the reduction chamber, means operative upon movement of the brake valve device to the other of said service positions to vent fluid under pressure from the equalizing reservoir to the atmosphere independently of the reduction chamber, and means operative upon the venting of fluid to said reduction chamber to vent fluid from the brake pipe at a certain rate and to vent fluid from the brake pipe at a more restricted rate upon the flow of fluid from the reduction chamber to the atmosphere through said restricted atmospheric outlet and to vent fluid from the brake pipe at substantially a service rate upon the direct flow of fluid from the equalizing reservoir to the atmosphere.

87. In a fluid pressure brake, the combination with a brake pipe, of an equalizing reservoir, a reduction chamber having a restricted atmospheric outlet, a brake valve device having two service positions, means operative upon movement of the brake valve to one of said service positions to vent fluid under pressure from the equalizing reservoir to the reduction chamber, means operative upon movement of the brake valve device to the other of said service positions to vent fluid under pressure from the equalizing reservoir to the atmosphere independently of the reduction chamber, and means operative upon the venting of fluid to said reduction chamber to vent fluid from the brake pipe to effect a limited reduction in brake pipe pressure at a certain rate and to vent fluid from the brake pipe at a more restricted rate upon the flow of fluid from the reduction chamber to the atmosphere through said restricted outlet when the pressure of fluid in the equalizing reservoir equalizes into said reduction chamber, and for venting fluid from the brake pipe upon the direct venting of fluid from the equalizing reservoir to the atmosphere.

88. In a fluid pressure brake, the combination with a brake pipe, of an equalizing reservoir, a reduction chamber having a restricted atmospheric outlet, an equalizing discharge valve device subject to the opposing pressures of the equalizing reservoir and brake pipe and operable upon a reduction in equalizing reservoir pressure for venting fluid under pressure from the brake pipe, and a brake valve device comprising a manually operative valve having one position for establishing communication through which fluid is vented from the equalizing reservoir to the reduction chamber and the restricted outlet to the atmosphere, and having another position for establishing communication through which fluid is vented from the equalizing reservoir to the atmosphere at substantially a service rate and independently of the reduction chamber.

89. In a train fluid pressure brake equipment, the combination with a brake pipe and an equalizing reservoir normally charged with fluid under pressure, of a reduction limiting reservoir constantly open to the atmosphere through a restricted port, a brake valve device having a service application position in which fluid under pressure is vented from said equalizing reservoir to the reduction limiting reservoir, the flow of fluid from the equalizing reservoir to the reduction limiting reservoir being at a predetermined rate until the pressure of fluid in the equalizing reservoir substantially equalizes into the reduction limiting reservoir and then continues at a slower rate, said brake valve device having another service application position in which fluid under pressure is vented from the equalizing reservoir to the atmosphere at a service rate, and a brake pipe discharge valve mechanism controlled by the reduction in equalizing reservoir pressure for effecting a corresponding reduction in brake pipe pressure.

90. In a fluid pressure brake, the combination with a brake pipe, of an equalizing reservoir, a reduction chamber having a restricted atmospheric outlet, a brake valve device having two service positions, means operative upon movement of the brake valve to one of said service positions to vent fluid under pressure from the equalizing reservoir to the reduction chamber, means operative upon movement of the brake valve device to the other of said service positions to vent fluid under pressure from the equalizing reservoir to the atmosphere independently of the reduction chamber, means operative upon the venting of fluid to said reduction chamber to vent fluid from the brake pipe at a certain rate and to vent fluid from the brake pipe at a more restricted rate upon the flow of fluid from the reduction chamber to the atmosphere through said restricted atmospheric outlet and to vent fluid from the brake pipe at substantially a service rate upon the direct flow of fluid from the equalizing reservoir to the atmosphere, and a valve operative manually to a position for preventing the flow of fluid from the equalizing reservoir to the reduction chamber.

91. In a fluid pressure brake, the combination with a brake pipe, of an equalizing reservoir, a reduction chamber having a restricted atmospheric outlet, a brake valve device having two service positions, means operative upon movement of the brake valve to one of said service positions to vent fluid under pressure from the equalizing reservoir to the reduction chamber, means operative upon movement of the brake valve device to the other of said service positions to vent fluid under pressure from the equalizing reservoir to the atmosphere independently of the reduction chamber, means operative upon the venting of fluid to said reduction chamber to vent fluid from the brake pipe at a certain rate and to vent fluid from the brake pipe at a more restricted rate upon the flow of fluid from the reduction chamber to the atmosphere through said restricted atmospheric outlet and to vent fluid from the brake pipe at substantially a service rate upon the direct flow of fluid from the equalizing reservoir to the atmosphere, and a manually operable valve operable to cut off communication through which fluid is vented from the equalizing reservoir to the reduction reservoir.

92. In a fluid pressure brake, the combination with a brake pipe, of an equalizing reservoir, a reduction chamber having a restricted atmospheric outlet, a brake valve device having two service positions, means operative upon movement of the brake valve to one of said service positions to vent fluid under pressure from the equalizing reservoir to the reduction chamber, means operative upon movement of the brake valve device to the other of said service positions to vent fluid under pressure from the equalizing reservoir to the atmosphere independently of the reduction chamber, means operative upon the venting of fluid to said reduction chamber to vent fluid from the brake pipe to effect a limited reduction in brake pipe pressure at a certain rate and to vent fluid from the brake pipe at a more restricted rate upon the flow of fluid from the reduction chamber to the atmosphere through said restricted outlet when the pressure of fluid in the equalizing reservoir equalizes into said reduction chamber, and for venting fluid from the brake pipe upon the direct venting of fluid from the equalizing reservoir to the atmosphere, and a valve operative manually to a position for preventing the flow of fluid from the equalizing reservoir to the reduction chamber.

93. In a fluid pressure brake, the combination with a brake pipe, of an equalizing reservoir, a reduction chamber having a restricted atmospheric outlet, an equalizing discharge valve device subject to the opposing pressures of the equalizing reservoir and brake pipe and operable upon a reduction in equalizing reservoir pressure for venting fluid under pressure from the brake pipe, a brake valve device comprising a manually operative valve having one position for establishing communication through which fluid is vented from the equalizing reservoir to the reduction chamber and the restricted outlet to the atmosphere, and having another position for establishing communication through which fluid is vented from the equalizing reservoir to the atmosphere at substantially a service rate and independently of the reduction chamber, and a valve operative manually to a position for preventing the flow of fluid from the equalizing reservoir to the reduction chamber.

94. In a fluid pressure brake, the combination with a brake pipe, of an equalizing reservoir, a reduction chamber having a restricted atmospheric outlet, an equalizing discharge valve device subject to the opposing pressures of the equalizing reservoir and brake pipe and operable upon a reduction in equalizing reservoir pressure for venting fluid under pressure from the brake pipe, a brake valve device comprising a manually operative valve having one position for establishing communication through which fluid is vented from the equalizing reservoir to the reduction chamber and the restricted outlet to the atmosphere, and having another position for establishing communication through which fluid is vented from the equalizing reservoir to the atmosphere at substantially a service rate and independently of the reduction chamber, and means operative manually for rendering said equalizing discharge valve device inoperative to vent fluid from the brake pipe when the brake valve device is in the first mentioned position.

95. In a fluid pressure brake, the combination with a brake pipe, of an equalizing reservoir, a reduction chamber having a restricted atmospheric outlet, a brake valve device operative to vent fluid from the equalizing reservoir to the reduction chamber until the equalizing reservoir pressure substantially equalizes into said reduction chamber and to the atmosphere through the restricted atmospheric outlet, and operative to another position for venting fluid from the equalizing reservoir to the atmosphere independently of the reduction chamber, means operative upon the venting of fluid from the equalizing reservoir for effecting corresponding reductions in brake pipe pressure, and means operative manually to prevent the first mentioned means from operating to vent fluid under pressure from the brake pipe when the brake valve device is in the first mentioned position.

96. In a fluid pressure brake, the combination with a brake pipe, of an equalizing reservoir, a reduction chamber having a restricted atmospheric outlet, a brake valve device operative to vent fluid from the equalizing reservoir to the reduction chamber until the equalizing reservoir pressure substantially equalizes into said reduction chamber and to the atmosphere through the restricted atmospheric outlet, and operative to another position for venting fluid from the equalizing reservoir to the atmosphere independently of the reduction chamber, means operative upon the venting of fluid from the equalizing reservoir for effecting corresponding reductions in brake pipe pressure, and means operative manually to prevent the flow of fluid from the equalizing reservoir to the reduction chamber when the brake valve device is moved to the first mentioned position.

97. In a fluid pressure brake, the combination with a brake pipe, of an equalizing reservoir, a reduction chamber having a restricted atmospheric outlet, a brake valve device, means operative upon movement of the brake valve device to a position for initiating a service application of the brakes to vent fluid under pressure from the equalizing reservoir to said reduction chamber, and means operative upon the venting of fluid to said reduction chamber to vent fluid from the brake pipe at a certain rate and to vent fluid from the brake pipe at a more restricted rate upon the flow from said reduction chamber to the atmosphere through said restricted atmospheric outlet, the last mentioned means being also operative to supply fluid under pressure to the brake pipe to compensate for leakage of fluid from the brake pipe during the time the equalizing reservoir pressure is being reduced at a restricted rate.

98. In a fluid pressure brake, the combination with a brake pipe, of an equalizing reservoir, a reduction chamber having a restricted atmospheric outlet, a brake valve device, means operative upon movement of the brake valve device to a position for initiating a service application of the brakes to vent fluid under pressure from the equalizing reservoir to said reduction chamber, and means operative upon the venting of fluid to said reduction chamber to vent fluid from the brake pipe to effect a limited reduction in brake pipe pressure at a certain rate and to vent fluid from the brake pipe at a more restricted rate upon the flow of fluid from the reduction chamber to the atmosphere through said outlet, the last mentioned means being also operative to supply fluid under pressure to the brake pipe when, during the time the equalizing reservoir pressure is being reduced at a restricted rate, leakage of fluid from the brake pipe occurs.

99. In a fluid pressure brake, the combination with a brake pipe, of an equalizing reservoir, a reduction chamber having a restricted atmospheric outlet, a brake valve device having two service positions, means operative upon movement of the brake valve to one of said service positions to vent fluid under pressure from the equalizing reservoir to the reduction chamber, means operative upon movement of the brake valve device to the other of said service positions to vent fluid under pressure from the equalizing reservoir to the atmosphere independently of the reduction chamber, and means operative upon the venting of fluid to said reduction chamber to vent fluid from the brake pipe at a certain rate and to vent fluid from the brake pipe at a more restricted rate upon the flow of fluid from the reduction chamber to the atmosphere through said restricted atmospheric outlet and to vent fluid from the brake pipe at substantially a service rate upon the direct flow of fluid from the equalizing reservoir to the atmosphere, and being also operative to supply fluid under pressure to the brake pipe to compensate for leakage of fluid from the brake pipe during the time the equalizing reservoir pressure is being reduced at a restricted rate.

100. In a fluid pressure brake, the combination with a brake pipe, of an equalizing reservoir, a reduction chamber having a restricted atmospheric outlet, a brake valve device having two service positions, means operative upon movement of the brake valve to one of said service positions to vent fluid under pressure from the equalizing reservoir to the reduction chamber, means operative upon movement of the brake valve device to the other of said service positions to vent fluid under pressure from the equalizing reservoir to the atmosphere independently of the reduction chamber, and means operative upon the venting of fluiding to said reduction chamber to vent fluid from the brake pipe at a certain rate and to vent fluid from the brake pipe at a more restricted rate upon the flow of fluid from the reduction chamber to the atmosphere through said restricted atmospheric outlet and to vent fluid from the brake pipe at substantially a service rate upon the direct flow of fluid from the equalizing reservoir to the atmosphere, and being also operative to supply fluid under pressure to the brake pipe to compensate for leakage of fluid from the brake pipe during the time the equalizing reservoir pressure is being reduced at a restricted rate, said brake valve device in the second mentioned position closing communication through which fluid is adapted to be supplied to the brake pipe through the operation of the last mentioned means.

101. In a fluid pressure brake, the combination with a brake pipe, of an equalizing reservoir, a reduction chamber having a restricted atmospheric outlet, a brake valve device, means operative upon movement of the brake valve device to a position for initiating a service application of the brakes to vent fluid under pressure from the equalizing reservoir to said reduction chamber, and means operative upon the venting of fluid to said reduction chamber to vent fluid from the brake pipe at a certain rate and to vent fluid from the brake pipe at a more restricted rate upon the flow from said reduction chamber to the atmosphere through said restricted atmospheric outlet, the last mentioned means being also operative to supply fluid under pressure to the brake pipe when, during the time the equalizing reservoir pressure is being reduced at a restricted rate, the rate of reduction in brake pipe pressure exceeds the rate of reduction in equalizing reservoir pressure.

102. In a fluid pressure brake, the combination with a brake pipe, of an equalizing reservoir, a reduction chamber having a restricted atmospheric outlet, a brake valve device, means operative upon movement of the brake valve device to a position for initiating a service application of the brakes to vent fluid under pressure from the equalizing reservoir to said reduction chamber, and means operative upon the venting of fluid to said reduction chamber to vent fluid from the brake pipe at a certain rate and to vent fluid from the brake pipe at a more restricted rate upon the flow from said reduction chamber to the atmosphere through said restricted atmospheric outlet, the last mentioned means being also operative to supply fluid under pressure to the brake pipe when the rate of reduction in brake pipe pressure exceeds the rate of reduction in equalizing reservoir pressure.

103. In a fluid pressure brake, the combination with a brake pipe, of an equalizing reservoir, a reduction chamber having a restricted atmospheric outlet, a brake valve device having two service positions, means operative upon movement of the brake valve to one of said service positions to vent fluid under pressure from the equalizing reservoir to the reduction chamber, means operative upon movement of the brake valve device to the other of said service positions to vent fluid under pressure from the equalizing reservoir to the atmosphere independently of the reduction chamber, and means operative upon the venting of fluid to said reduction chamber to vent fluid from the brake pipe at a certain rate and to vent fluid from the brake pipe at a more restricted rate upon the flow of fluid from the reduction chamber to the atmosphere through said restricted atmospheric outlet and to vent fluid from the brake pipe at substantially a service rate upon the direct flow of fluid from the equalizing reservoir to the atmosphere and being also operative to supply fluid under pressure to the brake pipe when with the brake valve device in the first mentioned service position the rate of reduction in brake pipe pressure exceeds the rate of reduction in equalizing reservoir pressure.

104. In a fluid pressure brake, the combination with a brake pipe, of an equalizing reservoir, a reduction chamber having a restricted atmospheric outlet, a brake valve device having two service positions, means operative upon movement of the brake valve to one of said service positions to vent fluid under pressure from the equalizing reservoir to the reduction chamber, means operative upon movement of the brake valve device to the other of said service positions to vent fluid under pressure from the equalizing reservoir to the atmosphere independently of the reduction chamber, and means operative upon the venting of fluid to said reduction chamber to vent fluid from the brake pipe at a certain rate and to vent fluid from the brake pipe at a more restricted rate upon the flow of fluid from the reduction chamber to the atmosphere through said restricted atmospheric outlet and to vent fluid from the brake pipe at substantially a service rate upon the direct flow of fluid from the equalizing reservoir to the atmosphere and being also operative to supply fluid under pressure to the brake pipe when with the brake valve device in the first mentioned service position the rate of reduction in brake pipe pressure exceeds the rate of reduction in equalizing reservoir pressure, said brake valve device in the second mentioned position closing communication through which fluid is adapted to be supplied to the brake pipe through the operation of the last mentioned means.

105. In a fluid pressure brake, the combination with a brake pipe, of an equalizing reservoir, a reduction chamber having a restricted atmospheric outlet, a brake valve device operative to vent fluid from the equalizing reservoir to the reduction chamber until the equalizing reservoir pressure substantially equalizes into said reduction chamber and to the atmosphere through the restricted atmospheric outlet, and means operative upon the venting of fluid from the equalizing reservoir for effecting corresponding reductions in brake pipe pressure and also operative upon a reduction in brake pipe pressure at a rate exceeding the rate of reduction in equalizing reservoir pressure for supplying fluid under pressure to the brake pipe.

106. In a train fluid pressure brake equipment, the combination with a brake pipe and an equalizing reservoir normally charged with fluid under pressure, of a reduction limiting reservoir constantly open to the atmosphere through a restricted port, a brake valve device having a service application position in which fluid under pressure is vented from said equalizing reservoir to the reduction limiting reservoir, the flow of fluid from the equalizing reservoir to the reduction limiting reservoir being at a predetermined rate until the pressure of fluid in the equalizing reservoir substantially equalizes into the reduction limiting reservoir and then continues at a slower rate, said brake valve device having another service application position in which fluid under pressure is vented from the equalizing reservoir to the atmosphere at a service rate, and a brake pipe discharge valve mechanism controlled by the reduction in equalizing reservoir pressure for effecting a corresponding reduction in brake pipe pressure, said brake pipe discharge valve mechanism being operative to supply fluid under pressure to the brake pipe to compensate for leakage of fluid from the brake pipe when the brake valve device is in the first mentioned service position, said brake valve device when in the second mentioned position closing communication through which fluid under pressure is adapted to be supplied to the brake pipe by said brake pipe discharge valve mechanism.

107. In a fluid pressure brake, the combination with a brake pipe, of an equalizing reservoir, a reduction chamber having a restricted atmospheric outlet, a brake valve device, means operative upon movement of the brake valve device to a position for initiating a service application of the brakes to vent fluid under pressure from the equalizing reservoir to said reduction chamber, means operative upon the venting of fluid to said reduction chamber to vent fluid from the brake pipe at a certain rate and to vent fluid from the brake pipe at a more restricted rate upon the flow from said reduction chamber to the atmosphere through said restricted atmospheric outlet, and also operative to supply fluid under pressure to the brake pipe when the rate of reduction in brake pipe pressure exceeds the rate of reduction in equalizing reservoir pressure, and a valve operative manually to close communication from the equalizing reservoir to the reduction chamber and to close communication through which fluid under pressure is adapted to be supplied to the brake pipe to compensate for brake pipe leakage.

108. In a fluid pressure brake, the combination with a brake pipe, of an equalizing reservoir, a reduction chamber, an equalizing discharge valve device subject to the opposing pressures of the equalizing reservoir and brake pipe and operable upon a reduction in equalizing reservoir pressure for venting fluid under pressure from the brake pipe and operative upon a reduction in brake pipe pressure at a rate exceeding the rate of reduction in equalizing reservoir pressure for supplying fluid under pressure to the brake pipe, and a brake valve device comprising a manually operative valve having one service application position for establishing a communication through which fluid is vented from the equalizing reservoir to the reduction chamber and for establishing another communication through which fluid under pressure adapted to be supplied to the brake pipe by the equalizing discharge valve flows, and having another service position for closing both of said communications and for establishing a communication through which fluid is vented from the equalizing reservoir to the atmosphere at substantially a service rate.

109. In a fluid pressure brake, the combination with a brake pipe, of an equalizing reservoir, a reduction chamber, an equalizing discharge valve device subject to the opposing pressures of the equalizing reservoir and brake pipe and operable upon a reduction in equalizing reservoir pressure for venting fluid under pressure from the brake pipe and operative upon a reduction in brake pipe pressure at a rate exceeding the rate of reduction in equalizing reservoir pressure for supplying fluid under pressure to the brake pipe, a brake valve device comprising a manually operative valve having one service application position for establishing a communication through which fluid is vented from the equalizing reservoir to the reduction chamber and for establishing another communication through which fluid under pressure adapted to be supplied to the brake pipe by the equalizing discharge valve flows, and having another service position for closing both of said communications and for establishing a communication through which fluid is vented from the equalizing reservoir to the atmosphere at substantially a service rate, and a valve operative manually for closing the communication from the equalizing reservoir to the reduction chamber and also the communication through which fluid under pressure is adapted to be supplied to the brake pipe.

110. In a fluid pressure brake, the combination with a brake pipe, of an equalizing reservoir, a reduction chamber, an equalizing discharge valve device subject to the opposing pressures of the equalizing reservoir and brake pipe and operable upon a reduction in equalizing reservoir pressure for venting fluid under pressure from the brake pipe and operative upon a reduction in brake pipe pressure at a rate exceeding the rate of reduction in equalizing reservoir pressure for supplying fluid under pressure to the brake pipe, a brake valve device comprising a manually operative valve having one service application position for establishing a communication through which fluid is vented from the equalizing reservoir to the reduction chamber and for establishing another communication through which fluid under pressure adapted to be supplied to the brake pipe by the equalizing discharge valve flows, and having another service position for closing both of said communications and for establishing a communication through which fluid is vented from the equalizing reservoir to the atmosphere at substantially a service rate, and a valve operative manually for rendering said equalizing discharge valve device inoperative to either vent fluid under pressure from the brake pipe or supply fluid under pressure to the brake pipe when the brake valve device is in the first mentioned service application position.

111. In a fluid pressure brake, the combination with a brake pipe and an equalizing reservoir, of a brake valve device having a position for supplying fluid under pressure to the brake pipe and equalizing reservoir and having a brake applying position for venting fluid under pressure from the equalizing reservoir, a movable abutment subject to the opposing pressures of the brake pipe and equalizing reservoir, a brake pipe discharge valve operative by said abutment upon a reduction in equalizing reservoir pressure to vent fluid under pressure from the brake pipe, and means closing the brake pipe venting communication leading from said discharge valve when the brake valve device is in the first mentioned position and operative to establish said communication upon movement of the brake valve device from the first mentioned position toward the second mentioned position.

112. In a fluid pressure brake, the combination with a brake pipe and an equalizing reservoir, of a brake valve device having a position for supplying fluid under pressure to the brake pipe and equalizing reservoir and having a brake applying position for venting fluid under pressure from the equalizing reservoir, a movable abutment subject to the opposing pressures of the brake pipe and equalizing reservoir, a brake pipe discharge valve operative by said abutment upon a reduction in equalizing reservoir pressure to vent fluid under pressure from the brake pipe, a valve closing the brake pipe venting communication leading from said discharge valve when the brake valve device is in the first mentioned position, a lever for actuating said valve to establish said communication, and means operative upon movement of the brake valve device from the first mentioned position toward the second mentioned position for actuating said lever.

113. In a fluid pressure brake, the combination with a brake pipe and an equalizing reservoir, of a brake valve device having a position for supplying fluid under pressure to the brake pipe and equalizing reservoir and having a brake applying position for venting fluid under pressure from the equalizing reservoir, a movable abutment subject to the opposing pressures of the brake pipe and equalizing reservoir, a brake pipe discharge valve operative by said abutment upon a reduction in equalizing reservoir pressure to vent fluid under pressure from the brake pipe, a valve closing the brake pipe venting communication leading from said discharge valve when the brake valve device is in the first mentioned position, a lever for actuating said valve to establish said communication, and a cam operative with the brake valve device upon movement of the brake valve device from the first mentioned position to the second mentioned position for actuating said lever.

114. In a fluid pressure brake, the combination with a brake pipe and an equalizing reservoir, of a brake valve device having a position for supplying fluid under pressure to the brake pipe and equalizing reservoir and having a brake applying position for venting fluid under pressure from the equalizing reservoir, a movable abutment subject to the opposing pressures of the brake pipe and equalizing reservoir, a brake pipe discharge valve operative by said abutment upon a reduction in equalizing reservoir pressure to vent fluid under pressure from the brake pipe, a valve closing the brake pipe venting communication leading from said discharge valve when the brake valve device is in the first mentioned position, a lever for actuating said valve to establish said communication, means operative upon movement of the brake valve device from the first mentioned position to the second mentioned position for actuating said lever, and a spring for actuating said valve to close said communication upon movement of the brake valve device from the second mentioned position to the first mentioned position.

115. In a fluid pressure brake system for a train of one or more cars and a power vehicle, the combination with a brake equipment on the power vehicle operative to effect an application of the power vehicle brakes, means operative according to relative longitudinal movement between the power vehicle and the adjacent car of the train for effecting the operation of said brake equipment to vary the braking power thereof and means operative to render the first mentioned means ineffective to control the operation of said equipment.

116. In a fluid pressure brake system for a train of one or more cars and a power vehicle, the combination with a brake equipment on the power vehicle operative to effect an application of the power vehicle brakes, means operative according to relative longitudinal movement between the power vehicle and the adjacent car of the train for effecting the operation of said brake equipment to vary the braking power thereof and valve means operative manually for rendering the first mentioned means ineffective to control the operation of said equipment.

117. The combination in a train of at least two vehicles, one of which is a power vehicle, of a brake equipment on each of said vehicles, manually controlled means on the power vehicle for initiating the operation of the brake equipments on both of said vehicles to effect an application of the brakes, means for varying the braking power of the brake equipment on the power vehicle, means on the power vehicle automatically operated upon a relative movement between the vehicles for regulating the operation of the second mentioned means, and means operative manually for rendering the second mentioned means ineffective to vary the braking power of the brake equipment on the power vehicle.

118. The combination in a train of at least two vehicles, one of which is a power vehicle, of a brake equipment on each of said vehicles, manually controlled means on the power vehicle for initiating the operation of the brake equipments on both of said vehicles to effect an application of the brakes, means for varying the braking power of the brake equipment on the power vehicle, means on the power vehicle automatically operated upon a relative movement between the vehicles for regulating the operation of the second mentioned means, and valve means operative manually for rendering the second mentioned means ineffective to vary the braking power of the brake equipment on the power vehicle.

119. In a fluid pressure brake, the combination with a brake pipe, of valve means on the cars of a train operative upon a reduction in brake pipe pressure to effect a limited application of the brakes on the cars for gathering the train slack gently, valve mechanism on the locomotive for applying the locomotive brakes and operative upon a reduction in brake pipe pressure to hold back the application of the brakes on the locomotive for a time sufficient for the train slack to be gathered by said gradual application of the car brakes, means operative according to relative longitudinal movement between the locomotive and first car of the train for controlling the operation of said valve mechanism to vary the braking power on the locomotive, and a valve operative manually for rendering the last mentioned means ineffective to vary the braking power on the locomotive.

120. In a fluid pressure brake system for a train of one or more cars and a power vehicle, the combination with a brake pipe carried by the power vehicle and cars and an angle cock on the power vehicle operative to control communication through the brake pipe, of a brake equipment on the power vehicle operative upon a reduction in brake pipe pressure to effect an application of the power vehicle brakes, means operative according to relative longitudinal movement between the power vehicle and first car of the train for effecting the operation of said brake equipment to vary the braking power of the equipment, and means operative, upon the operation of said angle cock to close communication through the brake pipe, for rendering the first mentioned means ineffective to control the operation of said brake equipment.

121. In a fluid pressure brake system for a train of one or more cars and a power vehicle, the combination with a brake pipe, of a brake equipment on the power vehicle operative upon a reduction in brake pipe pressure to effect an application of the power vehicle brakes, means operative according to relative movement between the power vehicle and first car of the train for effecting the operation of said brake equipment to vary the braking power of the equipment, and a normally open angle cock interposed in the brake pipe on the power vehicle operative for closing communication through the brake pipe from the power vehicle to the cars of the train and for rendering said means ineffective to control the operation of said brake equipment.

122. In a train brake system, the combination with means on the cars of the train operative to effect an application of the brakes on the cars so as to retard the gathering of the train slack, of means on the locomotive operative to apply the locomotive brakes at a predetermined time after the initiation of the brake application on the cars, the inertia of the locomotive opposing the retardation of the cars during the time that the slack in the train is gathering, means for varying the braking force of the locomotive brakes according to relative longitudinal movement between the locomotive and a car of the train, and means operative manually for rendering the last mentioned means ineffective to vary the braking force of the locomotive brakes.

123. In a train brake system, the combination with a brake pipe, a brake cylinder on each car of the train and a brake cylinder on the locomotive, of valve means on the cars operative upon a reduction in brake pipe pressure to supply fluid under pressure to the car brake cylinders, valve mechanism operative upon a reduction in brake pipe pressure to supply fluid under pressure to the locomotive brake cylinder, said valve mechanism comprising a valve device operative by fluid under pressure to supply fluid under pressure to the locomotive brake cylinder and operative upon the venting of fluid under pressure thus supplied for releasing fluid under pressure from the brake cylinder, a control valve mechanism operative according to relative longitudinal movement between the locomotive and cars for either establishing a communication through which fluid under pressure is vented from said valve device or for disestablishing said communication, means operable by fluid from the locomotive brake cylinder for conditioning said control valve mechanism for operation, and a manually operable valve for closing the communication through which fluid is adapted to be vented from said valve device by the operation of said valve.

124. In a train brake system, the combination with a brake pipe, a brake cylinder on each car of the train and a brake cylinder on the locomotive, of valve means on the cars operative upon a reduction in brake pipe pressure to supply fluid under pressure to the car brake cylinders, valve mechanism operative upon a reduction in brake pipe pressure to supply fluid under pressure to the locomotive brake cylinder, said valve mechanism comprising a valve device operative by fluid under pressure to supply fluid under pressure to the locomotive brake cylinder and operative upon the venting of fluid under pressure thus supplied for releasing fluid under pressure from the brake cylinder, a control valve mechanism operative according to relative longitudinal movement between the locomotive and cars for either establishing a communication through which fluid under pressure is vented from said valve device or for disestablishing said communication, means operable by fluid from the locomotive brake cylinder for conditioning said control valve mechanism for operation, and an angle cock device interposed in the brake pipe of the locomotive operative to one position to establish an open communication between the locomotive brake pipe and the brake pipe on the first car of the train and to permit the flow of fluid from said valve device to said control valve mechanism and operative to another position for closing the brake pipe communication and for closing the communication from the valve device to the control valve mechanism.

CLYDE C. FARMER.